(12) United States Patent
Benedetto et al.

(10) Patent No.: US 11,278,807 B2
(45) Date of Patent: Mar. 22, 2022

(54) GAME PLAY COMPANION APPLICATION

(71) Applicant: Sony Interactive Entertainment LLC, San Mateo, CA (US)

(72) Inventors: Warren Benedetto, San Mateo, CA (US); Landon Noss, San Mateo, CA (US); Adil Sherwani, San Mateo, CA (US); Akihiko Kusumoto, San Mateo, CA (US); Nicole Hayashida, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 27 days.

(21) Appl. No.: 15/476,597

(22) Filed: Mar. 31, 2017

(65) Prior Publication Data

US 2017/0354884 A1 Dec. 14, 2017

Related U.S. Application Data

(63) Continuation-in-part of application No. 15/411,421, filed on Jan. 20, 2017.
(Continued)

(51) Int. Cl.
*A63F 13/537* (2014.01)
*A63F 13/63* (2014.01)
(Continued)

(52) U.S. Cl.
CPC .......... *A63F 13/537* (2014.09); *A63F 13/35* (2014.09); *A63F 13/352* (2014.09);
(Continued)

(58) Field of Classification Search
CPC ........ A63F 13/87; A63F 13/216; A63F 13/31; A63F 13/50; A63F 13/58; A63F 13/00; G06T 15/70; G06F 3/0481; H04L 12/58
See application file for complete search history.

(56) References Cited

U.S. PATENT DOCUMENTS

2007/0052712 A1* 3/2007 Saito .................. A63F 13/2145
345/473
2008/0268960 A1 10/2008 Farrier et al.
(Continued)

FOREIGN PATENT DOCUMENTS

EP 2 745 894 A2 6/2014

OTHER PUBLICATIONS

Cooperative gameplay—Wikipedia_12042015.pdf, https://en.wikipedia.org/w/index.php?title=Cooperative_gameplay&oldid=693696003, published on Dec. 4, 2015 (Year: 2015).*
(Continued)

*Primary Examiner* — Yingchuan Zhang
(74) *Attorney, Agent, or Firm* — Penilla IP, APC

(57) ABSTRACT

A method for gaming, including establishing a first communication channel with a first computing device associated with a first user configured for implementing a first instance of a gaming application in association with a first game play of the first user. The method further including establishing a second channel with a second computing device associated with the first user. The method further including generating an interface including information related to the first game play of the first user and second game play of a second user
(Continued)

playing the gaming application. The method further including delivering the interface and the information over the second channel to the second computing device for display concurrent with the first game play of the first user.

13 Claims, 37 Drawing Sheets

Related U.S. Application Data

(60) Provisional application No. 62/365,202, filed on Jul. 21, 2016, provisional application No. 62/349,546, filed on Jun. 13, 2016, provisional application No. 62/375,834, filed on Aug. 16, 2016.

(51) Int. Cl.
| | |
|---|---|
| *A63F 13/86* | (2014.01) |
| *A63F 13/35* | (2014.01) |
| *A63F 13/5378* | (2014.01) |
| *A63F 13/795* | (2014.01) |
| *A63F 13/79* | (2014.01) |
| *A63F 13/352* | (2014.01) |
| *A63F 13/493* | (2014.01) |

(52) U.S. Cl.
CPC ........ *A63F 13/493* (2014.09); *A63F 13/5378* (2014.09); *A63F 13/63* (2014.09); *A63F 13/79* (2014.09); *A63F 13/795* (2014.09); *A63F 13/86* (2014.09)

(56) References Cited

U.S. PATENT DOCUMENTS

| | | | |
|---|---|---|---|
| 2013/0165234 A1 | 6/2013 | Hall et al. | |
| 2013/0337916 A1* | 12/2013 | Saretto | A63F 13/77 463/32 |
| 2014/0143687 A1* | 5/2014 | Tan | G06F 3/04815 715/757 |
| 2014/0171039 A1 | 6/2014 | Bjontegard | |
| 2014/0256428 A1 | 9/2014 | Nakatsu | |
| 2014/0280644 A1* | 9/2014 | Cronin | H04L 67/38 709/206 |
| 2015/0024783 A1* | 1/2015 | Konno | G06F 16/9537 455/456.3 |
| 2015/0375102 A1 | 12/2015 | George | |
| 2017/0087471 A1 | 3/2017 | Knutsson | |
| 2017/0201779 A1* | 7/2017 | Publicover | H04N 21/25883 |

OTHER PUBLICATIONS

Mark Harmer, mharmer_thesis.pdf, https://www.cse.unr.edu/~mharmer/thesis/mharmer_thesis.pdf, Dec. 2010, last accessed Jan. 7, 2021 (Year: 2010).*

PCT International Search Report and Written Opinion, 11 pages, PCT/US2017/036641, dated Sep. 28, 2017.

De Jong, Coen_PCT International Search Report and Written Opinion, PCT/US2017/036643, dated Sep. 21, 2017 _ 10 Pages.

* cited by examiner

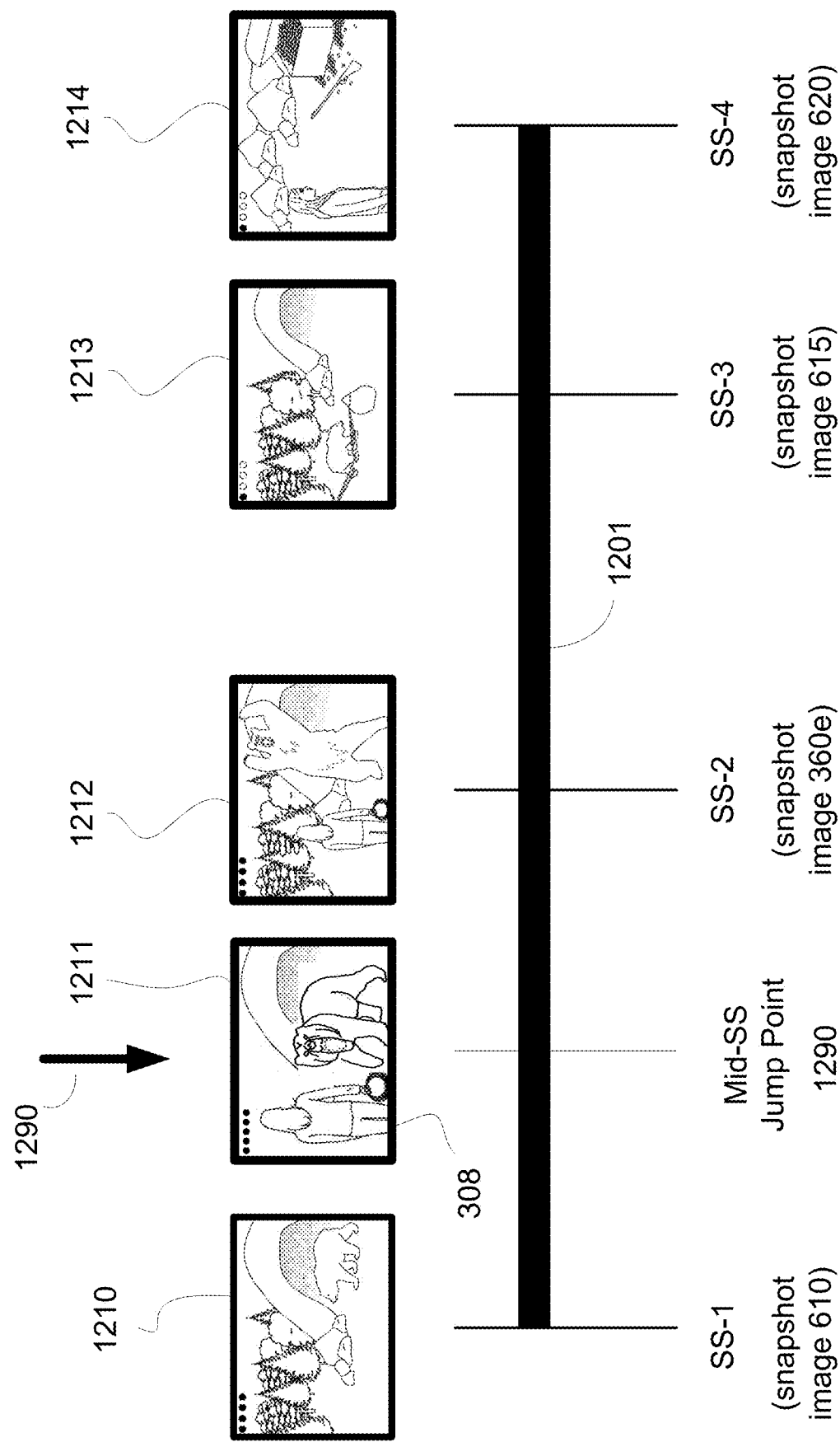

GAME PLAY COMPANION APPLICATION

CLAIM OF PRIORITY

The present application claims priority to and the benefit of the commonly owned, provisional patent application, U.S. Ser. No. 62/365,202, filed on Jul. 21, 2016, entitled "GAME PLAY COMPANION APPLICATION," which is herein incorporated by reference in its entirety.

The present application claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which is herein incorporated by reference in its entirety.

The present application is a continuation-in-part of and claims priority to and the benefit of the commonly owned, patent application U.S. Ser. No. 15/411,421, filed on Jan. 20, 2017 entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which is herein incorporated by reference in its entirety.

The present application claims priority to and the benefit of the commonly owned, provisional patent application, U.S. Ser. No. 62/375,834, filed on Aug. 16, 2016, entitled "METHOD AND SYSTEM FOR ACCESSING PREVIOUSLY STORED GAME PLAY VIA A VIDEO RECORDING AS EXECUTED ON A GAME CLOUD SYSTEM," which is herein incorporated by reference in its entirety.

CROSS REFERENCE TO RELATED APPLICATIONS

This application is related to commonly assigned, co-pending U.S. patent application Ser. No. 13/779,730, entitled "SYSTEMS AND METHODS FOR TAGGING CONTENT OF SHARED CLOUD EXECUTED MINI-GAMES AND TAG SHARING CONTROLS," filed on Feb. 27, 2013, the disclosure of which is hereby incorporated by reference in its entirety. This application is related to commonly assigned, co-pending U.S. patent application Ser. No. 13/792,664, entitled "USER-BASED MINI-GAME GENERATION AND DISTRIBUTION," filed on Mar. 11, 2013, the disclosure of which is hereby incorporated by reference in its entirety. This application is related to commonly assigned U.S. Pat. No. 8,870,661, entitled "CLOUD-BASED GAME SLICE GENERATION AND FRICTIONLESS SOCIAL SHARING WITH INSTANT PLAY," filed on Mar. 12, 2013, the disclosure of which is hereby incorporated by reference in its entirety. This application is related to commonly assigned, co-pending U.S. patent application Ser. No. 13/844,558, entitled "Systems and Methods for Managing Video Game Titles and User Play Metrics for Video Game Titles Executing on a Game Cloud System," filed on Mar. 15, 2013, the disclosure of which is hereby incorporated by reference in its entirety. This application is related to commonly assigned, co-pending U.S. patent application Ser. No. 14/526,472, entitled "CLOUD-BASED GAME SLICE GENERATION AND FRICTIONLESS SOCIAL SHARING WITH INSTANT PLAY," filed on Oct. 28, 2014, the disclosure of which is hereby incorporated by reference in its entirety.

TECHNICAL FIELD

The present disclosure is related to video games. Among other things, this disclosure describes methods and systems for generating and implementing a companion application providing gaming information related to a game plays of a gaming application, wherein the gaming information is based on a social network of a user.

BACKGROUND OF THE DISCLOSURE

Cloud-based systems, using computing resources (hardware and software), deliver services over a network (e.g., the internet). The services, in the context of gaming, enable streaming of content to remote clients, wherein most processing is done on servers, which may be distributed. Input provided at the remote clients will in turn drive execution of the video game, without the need for dedicated gaming hardware at the client's location. Cloud-based gaming, therefore, has been increasing in popularity because users find it easier to access more video game titles without complex hardware restrictions, and game suppliers find it easier to manage game code from centralized locations.

As a user is progressing through a game play of a video game that may present multiple options giving different results, it may be difficult to decide in which direction to steer the game play. For example, though a user may want to avoid directions that do not provide any appreciable advancement in the game play, without prior knowledge gained through outside sources the user cannot avoid a particular direction that results in a dead-end. In some cases, the user may exhaust all possible directions that a video game may present in a certain portion of the game before discovering the proper direction that gives a result advancing the game play. It may be desirable to avoid playing all possible directions in a video game.

It is in this context that embodiments of the disclosure arise.

SUMMARY

Embodiments of the present disclosure relate to systems and methods for saving snapshots generated at various points during game plays by multiple users of a video game, generating a timeline that is displayable to a user during game play of the video game, and wherein a snapshot is used to jump to the game play by the same or another user beginning at a point corresponding to the selected snapshot. Other embodiments of the present disclosure relate to systems and method for providing for a user to jump into the stored game play of a player participating in a gaming application via a video recording of the stored game play, particularly when executed on a cloud-based gaming system. Still other embodiments of the present disclosure relate to systems and methods for implementing a companion application supporting the game play of a user, wherein the companion application provides information relating to the game plays of the user and other players, all simultaneously playing the same gaming application. Several inventive embodiments of the present disclosure are described below.

In one embodiment, a method for navigating through a gaming world is disclosed. The method includes capturing a plurality of snapshots generated from a plurality of instances of a video game executed in association with a plurality of users. The method further includes displaying a first timeline of a first user playing the video game, wherein the first timeline includes snapshot images of at least one user progressing through the video game in relation to a currently rendered image of a first instance of the video game executing in association with the first user. The method also includes displaying in a plurality of first thumbnails a plurality of first snapshot images associated with the first user in the first timeline, wherein the plurality of first snapshots comprises at least one rendered image showing past progress of the first user in comparison to the currently rendered image. The method further includes displaying in a plurality of second thumbnails a plurality of second snapshots associated with a second user, wherein the plurality of second snapshots comprises at least one rendered image showing progress of the second user at a point in the video game after the currently rendered image.

In another embodiment, a method for navigating through a gaming world is disclosed. The method includes executing a first instance of a video game on a game cloud system in association with a first user playing the video game. The method includes capturing a plurality of first snapshots of a first plurality of rendered images generated in association with execution of the first instance of the video game, wherein each of the first snapshots is associated with a unique point of progress in the video game. The method further includes capturing a plurality of second snapshots of a second plurality of rendered images generated in association with execution of a second instance of the video game in association with a second user playing the video game. The method further includes displaying a timeline showing progress of the first user and the second user playing the video game, the timeline displayed simultaneously with a currently rendered image generated from execution of the first instance.

In still another embodiment, a game cloud system configured for navigating through a gaming world is disclosed. The game cloud system includes a game server configured to manage a plurality of virtual gaming engines configured to execute a plurality of instances of a video game in association with a plurality of users playing the video game, wherein the virtual gaming engines are configured to capture a plurality of snapshots of rendered images generated from executing the plurality of instances, wherein a corresponding snapshot enables execution of an instance of the video game beginning from the corresponding snapshot. The game cloud system includes a snapshot datastore for storing the plurality of snapshots. The game cloud system includes a first virtual gaming engine configured to execute a first instance of the video game in association with a first user, wherein the first virtual gaming engine is configured to generate a first timeline of the first user playing the video game, wherein the first timeline includes a plurality of first snapshot images including at least one rendered image showing past progress of the first user in comparison to a currently rendered image of the first instance, and a plurality of second snapshots associated with a second user, wherein the plurality of second snapshots includes at least one rendered image showing progress of the second user at a point in the video game after the currently rendered image.

In another embodiment, a method for navigating through a gaming world is disclosed. The method includes executing a video game via a streaming gaming service, the video game being rendered on a display of a user device communicating through a network, the user device associated with a first user. The method includes generating a plurality of scenes of the video game for the display of the user device, the scenes progressing through different paths of the video game. The method includes generating a timeline for display along with a currently rendered scene, wherein the timeline includes a plurality of first thumbnails showing snapshot images associated with progression through the video game by the first user, wherein the timeline includes a plurality of second thumbnails showing snapshot images associated with future progression through the video game by a second user, wherein selection of a first thumbnail in the plurality of second thumbnails enables jumping into a future state of the video game as rendered for the second user.

In one embodiment, a method for gaming is disclosed. The method includes delivering over a network to a client device associated with a user a video recording of game play of a player for a gaming application, wherein the video recording is associated with a snapshot captured at a first point in the game play of the player. The method includes receiving from the client device selection of a jump point in the game play. The method includes initiating an instance of the gaming application based on the snapshot, wherein the instance instantiates a jump game play. The method includes accessing a sequence of input commands used to direct the game play, wherein the sequence of input commands is associated with the snapshot. The method includes generating at the instance of the gaming application a plurality of image frames based on the sequence of input commands for rendering at the client device. The plurality of image frames replays the game play of the player from the first point to the jump point. The method includes handling input commands from the client device for the instance of the gaming application in the jump game play beginning from the jump point.

Another method for gaming is disclosed. The method includes initiating an instance of a gaming application based on an initiating snapshot captured at a first point in a game play of a player. The method includes accessing a sequence of input commands associated with the snapshot and used to direct the game play. The method includes generating at the instance of the gaming application a plurality of image frames based on the sequence of input commands for rendering at a client device of a user, wherein the plurality of image frames replays the game play from the point in the game play. The method includes receiving an initiation request to begin a jump game from the client device corresponding to a first image frame in the plurality of image frames, wherein the first image frame corresponds to a jump point in the game play. The method includes handling input commands from the client device at the instance of the gaming application executing the jump game play beginning from the jump point.

In another embodiment, a game cloud system configured for gaming is disclosed. The game cloud system includes a game server configured to manage a plurality of virtual gaming engines configured to execute a plurality of instances of a gaming application in association with a plurality of users playing the gaming application, wherein the virtual gaming engines are configured to capture a plurality of snapshots of rendered images generated from executing the plurality of instances, and to capture information related to each of the plurality of snapshots, wherein information related to a corresponding snapshot enables execution of an instance of the gaming application beginning from the corresponding snapshot. The game cloud system includes a snapshot datastore for storing the plurality of snapshots, and a user datastore for storing the information. The game cloud system includes a virtual gaming engine that is configured to deliver over a network to a client device associated with a user a video recording of game play of a player for a gaming application. The video recording is associated with a snapshot captured at a first point in the game play of the player. The virtual gaming engine is configured to receive from the client device selection of a jump point in the game play. The virtual gaming engine is configured to initiate an instance of the gaming application based on the snapshot, wherein the instance instantiates a jump game play. The virtual gaming engine is configured to access a sequence of input commands used to direct the game play, wherein the input commands are associated with the snapshot. The virtual gaming engine is configured to generate at the instance of the gaming application a plurality of image frames based on the sequence of input commands for rendering at the client device. The image frames replays the game play from the first point to the jump point. The virtual gaming engine is configured to handle input commands from the client device at the instance of the gaming application executing the jump game play beginning from the jump point.

In still another embodiment, a method for gaming that includes the implementation of a companion application supporting the game play of a first user is disclosed, wherein the companion application provides information relating to the game plays of a plurality of users, all simultaneously playing the same gaming application. The method includes establishing a first communication channel with a first computing device associated with a first user. The first communication channel is configured for implementing a first instance of a gaming application in association with a first game play of the first user. The method includes establishing a second channel with a second computing device associated with the first user. The first and second channels are configured within one or more communication networks. The method includes generating an interface including information related to the first game play of the first user and second game play of a second user playing the gaming application. The interface implements the companion application. The method includes delivering the interface and the information over the second channel to the second computing device for display concurrent with the first game play of the first user.

In another embodiment, another method for gaming that implements a companion application supporting the game play of a first user is disclosed, wherein the companion application provides information relating to the game plays of a plurality of users, all simultaneously playing the same gaming application. The method includes establishing a first instance of a gaming application in association with a first game play of a first user, wherein the first instance is executable within a cloud-based gaming system. The method includes establishing a second instance of a gaming application in association with a second game play of a second user, wherein the second instance is executable within the cloud-based gaming system. Both game plays as executed within the first and second instances are occurring simultaneously. The method includes determining that the first user and the second user have a friend relationship and that both are playing the gaming application based on user profiles of the first user and the second user. The method includes establishing a first communication channel with a first computing device associated with the first user, wherein the first communication channel is configured for implementing the first instance of a gaming application. The method includes establishing a second channel with a second computing device associated with the first user. The first and second channels are configured within one or more communication networks. The method includes generating an interface including information related to the first game play of the first user and second game play of a second user playing the gaming application. The interface implements the companion application. The method includes delivering the interface and the information over the second channel to the second computing device for display concurrent with the first game play of the first user.

In another embodiment, a game cloud system configured for gaming is disclosed. The game cloud system includes a game server configured to manage a plurality of virtual gaming engines configured to execute a plurality of instances of a gaming application in association with a plurality of users playing the gaming application, wherein the virtual gaming engines are configured to capture a plurality of snapshots of rendered images generated from executing the plurality of instances, and to capture information related to each of the plurality of snapshots, wherein information related to a corresponding snapshot enables execution of an instance of the gaming application beginning from the corresponding snapshot. The game cloud system includes a snapshot datastore for storing the plurality of snapshots, and a user datastore for storing the information. The game cloud system includes a first virtual gaming engine configured to establish and execute a first instance of the gaming application in association with a first game play of a first user. The game cloud system includes a second virtual gaming engine configured for establishing and executing a second instance of the gaming application in association with a second game play of a second user. The game cloud system includes a companion application generator configured for determining that the first user and the second user have a friend relationship and that both are playing the gaming application, wherein the determination is based on user profiles of the first user and the second user. The companion application generator is further configured for establishing a first communication channel with a first computing device associated with the first user, wherein the first communication channel is configured for implementing the first instance of a gaming application. The companion application generator is further configured for establishing a second channel with a second computing device associated with the first user. The first and second channels are configured within one or more communication networks. The companion application generator is further configured for generating an interface including information related to the first game play of the first user and second game play of a second user playing the gaming application. The interface implements the companion application. The companion application generator is further configured for delivering the interface and said information over the second channel to the second computing device for display.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 12A is an illustration of a plurality of video frames in a video recording of a stored game play of a player participating in a gaming application, wherein some video frames are associated with corresponding snapshots, wherein selection of a video frame instantiates an instance of a gaming application to execute a jump game play based on an associated snapshot captured during game play of the player so that the jump game play is playable by the requesting user, in accordance with one embodiment of the present disclosure.

DETAILED DESCRIPTION

Figure 1:
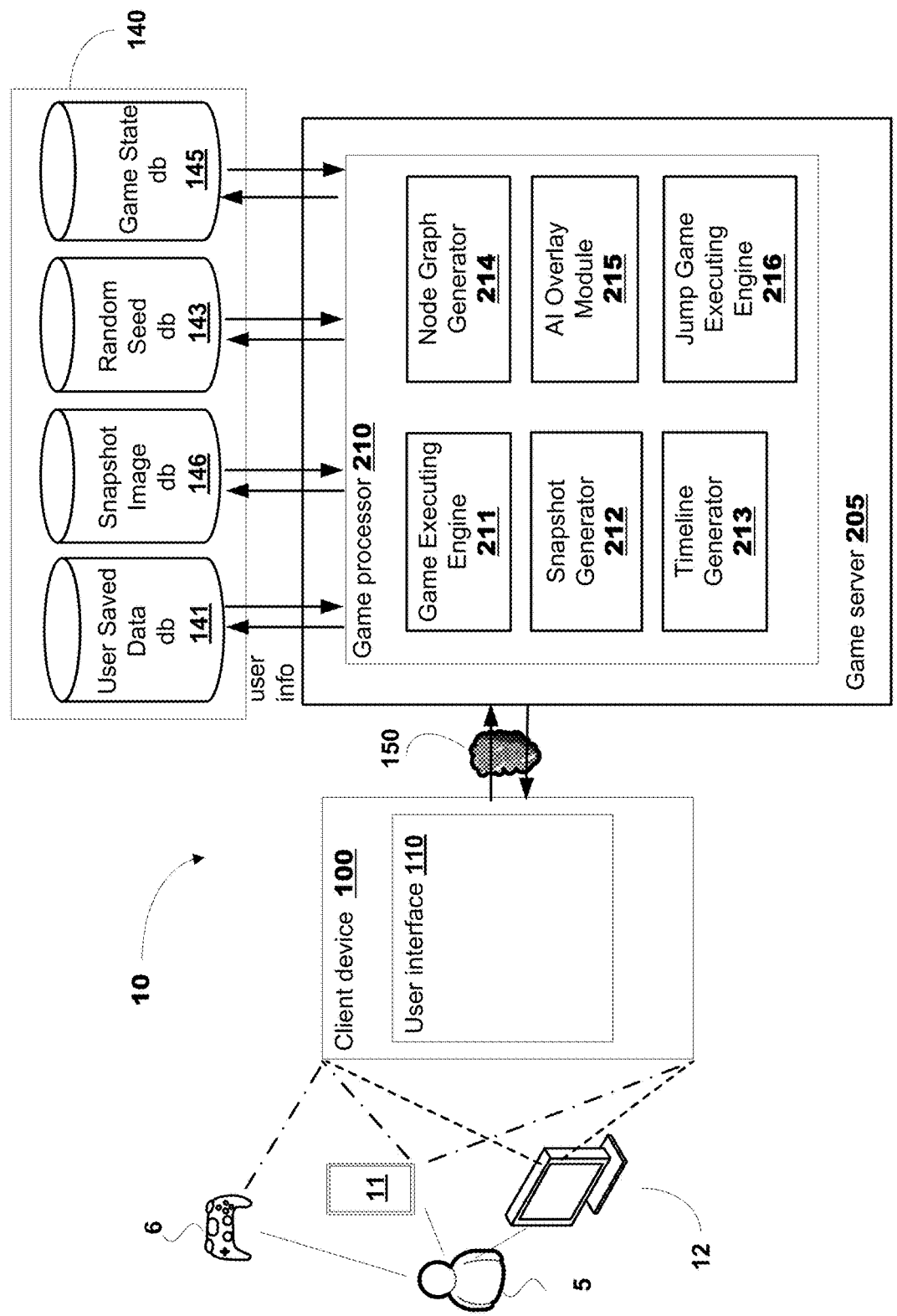
FIG. 1 illustrates a system used for saving of snapshots generated during game plays of a video game of multiple users executed over a cloud game network, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for the saving of snapshots that are generated during game plays of a video game of multiple users, navigating through a video game, previewing a video game, and jumping to a selected point in the video game to experience the game play of another user, particularly when executed on a cloud-based gaming system. The snapshots may be displayed in a timeline for a user playing the video game. A selected snapshot in the timeline contains metadata and/or information enabling the instantiation of an instance of the video game at a jump point in the video game corresponding to the selected snapshot. The instance of the video game beginning at the jump point is executed in association with an original user generating the selected snapshot in a previously executed game play, even though the requesting user may be different than the original user. Embodiments of the present disclosure provide for a way to load and execute an instance of a video game of the same or another user that previously was unavailable. In that manner, the user is able to actively preview game plays of other users without jeopardizing his or her own game play. Also, the user is able to actively preview his or her own previous game play without jeopardizing his or her own current game play. It is in this context that embodiments of the disclosure arise.

Accordingly, embodiments of the present disclosure provide for additional uses of a gaming application. For example, embodiments of the present disclosure provide for a user to jump into any part of a gaming application based on previous game plays of that gaming application. For example in some embodiments, through selection of a snapshot image (e.g., screenshot), corresponding snapshot information is accessed to enable the jump into that gaming application. Still other embodiments provide for a user to jump into any part of a gaming application based on video recordings of previous game plays of that gaming application. For example, through selection of a video image (e.g., that may correspond to a snapshot image) from the video recording, corresponding snapshot information associated with the video image (or the snapshot image) is accessed to enable the jump into that gaming application. In that manner, the user is able to quickly play mini-sections of the gaming application for enjoyment, or to discover how to successfully navigate through difficult sections of the gaming application. Access to the mini-sections is accomplished without the user having to load the gaming application using an initial start-up sequence. Furthermore, older applications that have fallen out of favor will generate new interest, as the user need not play the entire game to get to the interesting sections (e.g., battling level bosses, or the ultimate boss), but can go directly to those interesting sections for immediate game play. Still other embodiments provide the above accomplishments, and provide additional benefits and advantages including better utilization of game servers, since instead of executing an initialization sequence from the beginning (e.g., when the user first loads a gaming application from scratch), the game server need only execute the gaming application beginning directly from a mid-point or jump-point. As such, by directly uploading the code necessary to begin the game from the selected jump point, the game server skips the initialization sequence, and also any further executable sequence to navigate to the jump point in the gaming application.

With the above general understanding of the various embodiments, example details of the embodiments will now be described with reference to the various drawings.

Throughout the specification, the reference to "video game" is meant to represent any type of interactive application that is directed through execution of input commands. For illustration purposes only, an interactive application includes applications for gaming, word processing, video processing, video game processing, etc. Further, the terms video game and gaming application are interchangeable.

Snapshot Capture and Game Play Access

FIG. 1 illustrates a system used for saving of snapshots generated during game plays of a video game of multiple users executed over a cloud game network, previewing game plays of a video game of one or more users, navigating through a video game, and jumping to a selected point in the video game to experience the game play of the same or another user, in accordance with one embodiment of the present disclosure. In some embodiments, the cloud game network may include a plurality of virtual machines (VMs) running on a hypervisor of a host machine, with one or more virtual machines configured to execute a game processor module utilizing the hardware resources available to the hypervisor of the host.

As shown, system 10 includes a game server 205 executing the game processor module 210 that provides access to a plurality of interactive video games. Game server 205 may be any type of server computing device available in the cloud, and may be configured as one or more virtual machines executing on one or more hosts. For example, game server 205 may manage a virtual machine supporting the game processor 210.

Client device 100 is configured for requesting access to video games over a network 150, such as the internet, and for rendering instances of video games executed by the game server 205 and delivered to the display device 12 associated with a user 5. For example, user 5 may be interacting through client device 100 with an instance of a video game executing on game processor 210. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Client device 100 is configured for receiving rendered images delivered by the game server 205, and for displaying the rendered images on display 12. For example, the rendered images may be associated with an instance of a video game executing on game executing engine 211 of game server 205 in association with user 5. In particular, client device 100 is configured to interact with the instance of the video game associated with game play of user 5, such as through input commands that are used to drive game play.

Further, client device 100 is configured to interact with the game server 205 to capture and store snapshots of the game play of user 5 when playing a video game. In addition, client device 100 is configured to interact with game server 205 to display a timeline including snapshots of the game play of user 5, as well as snapshots of saved game plays of other users playing the same video game. Each snapshot enables user 5 to jump into a saved game play at a jump point in the video game corresponding to the selected snapshot, wherein the saved game play may be associated with another user different than user 5, in one embodiment.

More particularly, game processor 210 of game server 205 is configured to generate snapshots of the game play of user 5 when playing the video game. Other game processors of game server 205 associated with other virtual machines are configured to execute instances of the video game associated with game plays of other users and to capture snapshots during those game plays. As previously introduced, an instance of the video game is executing on the game executing engine 211 in association with game play of the user 5.

Snapshot generator 212 is configured to capture a plurality of snapshots generated from the game play of user 5. Each snapshot provides information that enables execution of an instance of the video game beginning from a point in the video game associated with a corresponding snapshot. The snapshots are automatically generated during game play of the video game by user 5. Portions of each of the snapshots are stored in relevant databases independently configured or configured under data store 140, in embodiments. In another embodiment, snapshots may be generated manually through instruction by user 5. In that manner, any user through selection of a corresponding snapshot may jump into the game play of user 5 at a point in the video game associated with the corresponding snapshot. Game processor 210 is configured to access information in database 140 in order to enable the jumping into a saved game play of any user based on a corresponding snapshot. That is, the requesting user is able to begin playing the video game at a jump point corresponding to a selected snapshot using the game characters of the original user's game play that generated and saved the snapshot.

In particular, each snapshot includes metadata and/or information to enable execution of an instance of the video game beginning at a point in the video game corresponding to the snapshot. For example, in the game play of user 5, a snapshot may be generated at a particular point in the progression of the video game, such as in the middle of a level. The relevant snapshot information is stored in one or more databases of database 140. Pointers can be used to relate information in each database corresponding to a particular snapshot. In that manner, another user wishing to experience the game play of user 5 may select a snapshot corresponding to a point in the video game of interest.

The snapshot includes a snapshot image of the scene that is rendered at that point. The snapshot image is stored in snapshot image database 146. The snapshot image presented in the form of a thumbnail in a timeline provides a view into the game play of a user at a corresponding point in the progression by the user through a video game.

The snapshot also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at the point corresponding to the snapshot. The game state data is stored in game state database 145.

The snapshot also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the user 5 when playing the game, game level, character attributes, character location, number of lives left, the total possible number of lives available, armor, trophy, time counter values, etc. User saved data may also include user profile data that identifies user 5, for example. User saved data is stored in database 141.

In addition, the snapshot also includes random seed data that is generated by artificial intelligence (AI) module 215. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. As an illustration, these AI characters may randomly walk the streets in a city scene. In addition, other objects maybe generated and presented in an overlay. For instance, clouds in the background and birds flying through space may be generated and presented in an overlay. The random seed data is stored in random seed database 143.

In that manner, another user wishing to experience the game play of user 5 may select a snapshot corresponding to a point in the video game of interest. For example, selection of a snapshot image presented in a timeline or node in a node graph by a user enables the jump executing engine 216 of game processor 210 to access the corresponding snapshot, instantiate another instance of the video game based on the snapshot, and execute the video game beginning at a point in the video game corresponding to the snapshot. In that manner, the snapshot enables the requesting user to jump into the game play of user 5 at the point corresponding to the snapshot.

Game processor 210 includes a timeline generator 213 that is displaying a timeline of user 5 playing the video game. The timeline includes snapshot images of at least one user (e.g., user 5 and/or other users) progressing through the video game, wherein the snapshot images are presented in relation to a currently rendered image of the instance of the video game executing in association with user 5. Each snapshot image corresponds to a particular snapshot that is captured at a particular point in the progression of the video game by user 5. For example, snapshots and snapshot images generated in association with the game play of user 5 correspond to points in the video game occurring before a currently rendered image of an instance of the video game executing in association with the game play of user 5. That is, user 5 previously played through those points in the video game, and multiple snapshots and snapshot images were generated corresponding to those points.

In addition, snapshots and their corresponding snapshot images generated in association with the game play of a second user may correspond to points in the video game occurring before or after a currently rendered image of the game play of user 5. That is, the second user may have progressed further than user 5 when playing the video game. As such, snapshots corresponding to the game play of the second user may occur at points in the video game before the currently rendered image associated with the game play of user 5, or may occur at points after the currently rendered image. The timeline may include snapshot images corresponding to points in the video game occurring after the currently rendered image, and/or may include snapshot images corresponding to points in the video game occurring before the currently rendered image.

Snapshots presented in the timeline may be used to access game plays of other users by user 5, in one embodiment. That is, selection of a selected snapshot in the timeline enables user 5 to jump into the game play of another user at the point corresponding to the snapshot. For example, the jump game executing engine 216 collects the snapshot (e.g., metadata and/or information) from the various databases (e.g., from database 140) in order to the begin executing the video game at the point corresponding to the selected snapshot. In one embodiment, the game play of user 5 is unaffected by jumping to the game play of another user.

In another embodiment, snapshots presented in the timeline may be used by user 5 to access a point in the user's own game play that occurs before the currently rendered image. For example, a snapshot may be generated in the game play of user 5, and presented in the timeline. Selection of the snapshot by user 5 enables executing engine 216 to collect the snapshot (e.g., metadata and/or information) from the various databases (e.g., from database 140) in order to begin executing the video game at the previous point corresponding to the selected snapshot. In that manner, user 5 may go back and replay certain portions of the video (e.g., a previous level). In one embodiment, the current game play of user 5 is unaffected by jumping to a previous game play of the same user.

Game processor 210 also includes a node graph generator 214. As user 5 progresses through the video game, a path through the game is generated. Another user may generate a different path through the video game, especially if the video game is complex. The path may be part of the universal logical path established by the video game, wherein the universal logical path includes all paths that any user may take when playing the video game. As such, the path associated with the game play of user 5 may be a subset of the universal logical path, and defines the progress of user 5 through the video game. Logical nodes may be defined at various points in the universal logical path. For instance, by way of illustration nodes may be established at the start of game, start of level, end of game, end of level, forks allowing the user to select between two or more optional paths, critical points in the video game, etc.

In addition, nodes may be defined at various points in the path associated with the game play of user 5, or more generally in a path associated with the game play of any user. For example, nodes may be defined in association with a snapshot. These nodes may be defined at periodic intervals (e.g., every minute, 5 minutes, 10 minutes, etc.). In addition, these nodes may be manually defined by the user. For illustration, these nodes may also be established at the start of game, start of level, end of game, end of level, forks allowing the user to select between two or more optional paths, critical points in the video game, etc.

Figure 2:
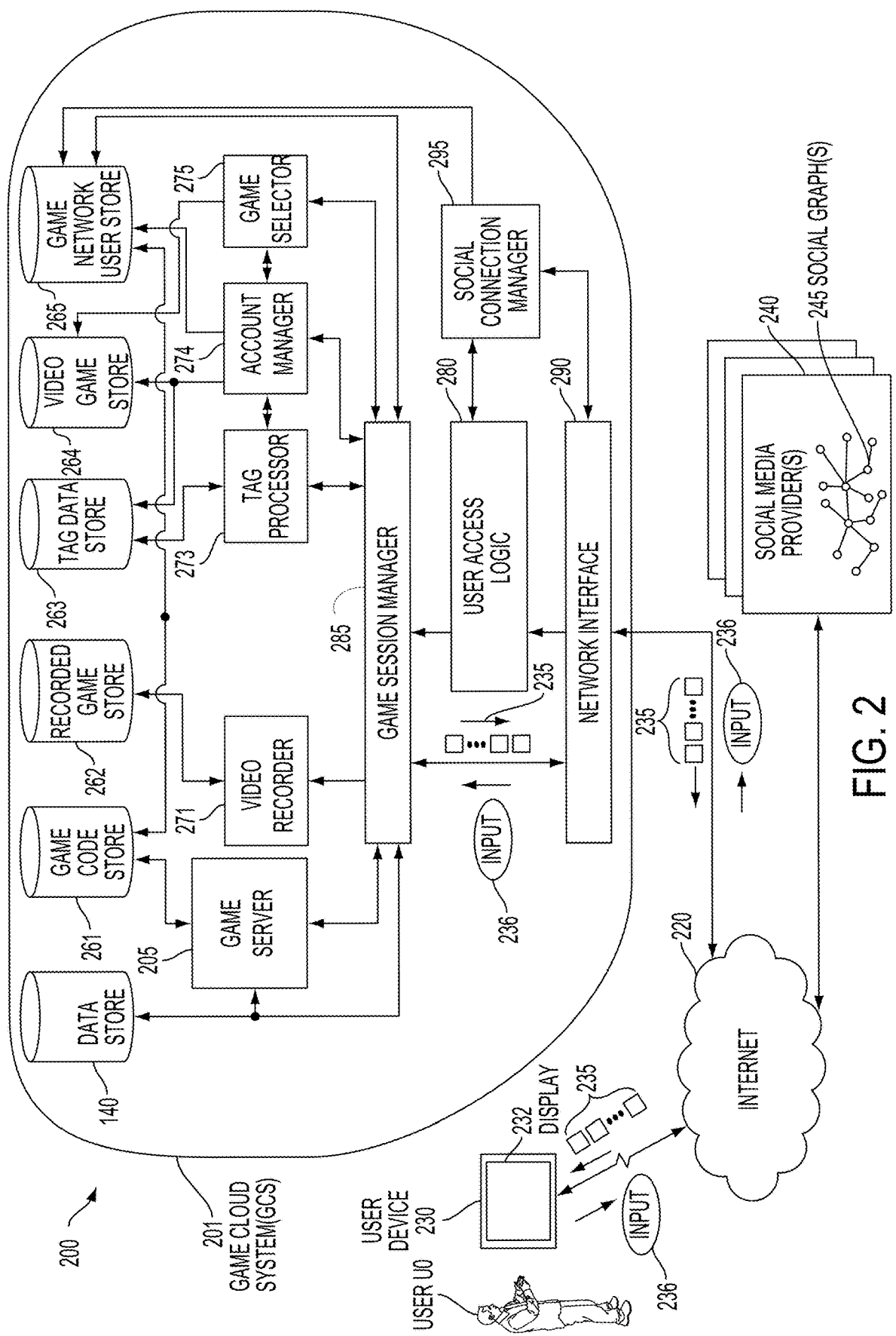
FIG. 2 illustrates a system diagram for enabling access and playing of video games stored in a game cloud system (GCS), storing of snapshots generated in association with game plays, previewing of stored game plays via snapshots, navigation through a video game via snapshots, and jumping into stored game plays via snapshots, in accordance with an embodiment of the disclosure.

FIG. 2 illustrates a system diagram 200 for enabling access and playing of video games stored in a game cloud system (GCS) 201, in accordance with an embodiment of the disclosure. Generally speaking, game cloud system GCS 201 may be a cloud computing system operating over a network 220 to support a plurality of users. Additionally, GCS 201 is configured to save snapshots generated during game plays of a video game of multiple users, wherein a snapshot can be used to initiate an instance of the video game for a requesting user beginning at a point in the video game corresponding to the snapshot. In addition, GCS 201 through the use of snapshots enables a user to navigate through a video game, and preview past and future scenes of a video game. Further, the snapshots enable a requesting user to jump to a selected point in the video game through a corresponding snapshot to experience the game play of another user. In particular, system 200 includes GCS 201, one or more social media providers 240, and a user device 230, all of which are connected via a network 220 (e.g., internet). One or more user devices may be connected to network 220 to access services provided by GCS 201 and social media providers 240.

In one embodiment, game cloud system 201 includes a game server 205, a video recorder 271, a tag processor 273, and account manager 274 that includes a user profile manager, a game selection engine 275, a game session manager 285, user access logic 280, a network interface 290, and a social media manager 295. GCS 201 may further include a plurality of gaming storage systems, such as a game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 201 is a system that can provide gaming applications, services, gaming related digital content, and interconnectivity among systems, applications, users, and social networks. GCS 201 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_O$ is able to access services provided by GCS 201 via the game session manager 285, wherein user $U_O$ may be representative of user 5 of FIG. 1. For example, account manager 274 enables authentication and access by user $U_O$ to GCS 201. Account manager 274 stores information about member users. For instance, a user profile for each member user may be managed by account manager 274. In that manner, member information can be used by the account manager 274 for authentication purposes. For example, account manager 2274 may be used to update and manage user information related to a member user. Additionally, game titles owned by a member user may be managed by account manager 274. In that manner, video games stored in data store 264 are made available to any member user who owns those video games.

In one embodiment, a user, e.g., user $U_O$, can access the services provided by GCS 201 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 201 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer.

In one embodiment, user device 130 is configured to communicate with GCS 201 to enable user $U_0$ to play a video game. For example, user $U_0$ may select (e.g., by game title, etc.) a video game that is available in the video game data store 264 via the game selection engine 275. In that manner, the selected video game is enabled and loaded for execution by game server 205 on the GCS 201. In one embodiment, game play is primarily executed in the GCS 201, such that user device 230 will receive a stream of game video frames 235 from GCS 201, and user input commands 236 for driving the game play is transmitted back to the GCS 201. The received video frames 235 from the streaming game play are shown in display 232 of user device 230.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 210 to execute the game code of the chosen game title from game code store 261. After a game session is initiated, game session manager 285 may pass the game video frames 235 (i.e., streaming video data), via network interface 290 to a user device, e.g., user device 230.

During game play, game session manager 285 may communicate with game processor 210, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 204 to deliver and obtain user input commands 236 that are used to influence the outcome of a corresponding game play of a video game. Input commands 236 entered by user $U_0$ may be transmitted from user device 230 to game session manager 285 of GCS 201. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a video game may be used to enable multiple features that may be available to the user.

Because game plays are executed on GCS 201 by multiple users, information generated and stored from those game plays enable any requesting user to experience the game play of other users, particularly when game plays are executed over GCS 201. In particular, GCS 201 is configured to save snapshots generated by the game play of users playing video games through GCS 201. In the case of user $U_0$, user device provides an interface allowing user $U_0$ to engage with the video game during the game play. Snapshots of the game play by user $U_0$ is generated and saved on GCS 201.

Also, user device 130 is configured to provide an interface allowing user $U_0$ to preview the video game using the snapshots. For example, by viewing snapshot images of game plays or one or more users, user $U_0$ is able to preview one or more portions of the video game at any point in the video game, as long as another user has already played through that point and generated a snapshot. Moreover, as will be described in more detail below snapshots and/or snapshot images presented in a timeline may provide to a user a preview into the video game at various points without necessarily playing the video game at those points. For instance, by viewing snapshots and/or snapshot images, the timeline may illustrate in which direction a video game would follow at a particular point or points in the video game. If the direction leads to a dead-end or undesirable result to the user, the user may choose to avoid taking paths in the video game leading to those points corresponding to the snapshots. On the other hand, if the direction leads to a desirable result (e.g., loot, interesting battle or interaction, etc.), the user may choose to take paths in the video game leading to those points corresponding to the snapshots. In addition, user device 130 is configured to provide an interface allowing user $U_0$ to navigate through the video game. For example, as will be described in more detail below snapshots may be used to generate a node graph showing paths taken by one or more users progressing through the video game. The user may interface with the node graph to display the snapshots and/or snapshot images at selected nodes in the node graph which provides to a user a preview into the video game at various nodes of the video game without necessarily playing the video game at those points. If the direction in the node graph leads to a dead-end or undesirable result to the user, the user may choose to avoid taking node paths in the video game leading to those points corresponding to the nodes. On the other hand, if the direction in the node graph leads to a desirable result, the user may choose to take node paths in the video game leading to those points corresponding to the nodes.

Further, user device 130 is configured to provide an interface that enables the jumping to a selected point in the video game using a snapshot generated in the game play of user $U_0$ or another user. In that manner, user $U_0$ is able to experience the game play of any other user, or go back and review and/or replay his or her own game play. That is, a requesting user, via a snapshot of a corresponding game play, plays the video game using the characters used in and corresponding to that game play.

FIGS. 3-8 are described within the context of a user playing a video game. In general, the video game may be any interactive game that responds to user input. For purposes of illustration only, the video game described in relation to FIGS. 3-8 may be an adventure game, wherein the character encounters various obstacles and challenges while traveling through the world. The character may be traveling on foot, or through any mechanized means in the video game. In addition, the character may encounter one or more challenges that could lead to delays when progressing through the video game from start to end.

Throughout the specification, the use of time in one or more timelines of FIGS. 3-8 is meant to show progression through the video game, and not necessarily a measure of how long the user plays the video game.

Figure 3A:
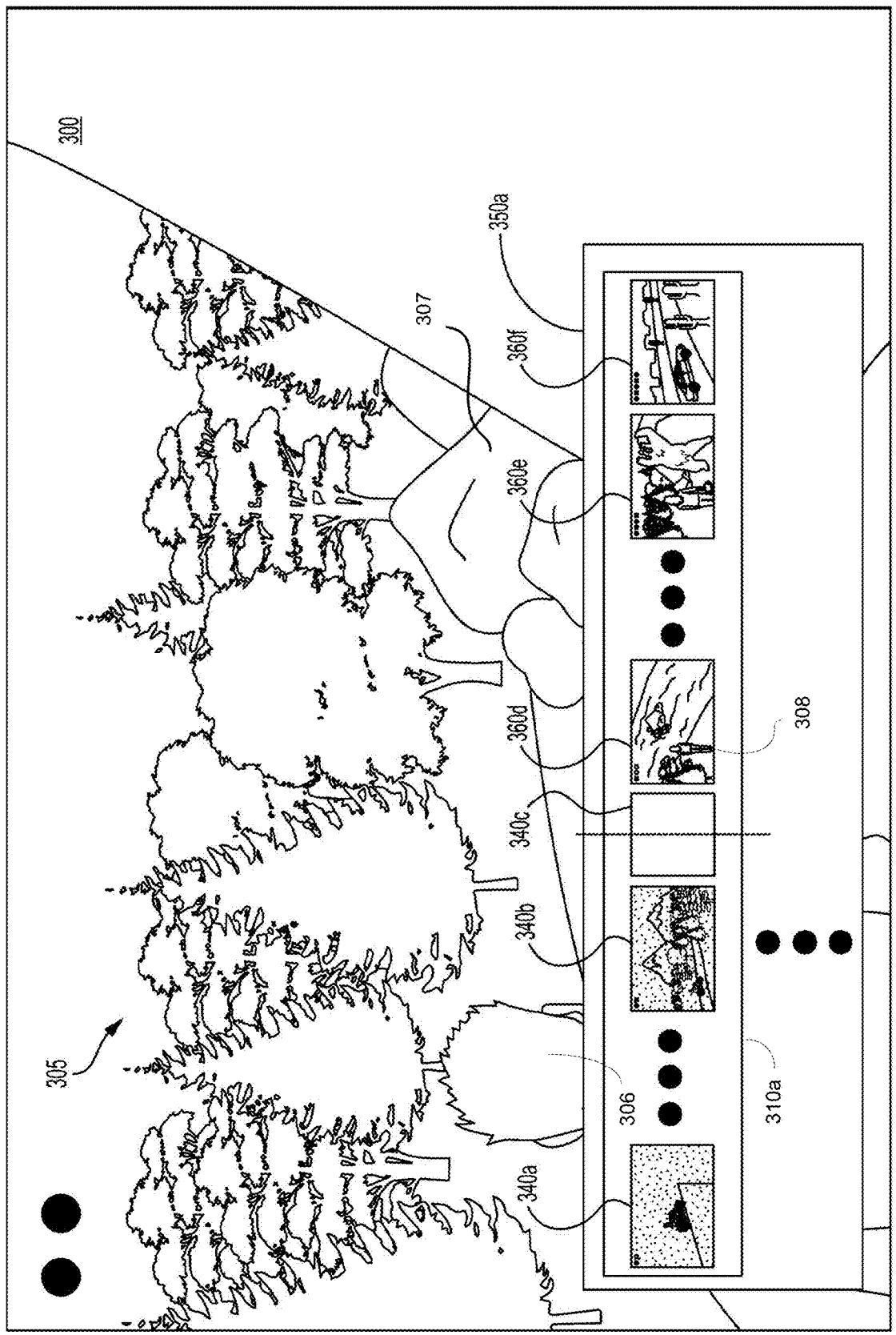
FIG. 3A is an illustration of a timeline displayed during game play of a video game by a user, wherein the timeline shows snapshot images of game play of the user, as well as snapshot images of game play of another user, in accordance with one embodiment of the present disclosure.

FIG. 3A is an illustration of a timeline 310a displayed during game play of a video game by a user, wherein the timeline shows snapshot images of game play of the user, as well as snapshot images of game play of another user, in accordance with one embodiment of the present disclosure. Further, the timeline 310a is generated by timeline generator 213 of game processor 210 of game server 205 of the GCS 201, in one embodiment. Timeline 310a can be used to quickly preview previous game play by the user, as well as game play of one or more other users.

Window 350a and timeline 310a are displayed while the game executing engine 211 of game processor 210 instantiates an instance of the video game. For example, window 300 shows a rendered image 305 during the game play of a user for a particular video game. The rendered image is associated with a current point in the progression of the user through the video game. As shown, in rendered image 305 the character 306 representing the user in the game play is on a motorcycle. The character 306 is riding on a road through mountainous terrain, but has encountered a rock fall 307. In the game play of the user, the character is chosen to be male with short, spiky hair as shown in rendered image 305. At this point, the user may be frustrated with the progress through the video game, and may want to explore avenues to maneuver around the rock fall. For instance, the user may want to preview game plays of other users to explore solutions allowing the user to go past the rock fall, and to explore future experiences in the video game at points beyond the current progression of the user as represented by the rendered image 305. Exploration of these other game plays may be enabled through the timeline 310a, and more specifically through snapshot images, and their corresponding snapshots, as displayed in timeline 310a. As previously introduced, a snapshot enables execution of an instance of a corresponding video game beginning from a point in the video game associated with the corresponding snapshot. In particular, further selection of a snapshot image presented in a timeline or node in a node graph by a user enables the jump executing engine 216 of game processor 210 to access the corresponding snapshot, instantiate another instance of the video game based on the snapshot, and execute the video game beginning at a point in the video game corresponding to the snapshot.

Timeline 310a is displayed in window 350a. In general, multiple timelines including snapshot images of one or more game plays of one or more users may be displayed in window 350a. As shown in FIG. 3A, window 350a may display a single timeline 310a, wherein timeline 310a includes snapshot images of game play by the user, as well as snapshot images of game play by another user. The snapshot images are presented in thumbnails and/or windows and displayed in relation to the currently rendered image of the video game in the game play of the user. For example, snapshot images occurring before a point in the video game represented by currently rendered image 305 may be displayed to the left of blank thumbnail 340c, and snapshot images occurring after the point may be displayed to the right of thumbnail 340c. Window 350a may also display additional timelines including snapshot images of one or more game plays of a video game by one or more users, as will be further described in relation to FIG. 3B. The timelines show progression through the video game, and not necessarily a measure of how long the user plays the video game.

In particular, timeline 310a includes snapshot images for the game play by the user. For example, a plurality of snapshot images (e.g., images 340a, 340b, . . . ) corresponding to snapshots captured during the game play by the user is displayed in timeline 310a in thumbnails and/or windows. Viewed together the snapshot images give a quick history of the game play of the user. For instance, snapshot image 340a shows the character 306 jumping a motorcycle off a ramp or cliff. At this point in the game, the character 306 has 2 possible lives, as indicated by the two circles in the upper left corner of snapshot image 340a. Thereafter in the progression of the user through the video game, snapshot image 340b shows the character 306 (still with two possible lives) riding through the motorcycle through the forest, and is approaching a mountain. The currently rendered image 305 shown in window 300 shows that the character 306 has reached the mountain, and has approached the rock fall 307. At this point, character 306 has two possible lives.

Because rendered image 305 is currently displayed, and represents the progression of the user through the video game, only snapshot images representing previous game play by the user are displayed. These snapshot images typically represent points in the game that occur before a point represented by the currently displayed rendered image 305. For illustration purposes only, the total number of possible lives for a character gives a rough estimate of the progress through the video game for a user. However, some video games may allow for the user to progress back and forth, as the user plays the video game. In any case, only snapshot images corresponding to previously rendered images may be displayed in timeline 310a for the user, in one embodiment. These snapshot images are displayed in relation to the currently rendered image 305 in timeline 310a, which is represented by blank thumbnail 340c. For example, the snapshot images may be displayed to the left of blank thumbnail 340c. Further ordering may be achieved between two snapshot images by displaying a first snapshot image captured at first point in the video game to the left of a second snapshot image occurring at a second point that occurs after the first point in the general progression of a user through the video game. In another implementation, thumbnail 340c may be populated with rendered image 305 to show current progress of the user in the timeline 310a.

Snapshot images representing points in the video game occurring before the currently rendered image 305 may be displayed in a manner distinguishing them from snapshot images representing points in the video game occurring after the currently rendered image 305, i.e., future points. In one embodiment, the snapshot images may be grayed out. That is, the snapshot images corresponding to points occurring before the currently rendered image 305 are displayed with a lower intensity and/or resolution than snapshot images corresponding to points occurring later in progression through the video game. Other embodiments are supported, such as showing the snapshot images with cross-hatching, or blurring the snapshot images, etc.

Further, timeline 310a includes snapshot images for the game play by another user. This other user may be a friend which is discovered through social media manager 295, in one embodiment. The snapshot images may also correspond to game play of random users, or users of high interest, such as users with high scores in the video game. For purposes of illustration only, in the examples provided in relation to FIGS. 3-8, these other users are referred to as friends of the current user, such as a first friend F1, a second friend F2 and a third friend F3. The first friend F1 is playing a character 308 that is depicted as a woman with long hair. Second friend F2 is playing a character 309 that is depicted as a male with full head of hair. Third friend F3 is playing a character 303 that is depicted as a bald male.

In particular, timeline 310a includes snapshot images for the game play by a second user (e.g., friend F1 playing a woman character 308). For example, a plurality of snapshot images (e.g., images 360d, 360e, 360f, ...) corresponding to snapshots captured during the game play by the second user is displayed in timeline 310a in thumbnails and/or windows. These snapshot images are displayed in relation to the currently rendered image 305. For example, snapshot images 360d, 360e, and 360f displayed to the right of blank thumbnail 340c occur at points in the video game after the currently rendered image 305. Though not shown in timeline 310a, snapshot images occurring at a point in the video game around or before the currently rendered image (e.g., snapshot images 360a, 360b, and 360c) may also optionally be shown, and are further described in relation to timeline 310b displayed in window 350b of FIG. 3B.

Viewed together the snapshot images give a quick history of the game play of the second user (e.g., friend F1) at points in the future that occur after the currently rendered image 305. For instance, snapshot image 360d shows the character 308 contemplating how to cross a river, and having three possible lives. Progressing further along in the video game, the character 308, now with four possible lives, is battling a bear in snapshot image 360e. Progressing even further along in the video game, character 308, now with five possible lives, is shown driving a car through the desert in snapshot image 360f.

In one embodiment, a timeline may be modified depending on the progression by the user through the video game, and the available snapshot images. For example, snapshot images that occur too far in the past (e.g., for the user or other users) in relation to the currently rendered image 305 may not be displayed, and snapshot images that occur too in the future (e.g., for the other users) may also may not be displayed. Further, as other users are changed and/or replaced, corresponding snapshot images are updated in the timeline.

Figure 3B:
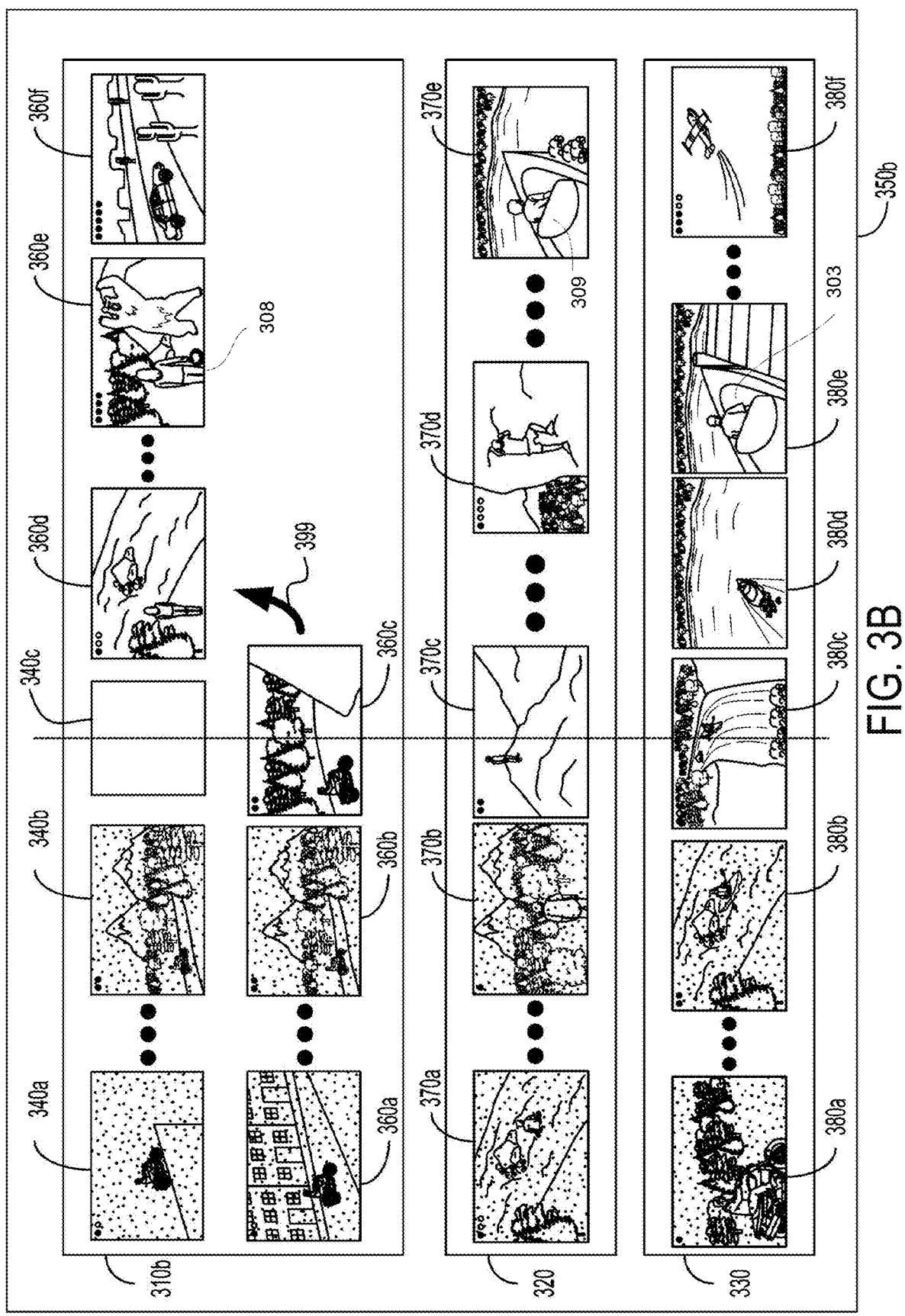
FIG. 3B is an illustration of one or more timelines displayed during game play of a video game by a user, wherein a timeline shows snapshot images of game play of the video game of one or more users, in accordance with one embodiment of the present disclosure.

FIG. 3B is an illustration of multiple timelines displayed during game play of a video game by a user, wherein a timeline shows snapshot images of game play of the video game of one or more users, in accordance with one embodiment of the present disclosure. The timelines are displayed in window 350b. In one embodiment, window 350b is displayed along with the currently rendered image 305 in the game play of a user. For example, timelines 310b, 320 and 330 are displayed in window 350b, and are generated by timeline generator 213 of game processor 210 of game server 205 of the GCS 201, in one embodiment. The timelines can be used to quickly preview previous game play by the user, as well as game play of one or more other users (e.g., friends, random users, users of interest, etc.).

As shown, timeline 310b includes snapshot images (e.g., 340a, 340b, ...) of game play by the user, as previously discussed in relation to FIG. 3A. These snapshot images may be displayed in thumbnails as shown in FIG. 3B, and are arranged in relation to the currently rendered image 305. For instance, these snapshot images are displayed to the left of the currently rendered image 305, and arranged generally with a first snapshot image located to the left of later occurring snapshot image, as previously described.

Further, timeline 310b includes a plurality of snapshot images (360a, 360b, 360c, 360d, 360e, 360f, ...) corresponding to snapshots captured during the game play by the second user (e.g., a first friend F1 playing woman character 308). These snapshot images are displayed in timeline 310b in thumbnails, and are arranged in relation to the currently rendered image 305, as previously described. More particularly, snapshot images, corresponding to game play by friend F1, occurring at a point in the video game around or before the currently rendered image (e.g., snapshot images 360a, 360b, and 360c) may also be optionally included below the snapshot images (e.g., 340a, 340b, ...) of the user. Snapshot images (e.g., 360a, 360b, ...) occurring at points in the video game progression before the currently rendered image may be arranged to the left of blank thumbnail 340c. As an indication of game progress, snapshot images 360a-c show the character having two possible lives. Snapshot image 360c occurs approximately at the same point of progression through the video game as currently rendered image 305, and is located approximately below blank thumbnail 340c. For example, both snapshot image 360c and currently rendered image 305 show corresponding characters each having two possible lives. Furthermore, snapshot images in timeline 310b may be arranged generally such that a first snapshot image is located to the left of a later occurring snapshot image, as previously described. Arrow 399 may link the snapshot images associated with the second user, friend F1.

Viewed together, the snapshot images give a quick history of the game play of the first friend F1. For instance, the character 308 of friend F1 is first shown riding a motorcycle on a downtown city street in snapshot image 360a. Thereafter in the progression of friend F1 through the video game, snapshot image 360b shows the character 308 (having two possible lives) riding through the motorcycle through the forest, and is approaching a mountain. Progressing further along in the video game, the character 308 is riding the motorcycle on a mountain road in snapshot image 360c. For example, the character 308 of friend F1 may have maneuvered around the rock fall that the character 306 of the user is currently encountering in rendered image 305. Later, the character 308 (having three possible lives) is shown approaching a river in snapshot image 360d. Progressing still further along, the character 308 (having four possible lives) is battling a bear in snapshot image 360e, and then later the character 308 (having five possible lives) is shown driving a car through the desert in snapshot image 360f.

Window 350b shows another timeline 320 that is associated with the game play of another user, such as a second friend F2. As shown, timeline 320 includes snapshot images (370a, 370b, 370c, 370d, 370e ...) of game play by friend F2. These snapshot images may be displayed in thumbnails, and are arranged in relation to the currently rendered image 305, in one embodiment. For instance, snapshot images (e.g., 370a, 370b, ...) occurring at points in the video game progression before the currently rendered image are arranged approximately to the left of blank thumbnail 340c. These snapshot images may be readily identified by graying out the displayed content, as previously described. Snapshot image 370c occurs approximately at the same point of progression through the video game as currently rendered image 305, and is located approximately below blank thumbnail 340c. Snapshot images (e.g., 370d, 370e, ...) occurring at points in the video game progression after the currently rendered image are arranged approximately to the right of blank thumbnail 340c. Furthermore, snapshot images in timeline 320 may be arranged generally such that a first snapshot image is located to the left of a later occurring snapshot image, as previously described.

Viewed together, the snapshot images give a quick history of the game play of the second friend F2. For instance, the character 309 (having two possible lives) of friend F2 is first shown fording a river in snapshot image 370a. Thereafter in the progression of friend F2 through the video game, snapshot image 370b shows the character 309 traversing through a forest on foot, and approaching a range of taller mountains. Still progressing further along, the character 309 (having two possible lives) is shown summiting a false mountain peak in snapshot image 370c. Still later, the character 309 (having four possible lives) is shown free climbing a face of a mountain in snapshot image 370d, and then later is shown crossing a lake by boat in snapshot image 370e.

Window 350b shows another timeline 330 that is associated with the game play of another user, such as a third friend F3. As shown, timeline 330 includes snapshot images (380a, 380b, 380c, 380d, 380e, 380f, . . . ) of game play by friend F3. These snapshot images may be displayed in thumbnails, and are arranged in relation to the currently rendered image 305, in one embodiment. For instance, snapshot images (e.g., 380a, 380b, . . . ) occurring at points in the video game progression before the currently rendered image are arranged approximately to the left of blank thumbnail 340c. These snapshot images may be readily identified by graying out the displayed content, as previously described. Snapshot image 380c occurs approximately at the same point of progression through the video game as currently rendered image 305, and is located approximately below blank thumbnail 340c. Snapshot images (e.g., 380d, 380e, 380f, . . . ) occurring at points in the video game progression after the currently rendered image are arranged approximately to the right of blank thumbnail 340c. Furthermore, snapshot images in timeline 320 may be arranged generally such that a first snapshot image is located to the left of a later occurring snapshot image, as previously described.

Viewed together, the snapshot images give a quick history of the game play of the third friend F3. For instance, the character 303 (having two possible lives) of friend F3 is first riding a motorcycle through the forest in snapshot image 380a. Thereafter in the progression of friend F3 through the video game, snapshot image 380b shows the character 303 (having two possible lives) fording a river. Still progressing further along, the character 3039 (having three possible lives) is shown kayaking down a waterfall in snapshot image 380c. Still later, the character 303 is shown crossing a lake by motor boat in snapshot image 380d, and then in snapshot image 390e the character 303 is shown docking boat. Even later in the progression, character 303 (having five possible lives) is shown flying an airplane to the next destination in snapshot image 380f.

Though referred to as different timelines, all the timelines in window may be referred as one timeline belonging to the user playing the video game. In addition, timelines associated with other users (e.g., timelines 320, 330, and portions of 310) may be replaced with timelines of new users, in one embodiment. In that manner, snapshot images of rotating users may be shown to the user. In another embodiment, more timelines may be shown, or a lesser number of timelines may be shown for clarity.

In still another embodiment, a timeline in windows 350a or 350b may display snapshot images that are associated with a completely different game or content. For example, the timeline may be shown to entice the user to preview and try another video game or to view other content.

Figure 4A:
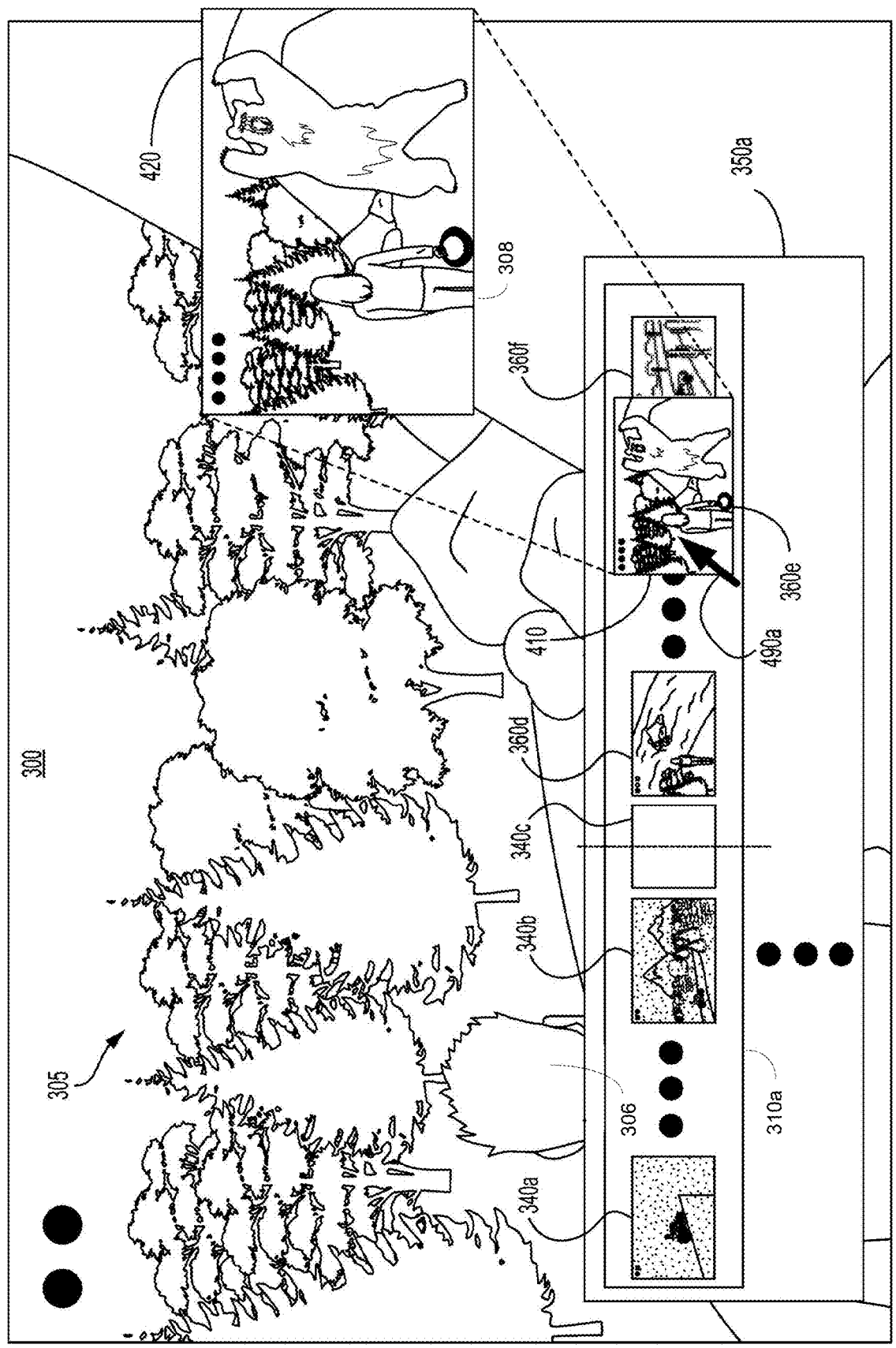
FIG. 4A is an illustration of a timeline showing snapshot images of game play of a video game of at least one user, wherein selection of a snapshot enables an enlarged view of the snapshot image, in accordance with one embodiment of the present disclosure.

FIG. 4A is an illustration of timeline 310a presented in window 350a, wherein timeline 310a is first introduced in FIG. 3A, showing snapshot images of game play of a video game of at least one user, wherein selection of a snapshot enables an enlarged view of the snapshot image, in accordance with one embodiment of the present disclosure. As previously described, window 300 shows the currently rendered image 305 of the game play of the video game by a user. Timeline 310a includes snapshot images (340a, 340b, . . . ) of game play by the user (playing character 306) at points in the progression through the video game occurring before the currently rendered image 305. Timeline 310 also includes snapshot images (360d, 360e, 360f, . . . ) of game play by another user (e.g., friend F1 playing character 308) at points in the progression through the video game occurring after the currently rendered image 305.

More particularly, the snapshot images are presented in the timeline 310a via thumbnails. As such, depending on the size of the thumbnails, the rendered images may be too small to show much detail. The user may select a snapshot for enlargement. For example, the user may roll cursor 490a over the thumbnail presenting snapshot image 360e, in one embodiment. Other methods are supported for selection of a snapshot image for enlargement, such as touching the displayed snapshot image on a touchscreen. Window 410 is generated and displayed in approximately the same area of the selected thumbnail. Window 410 displays the rendered snapshot image 360e, wherein window 410 is of a sufficient size to give the user a better view of snapshot image 360e.

For purposes of clarity, a blow up of the snapshot image 360e is presented in box 420. However, in one embodiment, through further selection of window 410 and/or snapshot image 360e, box 420 may be displayed as a window showing an even larger snapshot image 360e than that presented in window 410. As previously described, snapshot image 360e is associated with the game play of another user (e.g., friend F1 playing woman character 308), and shows the character 308 encountering a bear. By scrolling through the snapshot images presented in timeline 310a and viewing the enlarged images, the user can preview the game play of friend F1. In that manner, further selection by the user of a selected snapshot image presented in timeline 310a and/or a node in a node graph (described below) by a user enables the jump executing engine 216 of game processor 210 to access the corresponding snapshot, instantiate another instance of the video game based on the snapshot, and execute the video game beginning at a point in the video game corresponding to the snapshot. For example, the user may experience the game play of another user (e.g., friend F1), or go back and re-experience and/or replay his or her own game play.

Figure 4B:
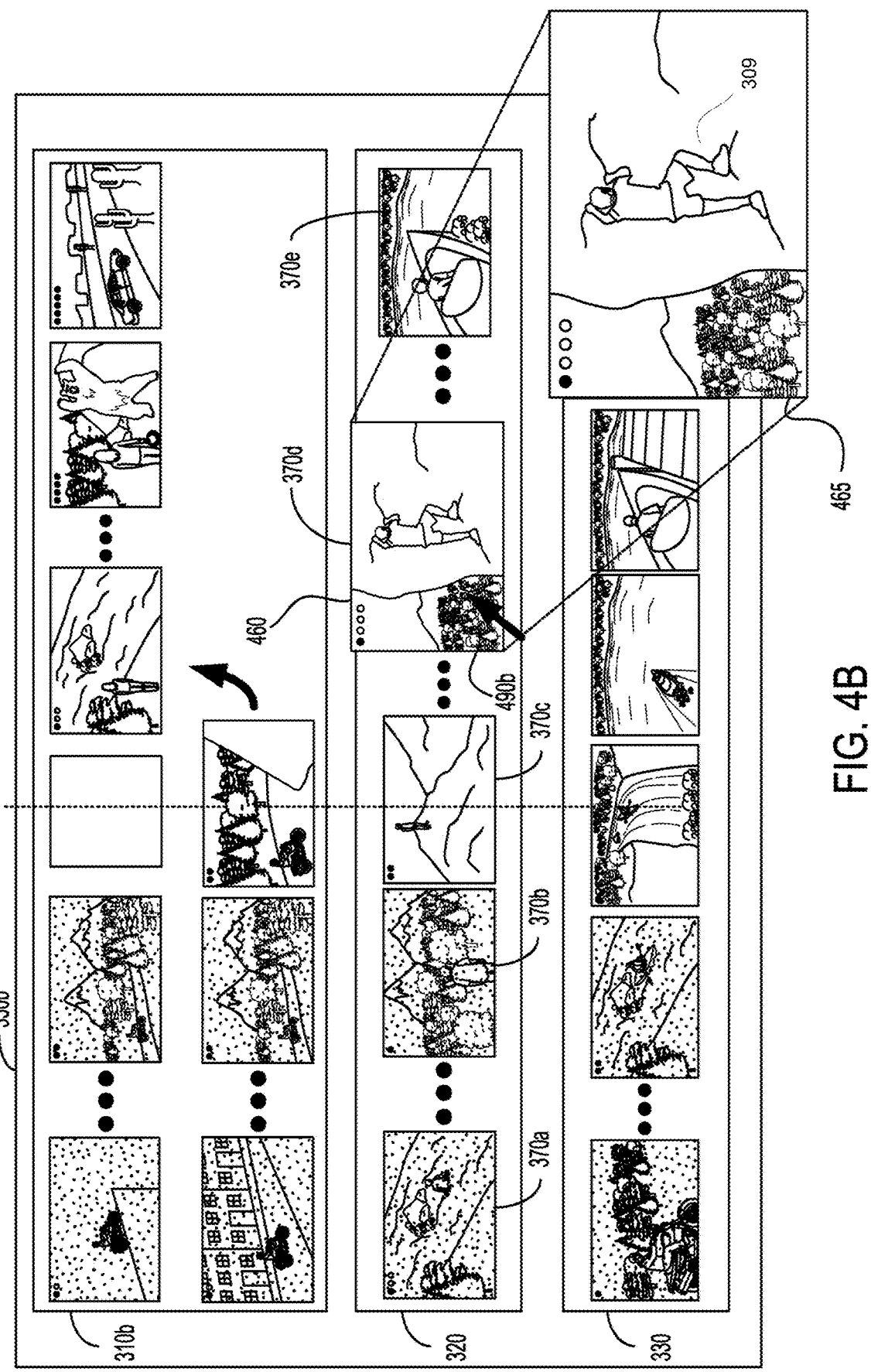
FIG. 4B is an illustration of one or timelines, each of which show snapshot images of game play of a video game of at least one user, wherein selection of a snapshot enables an enlarged view of the snapshot image, in accordance with one embodiment of the present disclosure.

FIG. 4B is an illustration of one or timelines presented in window 350b, each of which show snapshot images of game play of a video game of at least one user, wherein selection of a snapshot enables an enlarged view of the snapshot image, in accordance with one embodiment of the present disclosure. The timelines shown in FIG. 4B were previously described in relation to FIG. 3B, and include timelines 310b, 320 and 330. In particular, timeline 310b includes snapshot images of game play by the user playing character 306 at points in the progression through the video game occurring before the currently rendered image 305. Timeline 310b further includes snapshot images corresponding to snapshots captured during the game play by friend F1 playing character 308 at points in the progression through the video game occurring before, approximately concurrent, and after the currently rendered image 305. The snapshot images are presented in thumbnails, in one embodiment. Timeline 320 includes snapshot images (370a, 370b, 370c, 370d, 370e . . . ) corresponding to snapshots captured during game play by friend F2 playing character 309 at points in the progression through the video game occurring before, approximately concurrent, and after the currently rendered image 305. Timeline 330 includes snapshot images corresponding to snapshots captured during the game play by friend F3 playing character 303 at points in the progression through the video game occurring before, approximately concurrent, and after the currently rendered image 305. As shown in FIG. 4B, interaction with snapshot images for timeline 320 are further described, and as such snapshot images in timelines 310b and 330 are not labeled for ease of understanding.

More particularly, the snapshot images are presented in the timelines 310b, 320 and 330 via thumbnails. As such, depending on the size of the thumbnails, the rendered images may be too small to show much detail. The user may select a snapshot in any of the timelines for enlargement. While FIG. 4A illustrates selection of a snapshot image in a timeline associated with the user, FIG. 4B illustrates the selection of a snapshot image for enlargement in one of the timelines corresponding to a friend. For example, the user may roll cursor 490b over the thumbnail presenting snapshot image 370d in timeline 320, in one embodiment. Other methods are supported for selection of a snapshot image for enlargement, such as touching the displayed snapshot image on a touchscreen. Enlarged window 460 is generated and displayed in approximately the same area of the selected thumbnail. Window 460 displays the rendered snapshot image 370d, wherein window 460 is of a sufficient size (e.g., larger than the corresponding thumbnail) to give the user a better view of snapshot image 370d.

For purposes of clarity and understanding, a blow up of the snapshot image 370d is presented in box 465. However, in one embodiment, through further selection of window 460 and/or snapshot image 370d, box 465 may be displayed as a window showing an even larger snapshot image 370d than that presented in window 460. As previously described, snapshot image 370d is associated with the game play of friend F2, and shows the character 309 free climbing up a sheer rock face. By scrolling through the snapshot images presented in timeline 320 and viewing the enlarged images, the user can preview the game play of friend F2. In that manner, further selection by the user of a selected snapshot image presented in timeline 320 or node in a corresponding node graph (described below in further detail) by a user enables the jump executing engine 216 of game processor 210 to access the corresponding snapshot, instantiate another instance of the video game based on the selected snapshot, and execute the video game beginning at a point in the video game corresponding to the selected snapshot.

Figure 5A:
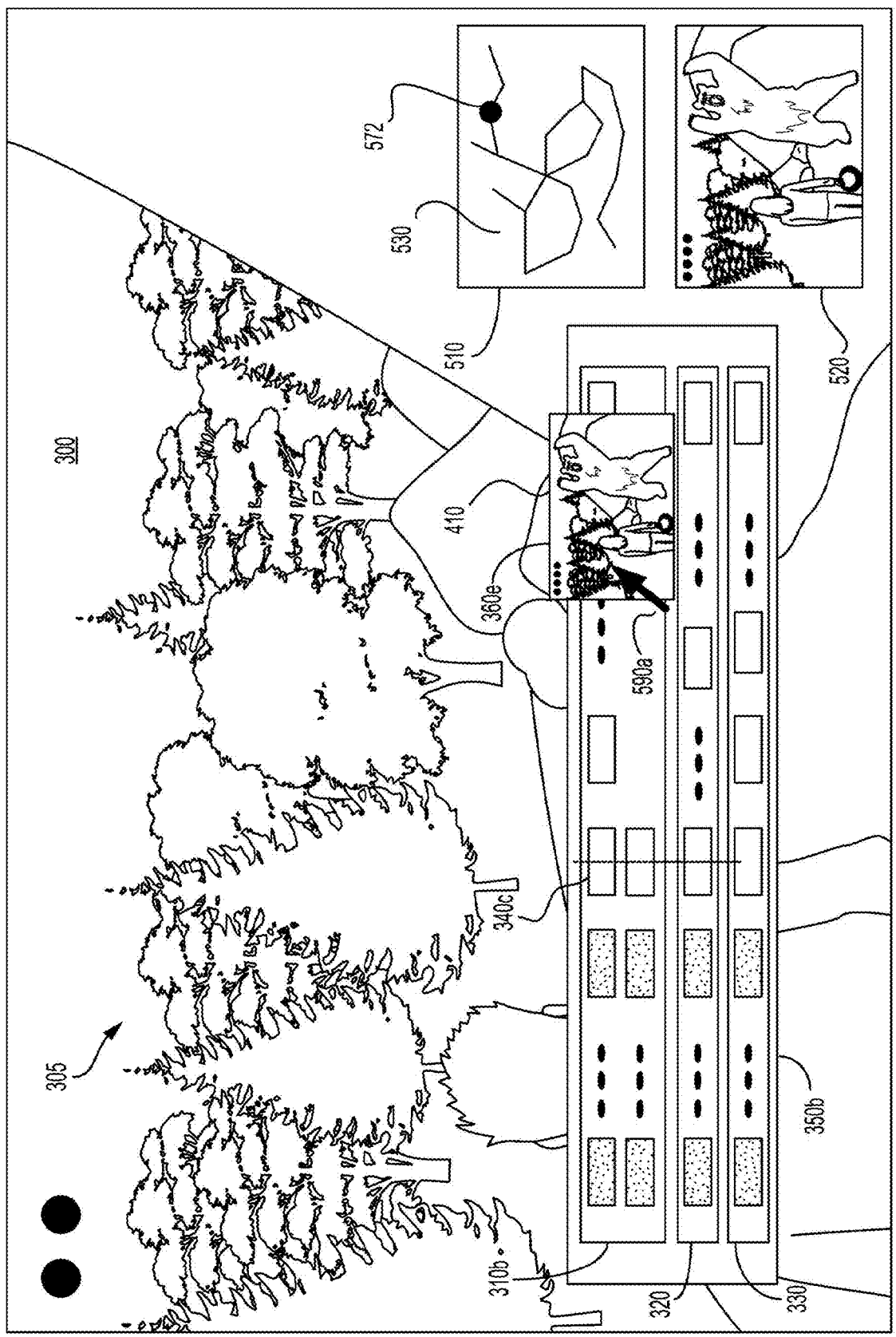
FIG. 5A is an illustration of a node graph of game play of a video game, wherein the node graph is displayed along with a timeline during game play of a video game by a user, wherein the timeline shows snapshot images of game play of the user, as well as snapshot images of game play of another user, in accordance with one embodiment of the present disclosure.

FIG. 5A is an illustration of a node graph 530 of game play of a video game, wherein the node graph is displayed along with a timelines 310b 320 and 330 in window 350b, first introduced in FIG. 3B, during game play of a video game by a user. In particular, timeline 310b shows snapshot images of game play of the user playing character 306 at points, as well as snapshot images of game play of another user (e.g., friend F1 playing character 308), timeline 320 shows snapshot images of game play by friend F2 playing character 309, and timeline 330 shows snapshot images of game play by friend F3 playing character 303. The snapshot images in each of the timelines are presented in relation to the currently rendered image 305 (e.g., as represented by blank thumbnail 340c), as previously described. Window 300 also shows the currently rendered image 305 of the game play of the video game by a user.

As shown in FIG. 5A, snapshot image 360e is selected (e.g., through interaction of a corresponding thumbnail) for enlargement in timeline 310b. Snapshot image 360e is associated with the game play of friend F1 at a point in the game that occurs after (e.g., in the future) the currently rendered image 305. In particular, the user may roll cursor 590a over the thumbnail presenting snapshot image 360e in timeline 310b, in one embodiment. Other methods are supported for selection of a snapshot image for enlargement, such as touching the displayed snapshot image on a touchscreen. Window 410 shows the enlarged snapshot image 360e, as previously described.

Further, node graph 530 is presented in window 510. In one embodiment, node graph 530 includes a plurality of nodes that correspond to the various paths a character may choose as the user progresses through the video game. In one embodiment, node graph 530 may be presented in window 510 as a universal graph showing all the nodes of the video game, as will be further described in FIG. 5B. In one embodiment, node graph 530 may be presented to include a subset of nodes of the universal graph, which shows nodes of particular interest, as will be further described in relation to FIG. 5C. For example, the subset of nodes may correspond to snapshot images displayed in one or more timelines.

Though window 510 is shown in the bottom right corner, it is understood that window 510 may be located anywhere in window 300. Further, window 510 may be of a sufficient size to provide information suitable for viewing. Further selection may display window 510 as an enlarged window within window 300, or on a full screen.

As shown, node 572 in node graph 530 may be automatically highlighted (e.g., bolded, enlarged, colored, etc.) in response to the user selecting snapshot image 360e in timeline 310a for enlargement. Node 572 corresponds approximately to the location of the snapshot image 360e, and gives context within the universe of the video game for snapshot image 360e. That is, because the user is interested in snapshot image 360e, through selection of the snapshot image 360e in timeline 310b, window 410 is presented showing a larger view of snapshot image 360e, and node 572 is highlighted in node graph 530. Node 572 may also be highlighted through manual selection of the node in node graph 530 by the user.

In summary, node graph 530 may be presented in window 510 automatically or in response to a user request, wherein the node graph 530 includes a subset of nodes that correspond to the snapshot images presented in timeline 310a. Further, node 572 may be presented and highlighted, wherein node 572 shows the approximate location of a point in the game play of a video game corresponding to snapshot image 360e. In addition, the snapshot image 360e corresponding to node 372 may be presented in window 520, wherein window 520 is larger than window 410, and may show an even larger view of snapshot image 360e.

In that manner, the user is presented with a multi-dimensional view of the video game. For example, the user is presented with a current view of his or her own game play via rendered image 305. The game play of the user (e.g., through rendered image 305 and snapshot images in a user timeline) is also presented alongside one or more timelines of one or more users showing a quick preview of the game play of other users throughout various points of progression in the video game. The snapshot images may be presented with a node graph showing paths through the video game associated with snapshot images in timelines, or all possible paths in the video game.

Figure 5B:
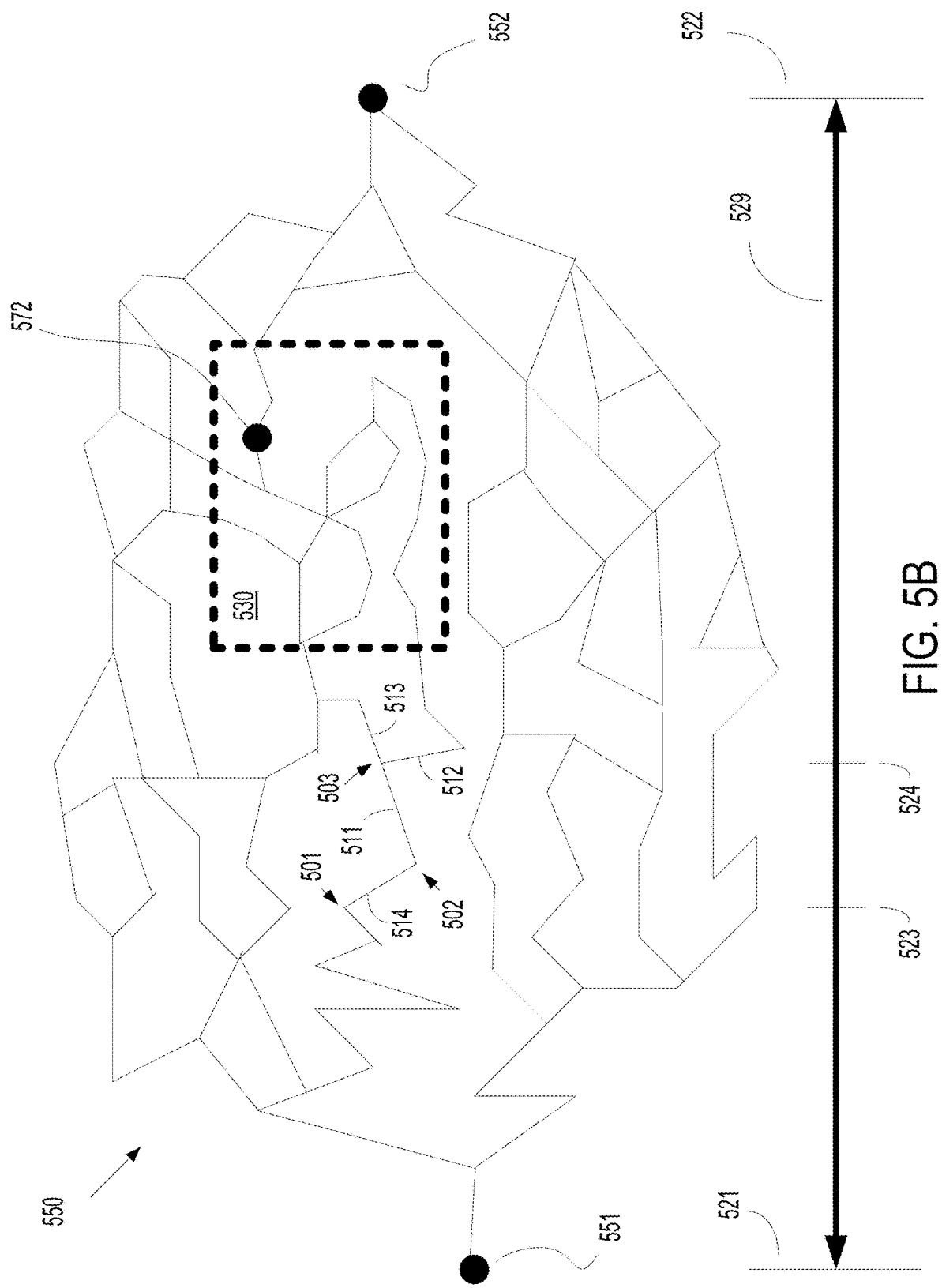
FIG. 5B is an illustration of a universal node graph or node tree showing all possible paths available in a video game, in accordance with one embodiment of the present disclosure.

FIG. 5B is an illustration of a universal node graph 550 or node tree showing all possible paths available in a video game, in accordance with one embodiment of the present disclosure. The universal node graph 550 may be displayed in window 510 of FIG. 5A. For example, the video game may include a start point as indicated by node 551, and an end point as indicated by node 552. Though one end point is shown, generally a universal node graph may have one or more end points, representing one or more options for finishing a video game. Further, a video game may have one or more start points that are represented in a corresponding universal node graph.

Universal node graph 550 includes a plurality of nodes (e.g., logical nodes) that define the various logical paths (also referred to as "paths" in the specification) a character may choose as the user progresses through the video game. For example, logical path 511 is defined between nodes 502 and 503. In addition, the universal node graph 550 may also include a subset of nodes. For example, node graph 530, which is a subset of universal node graph 550, includes nodes and paths which correspond to snapshot images displayed in timeline 310b of FIG. 5B. Node graph 530 is also shown in window 510 of FIG. 5A.

Multiple logical paths may be configured to progress through universal graph 550 from node to node in a linear fashion. For example, the user moves in a linear fashion through node graph 530 between nodes 501 to 503 (e.g., from node 510 to node 502 and then to node 503) along logical paths 514 and 511. That is, no other logical paths can be taken when traversing between nodes 501 and node 503.

In addition, multiple logical paths may be configured to progress from node to node in a non-linear fashion. For example, the user moves in a non-linear fashion through node graph 550 when reaching node 503 along logical path 511. In particular, two options are available at node 503, wherein in a first option a character may take path 512, and in a second option the character may take path 513. Different outcomes may result from taking the two different paths.

Progression through the video game may generally be defined by a universal time line 529 that begins at a time or mark 521 associated with start point 551, and ends at a time or mark 522 associated with end point 552. The use of time in the timeline 529 is meant to show progression through the video game, and not necessarily a measure of how long the user plays the video game. As the user moves from node to node through universal node graph 530, a representative time or mark may be located on timeline 529. For example, node 501 may be represented as mark 523 and node 503 may be represented as mark 524 in timeline 529. Progress may be measured along timeline 529 from left to right. As an illustration, node 501 occurs before node 503 in the progression through the video game. As such, mark 523 representing node 501 is displayed to the left of mark 524 representing node 503. Further, progression may be further illustrated in association with timeline 529 and node graph 550 through various character values associated with the user, as previously described. For example, progress may be measured by how many possible lives are available to a character, or how many points or cash the character has accumulated.

Figure 5C:
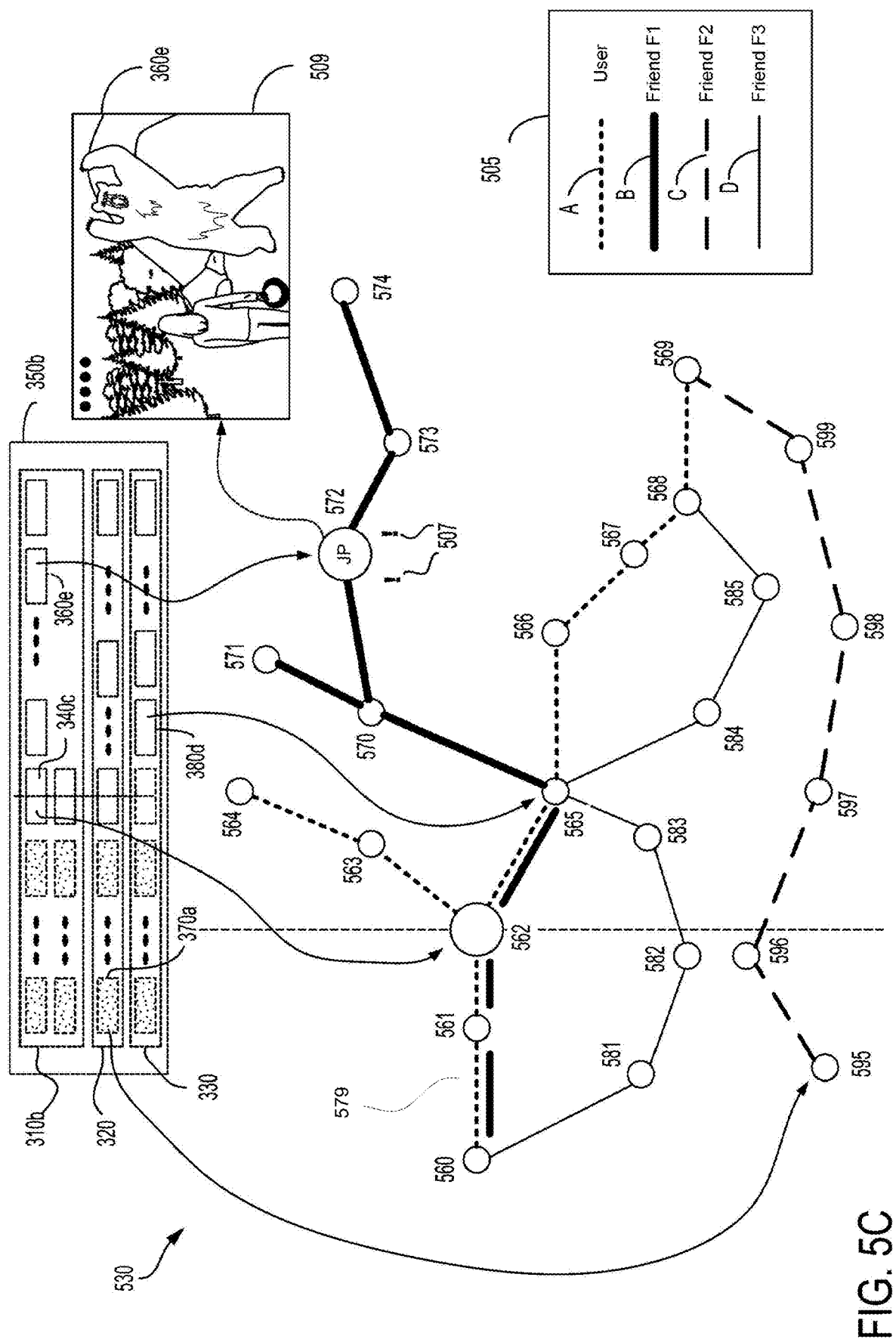
FIG. 5C is an illustration of a node graph showing the hierarchy of nodes generated in association with snapshots captured during game play of a video game, wherein the node graph is displayed along with a timeline during game play of a video game by a user, wherein the timeline shows snapshot images of game play of the user, as well as snapshot images of game play of another user, in accordance with one embodiment of the present disclosure.

FIG. 5C is an expanded illustration of a node graph 530, first introduced in FIG. 5A, showing the hierarchy of snapshot nodes generated in association with snapshots captured during game play of a video game, in accordance with one embodiment of the present disclosure. In one embodiment, node graph 530 is displayed along with one or more timelines (e.g., timelines 310b, 320, and 330) during game play of a video game by a user. For example, node graph 530 may be displayed in window 510 of FIG. 5A, or may be displayed in an even larger window. An expanded view of node graph 530 displayed in window 510 is shown in FIG. 5C for illustration. An outline of window 350b is presented in FIG. 5C for referencing snapshot images and corresponding snapshot nodes in node graph 530.

In particular, snapshot nodes correspond to points in game play of a video game where a snapshot has been captured. In general, snapshots may be captured at the nodes of the universal node graph 550. As such, snapshot nodes may align with nodes in universal node graph 550. However, some snapshot nodes may not align with nodes in a universal graph 550, such as when a snapshot has been captured between two nodes of the universal graph (e.g., in the middle of a logical path). For example, snapshot node 561 may be captured between two nodes (corresponding to nodes 560 and 562) in the universal node graph 550.

Node graph 530 includes a plurality of snapshot nodes that define the various actual paths that a character has taken during the game play of a corresponding user. For example, path 579 is defined between snapshot nodes 560 and 561. Path 579 is shown to have been taken in the game play of the user, as well as the game play of friend F1. Node graph 530 may show one or both of linear and non-linear paths, as defined in the game plays of one or more users.

Node graph 530 corresponds to snapshot images shown in timelines 310b, 320 and 330 displayed in window 350, in one embodiment. For example, snapshot node 562 corresponds to box 340c representing the currently rendered image 305 of the user, snapshot node 507 corresponds to snapshot image 360e of friend F1, snapshot node 595 corresponds to snapshot image 370a of friend F2, and snapshot node 565 corresponds to snapshot image 380d of friend F3. In that manner, the user is presented with at least two or more views of the video game that are related, such as snapshot images and the currently rendered image in the timelines and the snapshot nodes in node graph 530. By cross referencing the currently rendered image 305 (along with its position in node graph 530) with other snapshot images (and their positions in node graph 530), the user is able to understand which paths are available to the user around a point in the video game associated with the currently rendered image. As such, the user is able to orient the character 306 within the universal node graph 550 and node graph 530 of the video game. In that manner, the user is able to navigate from one point to another point in the game. In one embodiment, though snapshot nodes are shown in FIG. 5C, node graph 530 may include nodes defining logical paths as defined by universal node graph 550.

More particularly, the paths taken by the user playing character 306 are shown by the line A that is dotted with fine resolution. For instance, the user has traveled between snapshot nodes 560, 561 and 562. From snapshot node 562, the character 306 of the user has taken a first route traveling up from snapshot node 562 through snapshot nodes 563 and 564, and a second route traveling downwards from snapshot node 562 through snapshot nodes 565 to 569 (e.g., from node 565 to node 566 to node 567 to node 568 and to node 569). The paths taken by the character 308 of friend F1 is shown by solid line B. For instance, character 308 of friend F1 has traveled along paths defined by snapshot nodes 560, 561, 562, 565, 570, 571, 572, 573, and 574. Also, the paths taken by the character 308 of friend F2 is shown by line C that this dotted with coarse resolution. For instance, character 308 of friend F2 has traveled along paths defined by snapshot nodes 595, 596, 597, 598, 599, and 569. The paths taken by the character 303 of friend F3 is shown by line D, and shows that character 303 has traveled along paths defined by snapshot nodes 560, 581, 582, 583, 565, 584, 585, and 568.

In the progression of the video game, the user has taken paths that occur beyond or in the future of snapshot node 562, which corresponds to a point in the video game associated with the currently rendered image 305, but has retuned back to snapshot node 562. For example, the first route taken beyond snapshot node 562 and ending at snapshot node 564 may have reached a dead end. Also, the second route taken beyond snapshot node 562 and ending at node 569 may be unsatisfactory to the user. Snapshot images corresponding to snapshot nodes occurring beyond the currently rendered image 305 associated with the user are not shown in timeline 310b, but may be shown in other embodiments.

The user has returned to node 562 in the game progression because the user may have heard rumors about an exciting part (encountering a bear) of the video game in this area, but has so far missed out on the action. The user believes that the exciting part is somehow reached through node 562. Embodiments of the present disclosure provide a way for the user to discover alternative paths through the video game by previewing game plays of other users, and laying out a potential route to take in the video game to reach an exciting part of the video game. For example, the user may preview the snapshot images of friend F1 playing character 308 in timeline 310b, and discover that the bear encounter occurs in association with snapshot node 507, which corresponds to snapshot image 360e. For reference, snapshot image 360e is shown in box 509. Without the introduction of snapshot images presented in timelines, and/or the node graphs, the user would have a hard time previewing and/or discovering these areas of interest.

In particular, the user may have discovered snapshot image 360e through viewing snapshot images in timeline 310b, or may have discovered it through exploring the node graph 530. For example, tags 507 are shown next to snapshot node 572 in node graph 530 of FIG. 5C, which may have caught the attention of the user. By interacting with node 572 in node graph 530, a view of snapshot image 360e may be presented to the user, such as in window 520 of FIG. 5A. Also, by selecting snapshot node 572 in node graph 530, the corresponding snapshot image 360e in timeline 310b may be highlighted (e.g., bolded) for attention. In that manner, the user may roll over the corresponding thumbnail to view an enlarged version of snapshot image 360e. As previously described. In another implementation, if the node graph 530 is presented in its own dominant window (e.g., full screen, or overlaid window 300), interaction with snapshot node 572 may bring up snapshot image 360e in another window (not shown).

After previewing game play of friend F1 and node graph 530, the user may wish to further explore the video game corresponding to snapshot image 360e, and more particularly the game play of friend F1. As previously described, embodiments of the present disclosure enable the user to jump into the game play of friend F1. In particular, further selection by the user of a snapshot image 360e via timeline 310b or node graph 53 enables the jump executing engine 216 of game processor 210 to access the snapshot corresponding to snapshot image 360e, instantiate another instance of the video game based on the snapshot, and execute the video game beginning at a point (now identified as a jump point) in the video game corresponding to the snapshot and its snapshot image 360e. In that manner, the user may fully experience the video game at node 507 (encountering the bear) through the game play of friend F1. That is, the user jumps into the character 308 of friend F1 at jump node 572 and plays an instantiation of the game play of friend F1 beginning at the point of the video game corresponding to jump node 572 (which corresponds to snapshot image 360e). As such, the user is able to jump into the game play at the most exciting part.

The user may decide to try to navigate to the same snapshot node 572 (bear encounter) previously captured by the game play of friend F1 after experiencing the game play of friend F1. Node graph 530 provides a view into the route taken by friend F1 in order to reach snapshot node 572 from the current position of the user, which is node 562 that is associated with the currently rendered image 305. For example, node graph shows that travel between nodes 562 and snapshot node 572 is possible via snapshot nodes 565 and 570.

Figure 6A:
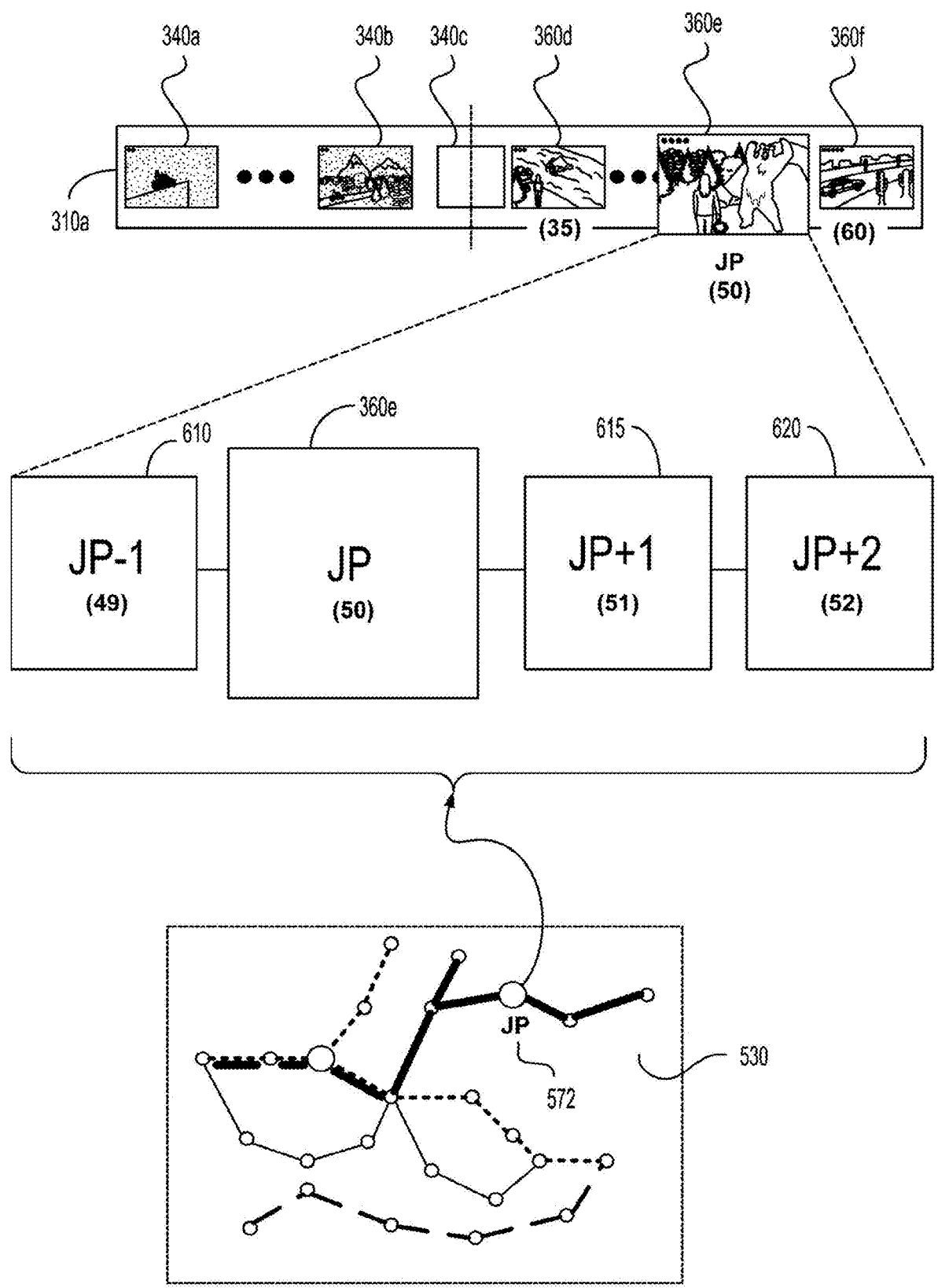
FIG. 6A is an illustration of a cluster of snapshot nodes closely and linearly aligned with a selected snapshot node, wherein the snapshot node can be selected through a timeline or node graph, in accordance with one embodiment of the present disclosure.

FIG. 6A is an illustration of a cluster of snapshot nodes closely and linearly aligned with a selected snapshot node (e.g., the snapshot node 572 associated with snapshot image 360e), wherein the snapshot node can be selected through a timeline 310a or node graph 530, in accordance with one embodiment of the present disclosure. In particular, timeline 310a includes snapshot images (340a, 340b, . . . ) of game play by the user at points in the progression through the video game occurring before the currently rendered image 305 (as represented by blank thumbnail 340c. Timeline 310a further includes snapshot images (360d, 360e, 360f, . . . ) corresponding to snapshots captured during the game play by friend F1, as previously described. Further, each of the snapshot images correspond to a snapshot node, such as those presented in node graph 530.

Timeline 310a may show selected snapshot images from the plurality of snapshots captured during the game play of the user and friend F1. The snapshots and snapshot images for friend F1 are used to illustrate the presentation of snapshot images with coarse and with higher resolution. For purposes of illustration, during the game play of friend F1 one-hundred snapshots are captured, and can be numbered 1 through 100 in the order that they were captured. The timeline 310a may not have enough room to show all the snapshots images corresponding to the captured snapshots. As such, only a subset of snapshot images are presented in timeline 310. Further, snapshot images presented side-by-side in timeline 310a may not be consecutively and/or sequentially captured. For instance, as shown in timeline 310a of FIG. 6A, snapshot image 360e is numbered 50 in the captured order, and the snapshot image directly to the right is snapshot image 360f, which is numbered 60. As such, nine snapshot images were captured between snapshot image 360e and snapshot image 360f, but are not shown in timeline 310a.

In one embodiment, a finer resolution of snapshot images may be generated and presented for display based on captured snapshots. In particular, further selection of a snapshot image, such as image 360e, either through the timeline 310a or through node graph 530 will enable the presentation of snapshot images with higher resolution. Further, in one embodiment, the snapshot images are presented in a node graph/tree configuration showing the paths that the user (e.g., friend F1) took during the game play. That is each snapshot image represents a node, and the snapshot images are presented in node graph configuration. For example, a window may display snapshot nodes via their corresponding images, wherein the snapshot nodes are captured sequentially before and/or after the snapshot corresponding to the selected snapshot image 360e. Snapshot image 360e corresponds to the jump point selected by the user to initiate the game play of friend F1, as previously described. Before or after being selected as a jump point, the user may want to see various snapshot images associated with snapshot image 360e.

As shown in FIG. 6A, a linear progression of snapshot images are presented in various thumbnails in relation to the selected snapshot image 360e. The snapshot image 360e and its corresponding snapshot are also referenced as the jump point (JP), as previously described. The selected snapshot image 360e and JP is associated with the snapshot numbered 50 in the order of captured snapshots. FIG. 6A shows that four snapshot images 610, 360e, 615, and 620 are shown and correspond to one snapshot captured before JP (snapshot JP−1), JP, and two snapshots captured after JP (snapshot JP+1 and JP+2). That is, the snapshot images correspond to consecutively numbered snapshots 49-52. For example, snapshot image 610 (JP−1), snapshot image 360e (JP), snapshot image 615 (JP+1), and snapshot image 620 (JP+2) are consecutively ordered 49-52. In that manner, the user is able to view at a higher resolution the action in the game play of friend F1 around snapshot image 360e in a node graph configuration.

Figure 6B:
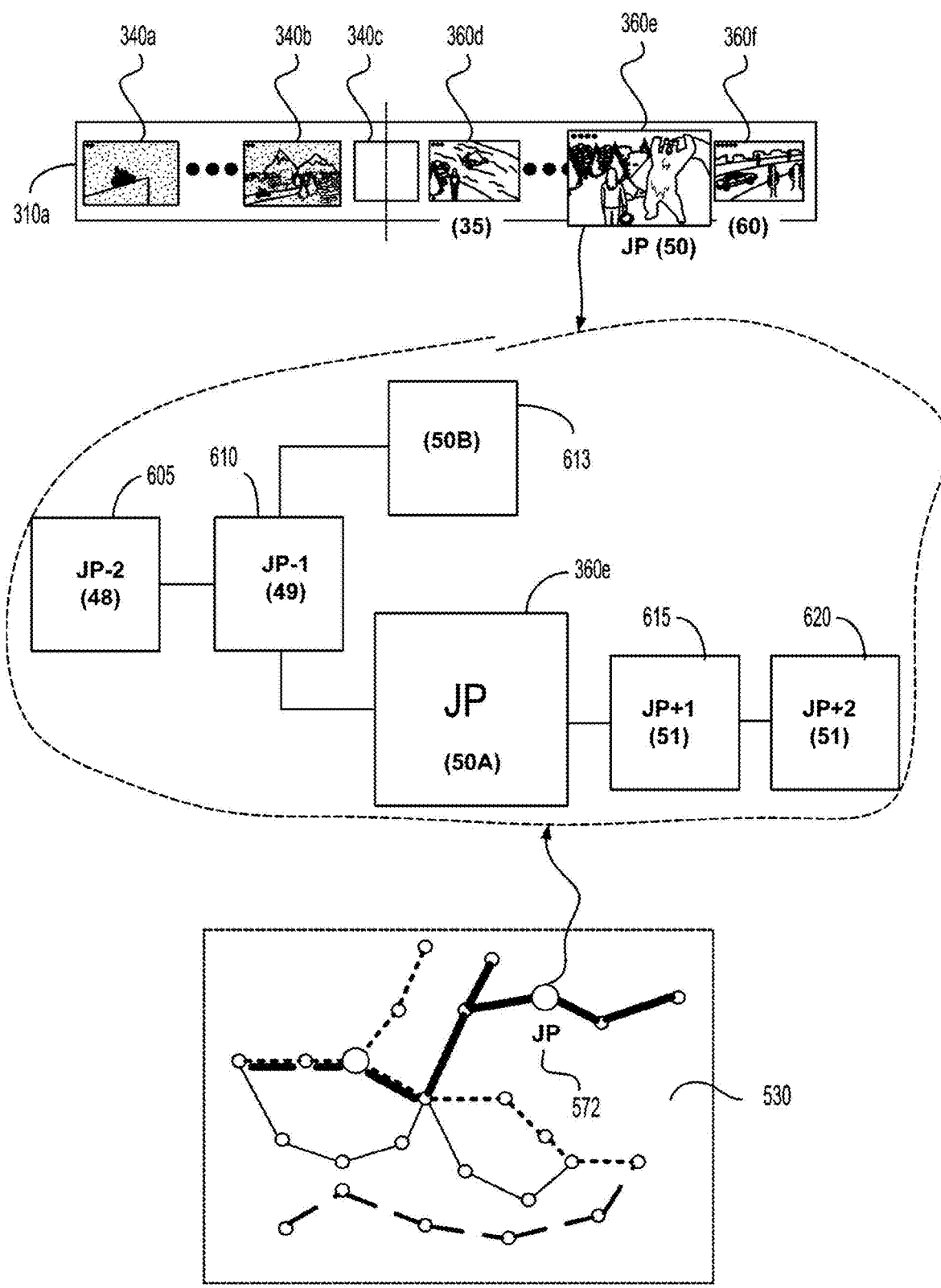
FIG. 6B is an illustration of a cluster of snapshot nodes closely and non-linearly aligned with a selected snapshot node, wherein the snapshot node can be selected through a timeline or node graph, in accordance with one embodiment of the present disclosure.

FIG. 6B is an illustration of a cluster of snapshot nodes closely and non-linearly aligned with a selected snapshot node (e.g., snapshot node 572 corresponding to snapshot image 360e), wherein the snapshot node can be selected through a timeline 310a or node graph 530 as previously introduced in relation to FIG. 6A, in accordance with one embodiment of the present disclosure. While FIG. 6A shows a linear progression through the video game around the jump point JP corresponding to snapshot image 360e, FIG. 6B illustrates a non-linear progression through the video game around JP.

For example, the snapshot images are presented in a node graph/tree configuration showing the paths that friend F1 took during game play. That is each snapshot image represents a node, and the snapshot images are presented in node graph configuration. As shown in FIG. 6B, a non-linear progression of snapshot images are presented in various thumbnails in relation to the selected snapshot image 360e, also referred to as JP with an order number of 50. Eight snapshot images are shown. In particular, snapshot image 605 corresponds to the snapshot node JP−2 with order 48. Also, snapshot image 610 corresponds to snapshot node JP−1 with order 49, wherein snapshot node JP−1 is a decision node showing a non-linear configuration. Two choices are available, as represented by order numbers 50A-B. One choice stemming from snapshot node JP−1 goes to snapshot image 613 with order 50B. The other choice stemming from snapshot node JP−1 routes to snapshot node JP, which corresponds to snapshot image 360e and order number 50A. This route continues through consecutively numbered snapshot JP+1 (related to snapshot image 615 and order number 51) and snapshot JP+2 (related to snapshot image 620 and order number 52).

Figure 6C:
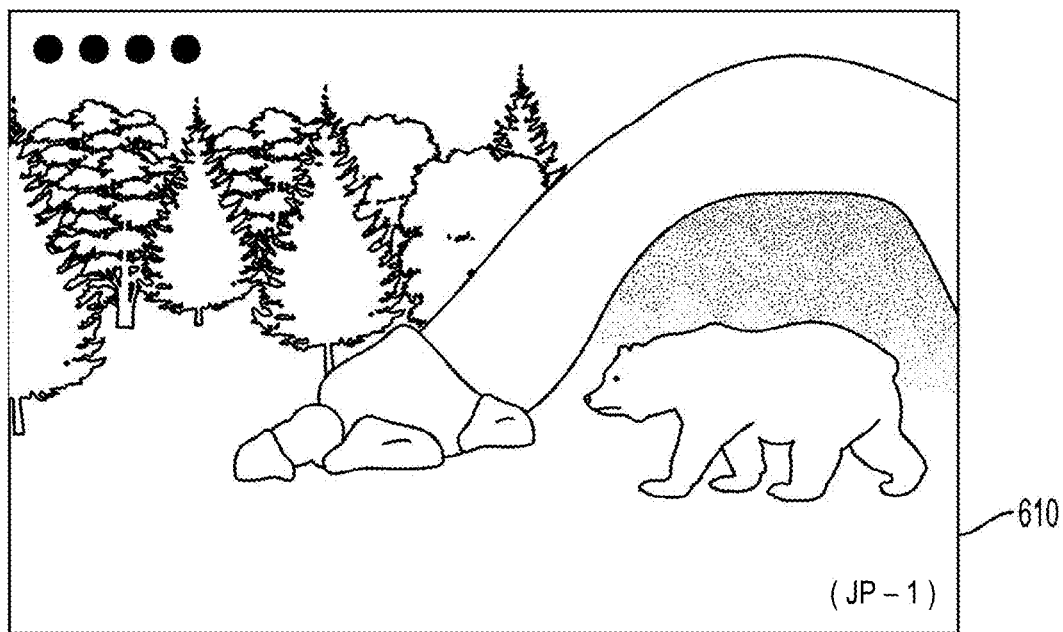
FIG. 6C-6F are illustrations of snapshot images corresponding to a cluster of snapshot nodes closely aligned with a selected snapshot node, in accordance with one embodiment of the present disclosure.

FIG. 6C-F are illustrations of snapshot images corresponding to a cluster of snapshot nodes closely aligned with a selected snapshot node and described in relation to FIGS. 6A-B, in accordance with one embodiment of the present disclosure. For example, FIG. 6C illustrates snapshot image 610 and shows the character 308 used in the game play of friend F1 first encountering the bear as it exits its cave.

Figure 6D:
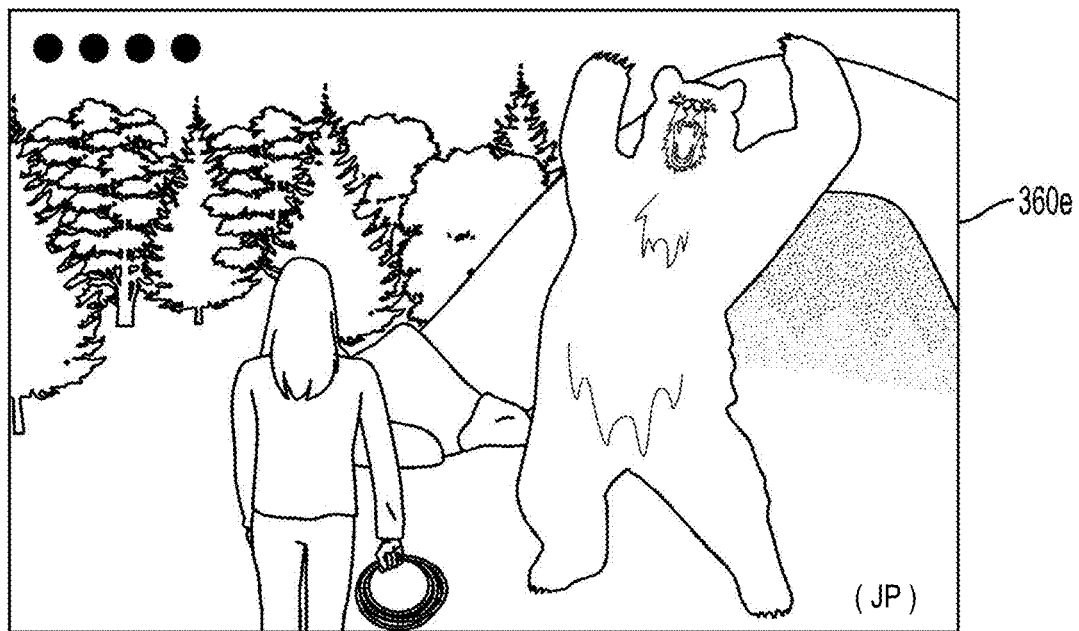
Figure 6E:
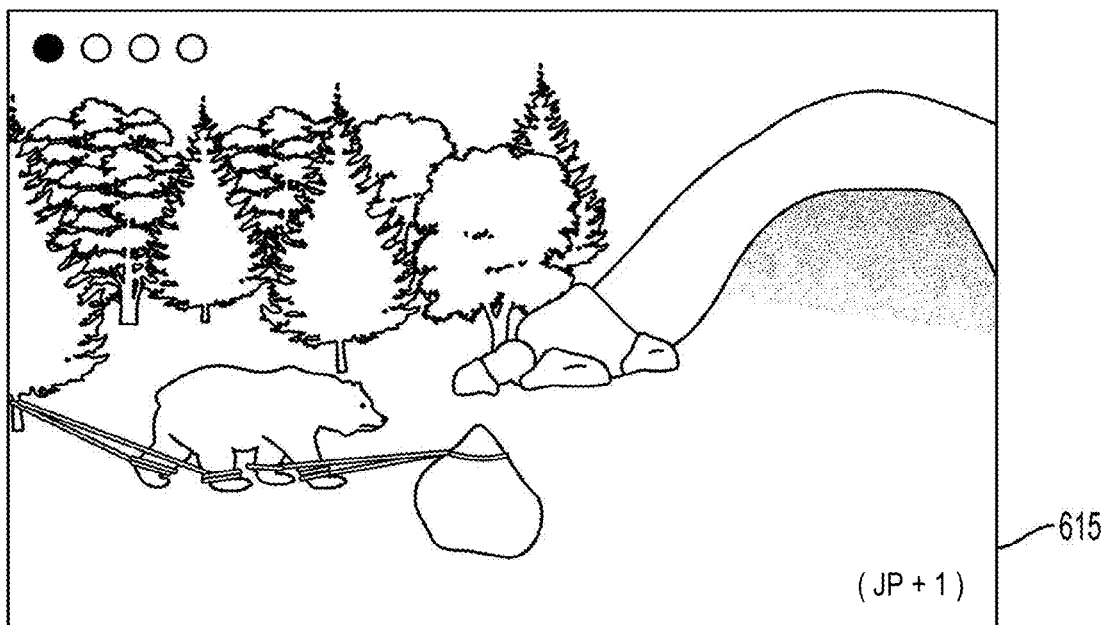
Figure 6F:
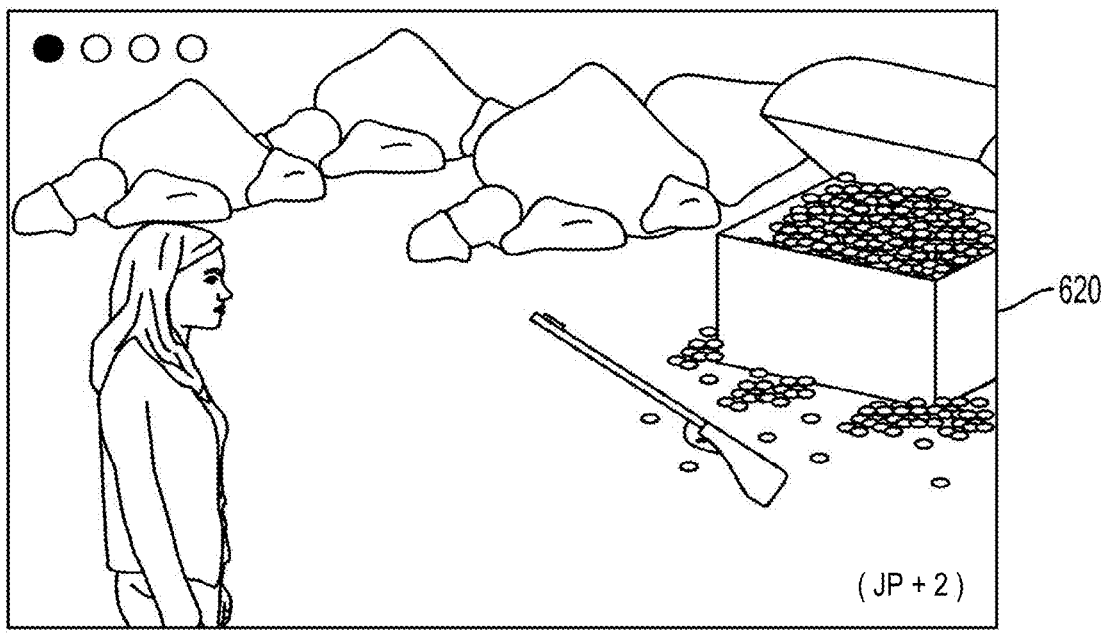

Snapshot image 610 corresponds to a snapshot node JP−1 with order number 49. FIG. 6D illustrates snapshot image 360e (related to snapshot node JP and order number 50) and shows the character 308 engaging in close contact with the bear. The character 308 is shown handling a coiled rope that is presumably the only tool and/or weapon available to character 308. FIG. 6E illustrates snapshot image 615 (related to snapshot node JP+1 and order number 51) and shows that the character 308 has subdued the bear by tying each of the legs of the bear to a tree using the rope. FIG. 6F illustrates snapshot image 620 (related to snapshot node JP+2 and order number 52) and shows the character 308 enjoying the fruits of her victory over the bear: a weapon and other reward items (e.g., coins, precious stones, etc.) are available for the taking.

Figure 7:
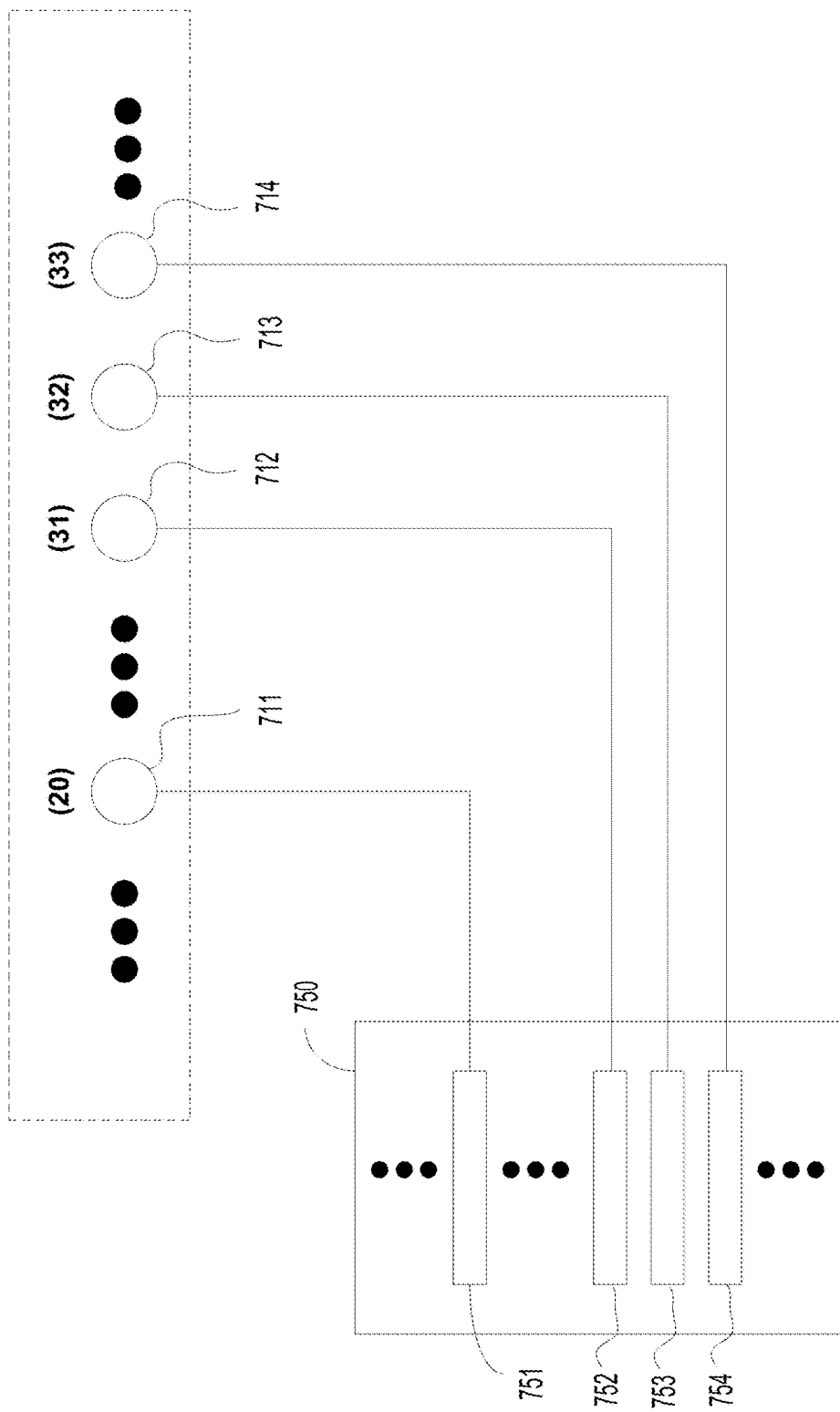
FIG. 7 is an illustration of snapshots captured during game play of a video game, and the storing of each of those snapshots in one or more master files of a snapshot database, in accordance with one embodiment of the present disclosure.

FIG. 7 is an illustration of snapshots captured during game play of a video game, and the storing of each of those snapshots as a separate master file of a data store 750, in accordance with one embodiment of the present disclosure. These master files are not automatically erased or overwritten as the user progresses through the video game, as is typical in the industry. In that manner, information and metadata related to each snapshot can be readily accessed at any time in order to present snapshot images (e.g., in timelines), node graphs, and to enable jumping to a jump point in the game play of the same or other user.

For example, a plurality of snapshots is captured in relation to game play of a particular user. The snapshots are numbered consecutively in the order of capture (i.e., 1-N). As shown in FIG. 7, at least snapshot 711 (order 20), snapshot 712 (order 31), snapshot 713 (order 32), and snapshot 714 (order 33) are captured.

Each snapshot includes information and/or metadata sufficient to load and execute an instance of the video game beginning at a point in the video game corresponding to the snapshot. For example, each snapshot includes at least game state data stored in database 145, snapshot image data stored in database 146, random seed data stored in database 143, and user saved data stored in database 141, as previously described. In one embodiment, metadata includes input commands used to drive an instance of the video game at and between two consecutively ordered snapshots. Each snapshot is stored in a corresponding master file in data store 750, wherein the master file corresponding to a particular snapshot may include pointers to each of these databases for related access. As shown, snapshot 711 is stored in master file 751, snapshot 712 is stored in master file 752, snapshot 713 is stored in master file 753, and snapshot 714 is stored in master file 754.

Figure 8:
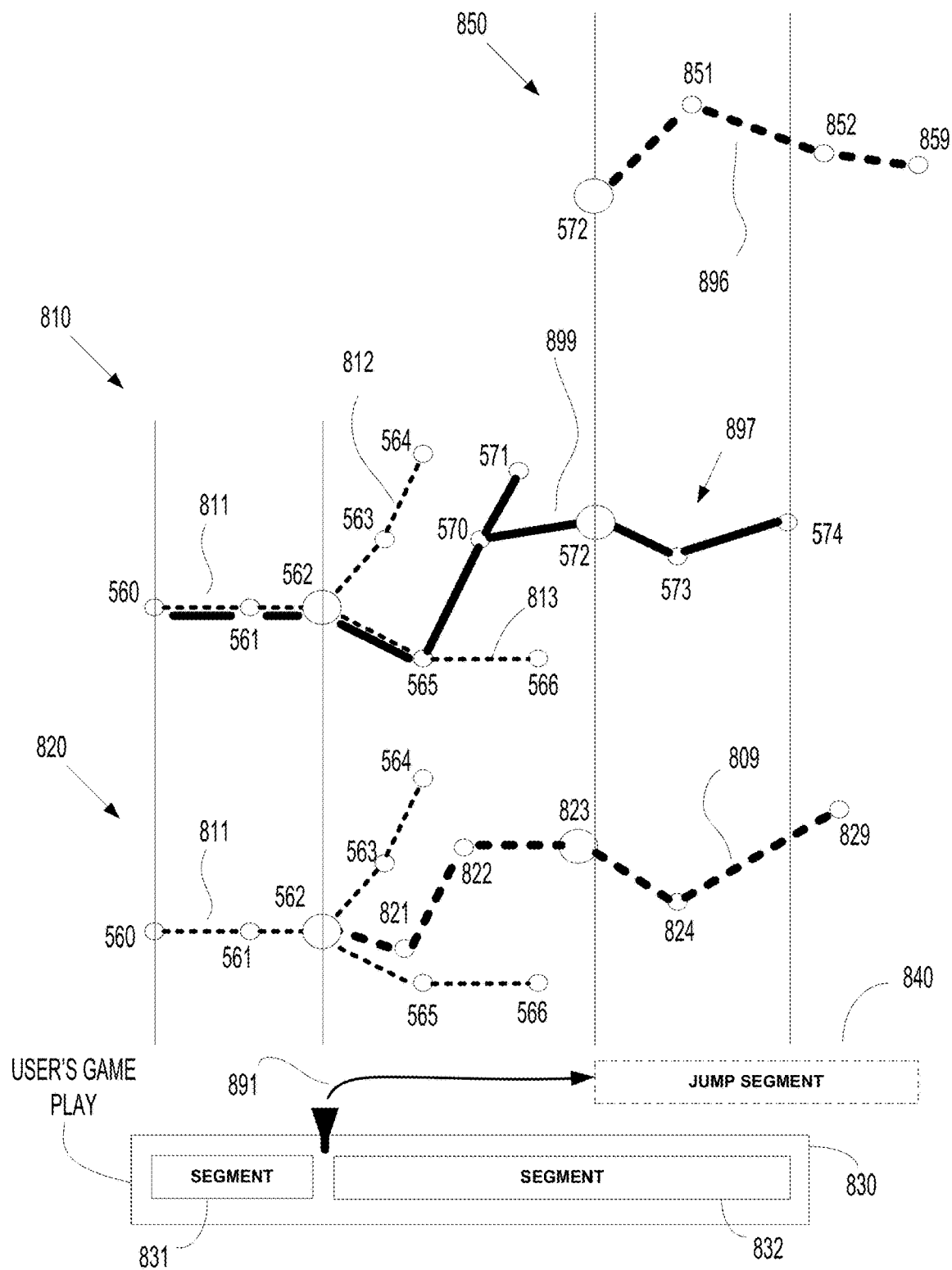
FIG. 8 is an illustration of multiple segments of the game play of a user of a video game, including an interceding jump by that user into a separate jump game play based on a snapshot captured during another game play of the video game by the same or another user, in accordance with one embodiment of the present disclosure.

FIG. 8 is an illustration of multiple segments of the game play of a user of a video game, including an interceding jump by that user into a separate jump game play based on a snapshot captured during another game play of the video game by the same or another user, in accordance with one embodiment of the present disclosure. For example, the user playing a game with character 306 of which the currently rendered image 305 is displayed on window 300 as previously described in relation to FIGS. 3-6 may elect to jump into the game play of friend F1 (with character 308) at a jump point (JP) defined by snapshot image 360e. Timeline 310a and/or 310b provides the user a preview of snapshot image 360e. Further, node graph 530 gives context to the snapshot image within the video game, since the snapshot image 360e can be associated with its corresponding location at snapshot node 572 (e.g., through highlighting, etc.), as previously described. Initiation by the user of the jump into the game play of friend F1 and character 308 is enabled based on the snapshot captured at snapshot node 572 during the original game play of friend F1. The initiation of the jump may be enabled through further selection of the snapshot image 360e in timeline 310a or 310b, or through selection of node 572 in node graph 530. Support for initiation of the jump into the game play of the same or another user may be accomplished through any means or methods (e.g., jump selection window, etc.).

In one embodiment, a plurality of snapshots is captured in the jump game play. Further, a video recording of the jump game play may be captured and stored for later access. In that manner, any user may play the jump game play via any snapshot in the jump game play. In one embodiment, snapshot images of the jump game play are placed into a timeline, through which the jump game play may be instantiated, as previously described.

The interaction of the user with the video game may be described in relation to segments of game play 830 of the user. As shown, the game play 830 of the user includes a first segment 831 and a second segment 832. In particular, the first segment 831 of game play 830 of the user defines a current or initial interaction of the user with the video game. As such, the currently rendered image 305 of FIG. 3A may be associated with the first segment 831. For illustration, snapshot node graph 810 shows a portion of the node graph 530 previously described in relation to FIG. 5C. The route taken by a character 306 in the first segment 831 of the game play 830 of the user is shown by dotted line 811 and includes snapshot nodes 560, 561 and 562. Currently rendered image 305 is associated with snapshot node 562 and indicates the end of the first segment 831 for purposes of illustration and clarity, even though snapshot node graph 810 shows that character 306 has gone further to the right (e.g., progressed further) of snapshot node 562 to nodes 563 and 564 via one path 812, and to nodes 565 and 566 via a second path 813. This portion of the route (ending with snapshot node 562) taken by character 306 is also repeated in node graph 820, which illustrates the game play of the user using character 306 up to the end of the first segment 831.

At snapshot node 562, the user may choose to explore other points in the video game and elect to jump into the game play of friend F1 (e.g., further selection of snapshot image 360e), as previously described. The game play of friend F1 is shown by the bolded, solid line 899 of snapshot node graph 810. At this point, the first segment 831 of the game play 830 of the user is paused, and the user jumps into the game play of friend F1 at a point corresponding to snapshot node 572. For illustration, the jump game play begins at a point where the character is closely engaged with a bear. In particular, the instance of the video game executing the game play 830 of the user is paused (e.g., end of first segment 831), and the instance of the video game executing the jump game play of friend F1 beginning at the jump point (snapshot node 572) is instantiated based on the corresponding snapshot captured at snapshot node 572. A representation of the jump to node 572 is illustrated by curved arrow 891. The jump game play is defined by jump segment 840.

In another embodiment, the game play 830 of the user is saved and terminated at the end of the first segment 831 before beginning the jump game play. In that manner, the user may return to the video game in the future and resume from a point corresponding to snapshot node 562 (e.g., end of first segment 831). That is, the user may effectively resume the paused game.

In one embodiment, the instance of the video game executing the game play 830 of the user is separate from the instance of the video game executing the jump game play through which the user interacts, wherein the jump game play is based on the original game play of friend F1. For illustration, snapshot node graph 850 shows the route taken by a character 308 in the jump segment 840 of the jump game play played by the user, wherein the character 308 in the jump game play was originally created and defined by the game play of friend F1. The route taken in the jump game play is illustrated through bolded and dotted line 896.

The route taken by the character 308 in the jump game play as illustrated in node graph 850 begins at snapshot node 572 and continues to nodes 851, 852, and end node 859 consecutively. End node 859 indicates the termination of the instance of the video game executing the jump game play. It is important to note that the route taken by the character 308 in the jump game play (including nodes 572, 851, 852, and 859) as shown by dotted line 896 is different than the route 897 (including nodes 572, 573, and 574) taken by the character 308 in the game play of friend F1 shown in node graph 810. That is, the jump game play as executed by the user is different than the previously stored game play of friend F1 because the user is providing new input commands to direct the jump game play. For example, in the jump game play an unsuccessful encounter with the bear may occur because the user may be quickly previewing the game at this point to decide whether or not to play this part of the video game in his or her own game play 830. On the other hand, the game play of the find F1 may show a successful encounter with the bear.

In one embodiment, during the jump game play, snapshots may be captured at each of the nodes illustrated in jump segment 840 (e.g., nodes 572, 851, 852, and 859). The jump game play and its associated snapshots may be stored for later access. For example, the user may wish to review and instantiate jump game plays created by the user and associated with the video game. In other embodiments, the user may wish to review and instantiate jump game plays associated with other video games, wherein the jump game plays were created by the user or other users.

After execution of the jump game play, the game play 830 of the user may be resumed. The user has now previewed the game play of the friend F1, and may wish to have his or her own character 306 reach snapshot node 572 that is associated with the jump point. In that manner, the game play 830 of the user may include a route that is directed towards the jump point so that the character in the game play of the user will have the same bear encounter.

Snapshot node graph 820 shows the route taken by a character in the game play 830 of the user that is now resumed. The resumption of game play 830 is defined by second segment 832, wherein the resumed game play is defined by bolded and dotted line 809. As such, the entirety of the game play 830 by user is illustrated by the first segment 8310 (dotted line 811) and the second segment 832 (bold and dotted line 809). In one embodiment, the second segment 832 of game play 830 continues the instance of the video game that is paused. In another embodiment, the second segment 832 of game play 830 is executed on a new instance of the video game beginning at the point of the video game associated with snapshot 562, because the first segment 831 was terminated. The second segment 832 begins at snapshot node 562, and continues to snapshot nodes 821, 822, 823, 824, and 829 consecutively.

In node graph 820, snapshot node 823 roughly corresponds to the snapshot node 572 associated with the jump point. For example, the user would like to encounter the bear in his or her own game play 830. In particular, navigation to snapshot node 572 in the game play of the user is possible by the user via snapshot node graph 530 and/or universal node graph 550. In particular, the user is able to discover the possible paths available between snapshot node 562 and snapshot node 572 encountered by other users (e.g., friend F1) by reviewing the snapshot node graph 530. Additionally, the user is able to discover the general logical paths available between snapshot node 562 and snapshot node 572 by reviewing the universal node graph 550. In that manner, the user is able to navigate to a snapshot node 823 (e.g., via nodes 821 and 822) and encounter the bear. It is important to note that nodes 821 and 822 roughly align with snapshot nodes 565 and 570, originally captured during the game play of friend F1, but may not be identical.

Snapshot nodes 823, 824, and 829, etc. show the route taken in the game play 830 of the user, in the second segment 832, wherein the character 306 is now encountering and engaging with the bear. The route taken after the initial encounter with the bear at snapshot node 823 (including nodes 824, 829, etc.) may not be identical with the route in the jump game (e.g., nodes 572, 851, 852, and 859), nor may it be identical with the route in the game play of friend F1 (e.g., nodes 572, 573, and 574). This is because the game play 830 of the user has its own unique input commands that drive the video game.

Figure 9:
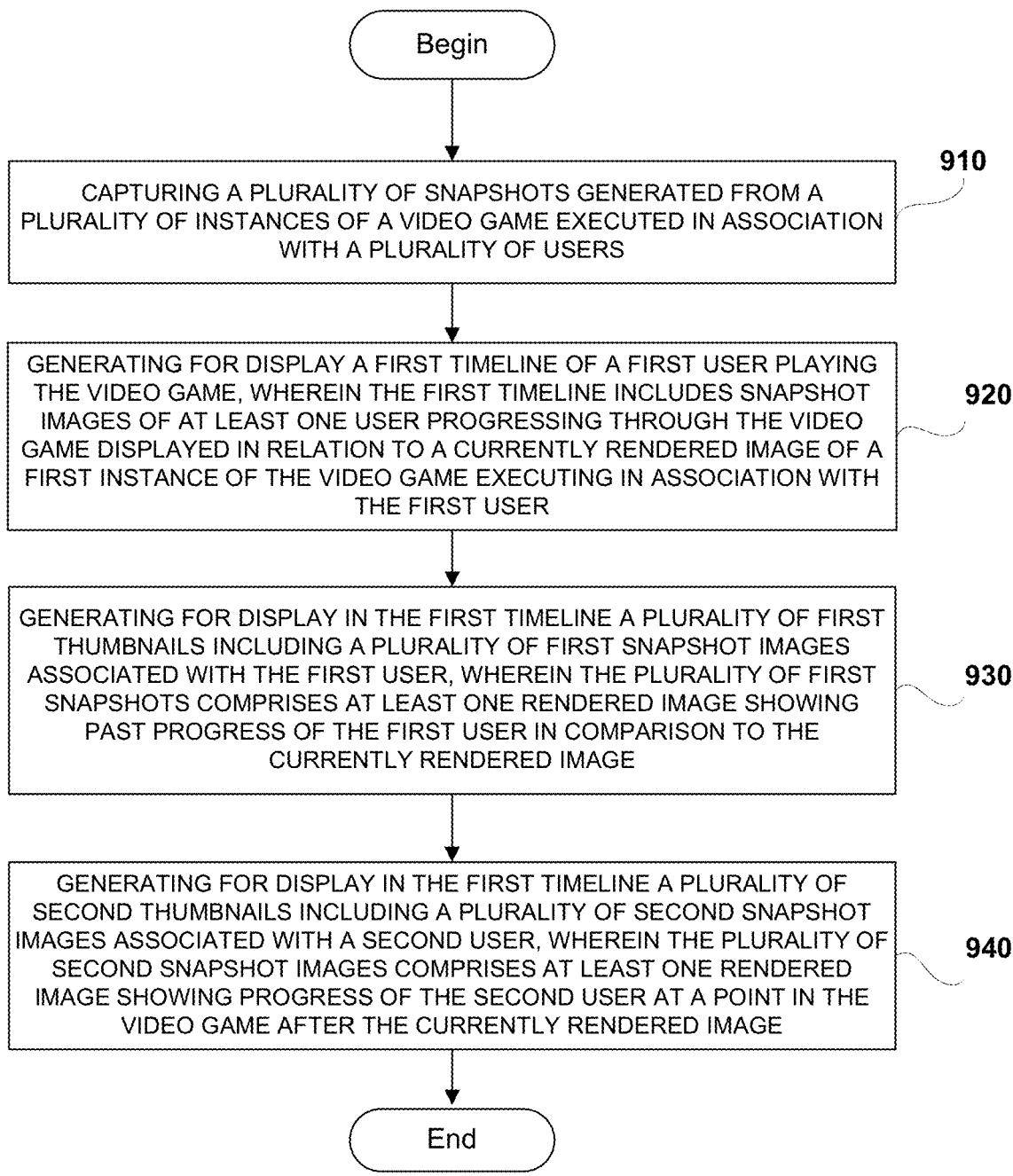
FIG. 9 is a flow diagram illustrating steps in a method for navigating through a gaming world, in accordance with one embodiment of the present disclosure.

With the detailed description of the various modules of the gaming server and client device communicating over a network, a method for navigating through a gaming world of a video game executing over a gaming network is now described in relation to flow diagram 900 of FIG. 9, in accordance with one embodiment of the present disclosure. Flow diagram 900 illustrates the process and data flow of operations involved at the game server side for purposes of generating information that is displayed over a network at a client device.

The method begins at operation 910, and includes capturing a plurality of snapshots generated from a plurality of instances of a video game executed in association with a plurality of users. In particular, the instances of the video game are being executed by one or more game processors 210 of one or more game servers 205 of FIG. 1. As each instance of the video game is being executed, one or more snapshots are captured, wherein a snapshot enables execution of an instance of the video game beginning from a point in said video game corresponding to that snapshot, as previously described.

In particular, the snapshot includes a snapshot image that comprises a rendered image generating by the instance of the video game that is executed in association with a game play of a corresponding user. The rendered image shows a scene of the video game corresponding to a point in the video game, wherein the point shows the progression in the game play of the user through the video game.

In addition, the snapshot also includes game state data that enables the generation of an environment corresponding to point in said video game. That is, based on the snapshot the corresponding scene and environment are generated, wherein the character is instructed to interact with the environment through the game play of the user.

Further, the snapshot includes random seed data providing additional features for the scene and environment, as previously described. For example, a cloud configuration and movement of one or more generic characters may be uniquely generated for inclusion into the scene and environment that is associated with the game play of the user. As such, the cloud configuration and movement of one or more generic characters may be different for each instance of the video game.

Also, the snapshot includes user saved data that enables generation of a character for the game play of the corresponding user. The character has a first state corresponding to point in video game at which the snapshot was captured. For example, the first state defines the look and type of the character, the clothing worn by the character, the level achieved for the character, the weaponry available to the character, the life status for the character at that point, etc.

At operation 920, the method includes generating for display a first timeline of a first user playing the video game. The first timeline includes snapshot images of at least one user (the first user and/or other users) progressing through the video game. The snapshot images in the timeline are displayed in relation to a currently rendered image of a first instance of the video game executing in association with the first user. Each snapshot image can be cross-referenced to a corresponding snapshot. The currently rendered image is associated with a current point in the progression of the video game by the first user.

At operation 930, the method includes generating for display in the first timeline a plurality of first thumbnails including a plurality of first snapshot images associated with the first user. That is, the first thumbnails show the progress through the video game of the first user. In particular, the plurality of first snapshots includes at least one rendered image showing past progress of the first user in comparison to the currently rendered image.

At operation 940, the method includes generating for display in the first timeline a plurality of second thumbnails including a plurality of second snapshot images associated with a second user. That is, the second thumbnails show the progress through the video game of the second user. In particular, the plurality of second snapshot images includes at least one rendered image showing progress of the future progress of the second user at a point in the video game after the currently rendered image.

In other implementations the plurality of second snapshot images shows past and/or current progress of the second user. For example, the second snapshots includes at least one rendered image showing progress of the second user at a point in the video game before the currently rendered image generated for display at a client device of the first user.

In still other embodiments, additional timelines may be generated for display at the client device. For example, a second timeline of a third user is generated for display. The second timeline includes a plurality of third snapshot images of the third user. The second timeline includes a plurality of rendered images showing progress of the third user during game play of the video game at a plurality of points in the video game before and after the currently rendered image associated with the game play of the first user.

As previously described, a selected snapshot image enables the jump executing engine 216 of game processor 210 to access the snapshot corresponding to snapshot image, instantiate another instance of the video game based on the snapshot, and execute the video game beginning at a point (now identified as a jump point) in the video game corresponding to the snapshot. For example, the game processor 210 receives selection by the first user of a selected snapshot image from the plurality of second snapshots in the first timeline, wherein the selected snapshot image is associated with game play of the second user. Further, the game processor is configured to jump execution of a first instance of the video game executed in association with game play of the first user to a jump point in the video game associated with the selected snapshot image. In one implementation, the first instance of the video game is paused and/or terminated, and another instance of the video game, the jump game, is instantiated based on the snapshot of the selected snapshot image.

In that manner, the first user is able to jump into the game play of the second user. For instance, the first user is able to instruct the character used in the game play of the second user in the jump game. The corresponding snapshot of the selected snapshot image includes second user saved data enabling generation of the character used in the game play of the second user, and also used for a jump game play of the first user in the jump game. The second user saved data and the second character originate from the game play of the second user. As such, the first user creates a jump game play during execution of the jump game.

After the first user is finished with the jump game, the first instance of the video game may be resumed. That is, the second instance of the video game executing the jump game is terminated, and the first instance of the video game associated with the game play of the first user is resumed. In that manner, the first user may resume his or her own game play of the video game.

The first user may also select a snapshot image in the prior game play of the first user. For example, the game processor may be configured to receive selection of a selected snapshot image in the plurality of first snapshot images associated with the prior game play. Execution of the first instance of the video game is jumped to a jump point in the video game associated with the selected snapshot image. In one implementation jumping is enabled through another instance of the video game based on the snapshot corresponding to the selected snapshot image. In another implementation, jumping is enabled through the first instance of the video game.

In addition, a node graph may be generated for display at the client device. The node graph includes a plurality of snapshot nodes corresponding to snapshot images displayed in the timeline, as previously described. The plurality of snapshot nodes defines a plurality of paths, wherein the paths and nodes are associated with game plays of the first user and the second user. Each node in the node graph is associated with a corresponding snapshot.

Further, the node graph may allow for jumping by the first user into the game play of the same or another user. For example, the game processor is configured to receive selection of a selected snapshot node in the node graph. The snapshot node is associated with a corresponding snapshot. A selected snapshot image corresponding to the selected snapshot node may optionally be generated for display at the client device. In particular, selection of the selected snapshot node and/or corresponding snapshot image enables jumping of the execution of the first instance of the video game executed in association with game play of the first user to a jump point in the video game associated with the selected node.

Game Play Access Via Video Recording

Generally speaking, the various embodiments of the present disclosure describe systems and methods providing for a user to jump into the stored game play of a player participating in a gaming application via a video recording of the stored game play, particularly when executed on a cloud-based gaming system. The video recording includes or references a plurality of snapshots that were originally captured during the game play, wherein a snapshot includes metadata and/or information enabling the instantiation of an instance of the gaming application at the point corresponding to snapshot capture. The snapshot allows any requesting user to instantiate and direct the instance of the gaming application, even though the requesting user may not be player generating the stored game play. The video recording may be selectable through a timeline including one or more snapshot images of the stored game play, wherein each snapshot image corresponds to a snapshot, and wherein the snapshot images are displayed in a manner giving the viewer a sense of the progression of the player in the gaming application. The timeline may be presented when a user is playing the gaming application, thereby giving the user a sense of the possibilities in the game play of the user by previewing the game play of other players. Selection of a video frame in the video recording identifies a jump point, wherein the selected video frame is associated with a corresponding snapshot which is used to instantiate a jump game play. The selected video frame may not correspond to a snapshot, and may be located at, or near, or between one or more snapshots. The jump game play is automatically executed to replay the game play of the player until reaching the jump point using saved input commands previously used to direct the game play of the player, after which the jump game play becomes live for the requesting user (i.e., the jump game play is directed by user input commands).

Embodiments of the present disclosure providing for a user to jump into the stored game play of a player participating in a gaming application via a video recording may be implemented within the systems of FIGS. 1-2 previously described.

Figure 10:
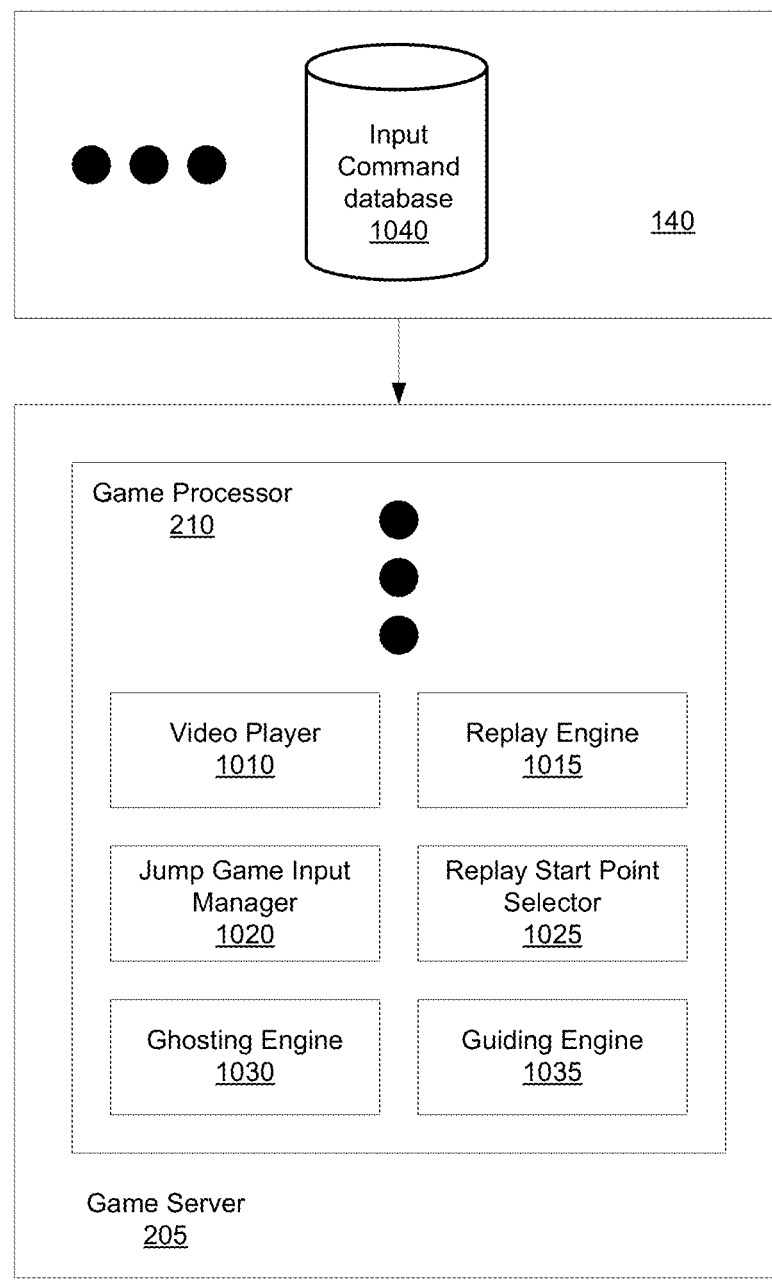
FIG. 10 illustrates components of a system used for game play access via a video recording, which allows a user to jump into the stored game play of any player participating in a gaming application based on snapshots generated and captured during the game play of the player by the system, in accordance with one embodiment of the present disclosure.

FIG. 10 illustrates components of a system used for game play access via a video recording, which allows a user to jump into the stored game play of any player participating in a gaming application based on snapshots generated and captured during the game play of the player by the system, in accordance with one embodiment of the present disclosure. For example, in some embodiments components used for game play access via a video recording may be included within the game processor 210 of game server 205, previously introduced in FIG. 1. Further, the game server 205 is included within the game cloud system (GCS) 201 of FIG. 2, such that GCS 201 is configurable to provide game play access via a video recording, in other embodiments.

In particular, game processor 210 includes various components configured to instantiate an instance of a gaming application based on a snapshot captured during a previous game play of a player participating in a gaming application. Game processor 210 was previously introduced in FIG. 1, and included game executing engine 211, snapshot generator 212, timeline generator 213, node graph generator 214, AI overlay module 215, and jump game executing engine 216. In addition, as shown in FIG. 10 game processor 210 further includes video player 1010, replay engine 1015, jump game input manager 1020, replay start point selector 1025, ghosting engine 1030, and guiding engine 1035. One or more components of game processor 210, taken alone or in combination, are configurable to provide for jumping into the stored game play of a player participating in a gaming application via a video recording of the stored game play. Further, one or more components of game processor 210 provide for game play access via a video recording within a cloud-based gaming system, such as GCS 201, in other embodiments of the disclosure.

In particular, system 10 of FIG. 1 includes a game server 205 executing game processor module 210 that provides access to a plurality of interactive video games or gaming applications, and more particularly provides interactive access to a stored game play of a gaming application via a video recording of the game play. As shown in FIG. 1, client device 100 is configured for requesting access to a particular game play of a player in the form of a jump game play. The request for access may be made via a video recording of the game play of the player, such that an associated snapshot included and/or referenced through the video recording is used to instantiate the jump game play. In particular, the game server 2015 executes the instance of the gaming application to instantiate the jump game play based on the snapshot, and generates rendered images that are delivered to the client device 100 for display.

For instance, video player 1010 is configured for generating a plurality of video frames when playing a video recording of a selected game play of a player participating in a gaming application. Video player 1010 may work independently of or in cooperation with the video recorder 271 to generate, save, access, and/or play a recording (e.g., video, audio, etc.) of the game play, along with any game metrics corresponding to that game play. In one embodiment, a video recording of the stored game play is selectable through one or more snapshot images of the stored game play presented through a timeline that is rendered for display on client device 100, wherein the snapshot images are presented to show progression of the game play in the gaming application. That is, selection of one of the snapshot images captured during the game play provides for selection and play of the video recording of the stored game play. Image frames of the video recording are delivered over a network to the client device for display.

Further, the video recording includes or references a plurality of snapshots captured during the game play, wherein a snapshot includes metadata and/or information enabling the instantiation of an instance of the gaming application at the point in the game play corresponding to the snapshot capture. As such, selection of a jump point in the video recording (e.g., via a video frame) provides for the instantiation of a jump game play beginning at the jump point. In particular, replay engine 1015 is configured to create and execute an instance of the gaming application to instantiate the jump game play. The instance of the gaming application is instantiated based on an associated snapshot determined through the selection of the jump point, wherein the jump point may directly correspond to the associated snapshot, or wherein the jump point is located near to the associated snapshot, or between the associated snapshot and another snapshot. As such, the associated snapshot is used to instantiate the jump game play. In one implementation, the replay engine 1015 works independently of, or in cooperation with the jump game executing engine 216 to provide interactive access to a stored game play.

In particular, the replay start point selector 1025 is configured to determine the start point of the replay portion of the jump game play. That is, after selection of the jump point, an appropriate and associated initiating snapshot is selected to initiate and/or instantiate the instance of the gaming application that is used to execute the game play of the player, wherein the jump point may not correspond to a point in the game play where the initiating snapshot was captured. During the replay portion of the jump game play, the stored game play is automatically replayed up to the jump point from the point in the game play where the initiating snapshot was captured to the jump point, after which the jump game play becomes live for the requesting user, such that the replay engine 1015 and/or the jump game executing engine 216 handles input commands from the client device 100 of the requesting user.

In particular, during the replay portion of the jump game play, the jump game input manager 1020 determines and accesses a plurality of input commands used for execution by the instance of the gaming application. The plurality of input commands was previously used to direct the game play of the player. The plurality of input commands were captured and stored (e.g., in database 1040 of datastore 140 of FIG. 1) in association with one or more snapshots generated during the game play of the player. For example, a snapshot may store input commands used up to, and may include, the point at which the corresponding snapshot was captured, and may be collected beginning at a point associated with the previous and nearest snapshot. That is, the stored input commands for a corresponding snapshot bring the game play from a previous snapshot to the corresponding snapshot. Also, a snapshot may store input commands used at and/or after the point at which the corresponding snapshot was captured, ending at a point associated with the next and/or nearest snapshot. That is, the stored input commands for a corresponding snapshot bring the game play from the corresponding snapshot to the next snapshot. In another implementation, a snapshot may store input commands used previous to and after the point at which the corresponding snapshot was captured.

With the detailed description of the various modules of the gaming server 205 and client device 10 communicating over a network 150, a method for gaming is now described in relation to flow diagram 1100, in accordance with one embodiment of the present disclosure. In particular, flow diagram 1100 illustrates steps in a method that provide interactive access to a stored game play of a player participating in a gaming application, such as through a video recording of the game play. More specifically, the method of flow diagram 1100 discloses a method that provides for a user to jump into the stored game play based on a snapshot generated and captured during the game play, wherein the snapshot is selectable through a video recording of the stored game play. Flow diagram 1100 illustrates the process and data flow of operations involved at the game server 205 side of a cloud-based gaming system 201 (e.g., GCS 201) for purposes of generating information that is displayed over a network 150 at a client device 200.

Operation 1110 in the method includes delivering a video recording of stored game play over a network to a client device associated with a user. The stored game play is for a player participating in a gaming application. The user gains access to the stored game play for viewing, wherein the game play may be of a player other than the user, or may be a player that is the user.

In one embodiment, the video recording is selected through a timeline that includes one or more snapshot images of the game play. The timeline may be presented simultaneously with the game play of the user while participating in the gaming application, as previously described in relation to FIGS. 1-9. That is, while the user is playing the gaming application, the user may wish to preview a game play of another player through a video recording of that game play, and further through interactive access of the stored game play of the other player. Also, while the user is playing the gaming application, the user may wish to review his game play, through a video recording of stored game play of the user, and further through interactive access of the stored game play of the user. That is, the snapshot images in the timeline provide an association with and access to the corresponding video recording and/or interactive access to the stored game play in the form of a jump game play.

At 1120, the method includes receiving from the client device selection of a jump point in the game play via the video recording. That is, a selected point in the video recording defines a jump point, from which a requesting user would like to begin interactive access with a jump game play that is based on the game play of the player. In other words the requesting user desires to gain interactive access to the game play of the player, via the jump game play.

At 1130, the method includes instantiating and/or initiating an instance of the gaming application based on a snapshot, such as an initiating snapshot. The instance of the gaming application instantiates a jump game play. In particular, the video recording is associated with one or more snapshots captured during the game play of the player, including the initiating snapshot that is captured at a first point in the game play of the player. A snapshot includes metadata and/or information enabling the instantiation and/or initiation of an instance of the gaming application at the point corresponding to the snapshot capture. For example, a snapshot includes a snapshot image comprising a rendered image generated by a first instance of the gaming application executed in association with the game play of the player. The snapshot image corresponds to a video frame that corresponds to a point in the game play of the player.

For illustration, the initiating snapshot includes a first snapshot image, which corresponds to a first video frame of the video recording that further corresponds to the first point of the game play. The snapshot also includes game state data enabling the generation of an environment corresponding to the first point in the game play, as previously described. The snapshot also includes random seed data that provides additional features for the environment, as previously described. The snapshot also includes user saved data enabling generation of a character for the game play of said player, wherein the character has a first state corresponding to the first point in the game play. For example the user saved data may include the game difficulty selected by the player, game level, character attributes, character location, number of lives left, the total possible number of lives available, armor, trophy, time counter values, etc. The snapshot also includes at least one input command of the sequence of input commands, wherein input commands associated with the snapshot (e.g., leading up to or leading away from the snapshot) are captured and stored.

As such, the gaming application is started at the point corresponding to the capture of the initiating snapshot, and is based on a gaming environment previously defined by the stored game play (e.g., scene, character, etc.) of the player. For example, the initiating snapshot enables the instantiation and/or initiation of an instance of the gaming application at the first point in the game play of the player.

In one embodiment, the jump point may correspond to a captured snapshot, wherein the captured snapshot may be used to instantiate and/or initiate the jump game play, as previously described. For example, when the jump point directly corresponds to the initiating snapshot (and the first point), the initiating snapshot may be used to instantiate and/or initiate the jump game play beginning at the jump point, and wherein the jump game play immediately becomes live for the requesting user through execution of input commands from the requesting user.

In another embodiment, the jump point may not correspond to a snapshot that is used to instantiate the jump game play. That is, the jump game play is instantiated and executed by the instance of the gaming application based on the initiating snapshot, but the jump point may not directly correspond with the first point in the game play of the player, wherein the first point corresponds directly with the initiating snapshot. However, the jump point is associated with the initiating snapshot that is used to instantiate and/or initiate the jump game play, such that the jump game play may be used to reach the jump point. In particular, the jump game play includes a replay portion and a live portion. As such, the jump game play may be automatically executed through the replay portion to reach the jump point (e.g., using saved input commands from the stored game play), after which the jump game play becomes live for the requesting user through execution of input commands from the requesting user.

Specifically during the replay portion, at operation 1140 the method includes accessing a plurality of and/or sequence of input commands associated with the initiating snapshot and/or the jump point. The input commands were used to previously direct the stored game play of the player.

During the replay portion, the input commands when executed by the instance of the gaming application instantiating the jump game play replays the game play of the player from the first point to the jump point. Specifically, at operation 1150, the method includes generating at the instance of the gaming application a plurality of image frames based on the sequence of input commands for rendering at the client device. The plurality of image frames replays the game play of the player (in the jump game play) from the first point to the jump point. For example, the plurality of image frames includes a first image frame corresponding to a first video frame of the first point in the game play of the player, and a second image frame corresponding to a second video frame of the jump point. The replay portion generates image frames between the first image frame corresponding to the first point and the second image frame corresponding to the jump point.

In one embodiment, the method includes forwarding through the game play of the player that is replayed and/or recreated during the replay portion of the jump game play. That is, the sequence of input commands is executed in forward order in the instance of the gaming application, wherein input commands can be sequentially ordered for purposes of directing the original execution of the stored game play. In another embodiment, the method includes rewinding through the game play of the player that is replayed and/or recreated during the replay portion of the jump game play. That is, the sequence of input commands is executed in reverse order in the instance of the gaming application, wherein input commands can be sequentially ordered for purposes of directing the original execution of the stored game play In one embodiment, the method includes overclocking execution of the sequence of input commands That is, the replay portion of the jump game play is played in fast motion, such that the game play is shown fast forwarding from the first point to the jump point, or the game play is shown quickly rewinding from the first point to the jump point, as will be further described below in relation to FIG. 13A

After the replay portion, the jump game play proceeds to the live portion. Specifically, at operation 1160, the method includes handling input commands received from the client device and executed at the instance of the gaming application beginning from the jump point. Previously, during the replay portion of the jump game play input commands received from the client device were blocked from being handled by the instance of the gaming application.

In one embodiment, access is provided to current game play, which is actively being generated and stored in real-time. In particular, instead of a video recording, streaming live video is delivered over a network to the client device. That is, in flow diagram 1100, the content that is delivered in operation 1110 is a live streaming video of a live game play of a player participating in a gaming application. In that manner, snapshots captured during the live game play may be selectable to allow for the user to experience the live game play via a jump game play. That is, the user is able to select via a video frame of the streaming live video a snapshot captured during the live game play to initiate an instance of the gaming application to execute the jump game play.

Figure 11:
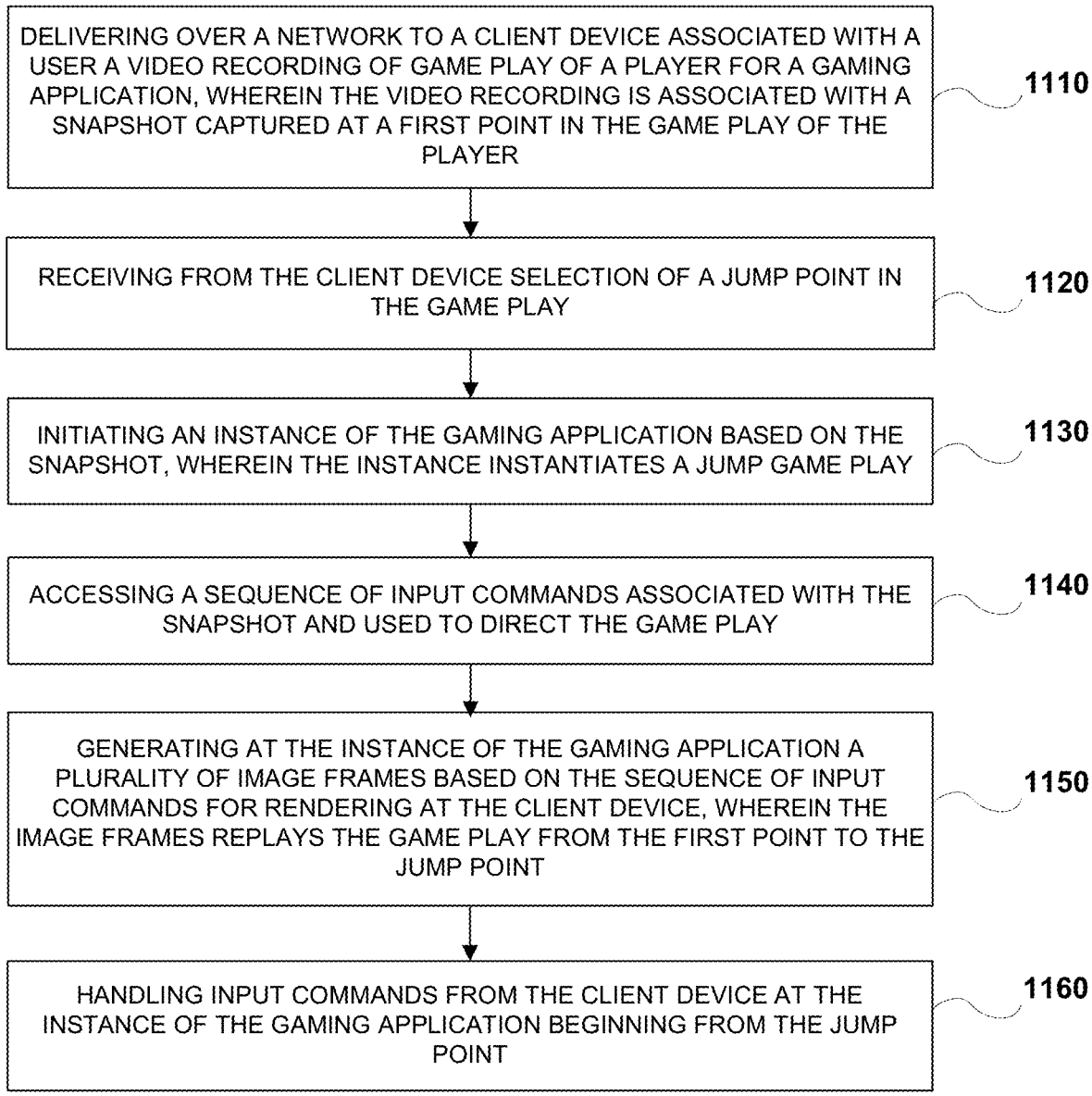
FIG. 11 is flow diagram illustrating steps in a method for gaming, and more particularly a method that allows a user to jump into the stored game play of a player participating in a gaming application based on a snapshot generated and captured during the game play, wherein the snapshot is selectable through a video recording of the stored game play, in accordance with one embodiment of the present disclosure.

FIG. 12A is an illustration of a plurality of video frames in a video recording 1201 of a stored game play of a player participating in a gaming application, wherein the video recording is used for interactive access to stored game play, in accordance with one embodiment of the present disclosure. In one implementation, the video recording 1201 is used in the selection of a jump point 1290 as described in operation 1120 of FIG. 11, and for initiating an instance of the gaming application to instantiate a jump game play as described in operation 1130. For purposes of illustration, video recording 1201 is shown as a bar representative of the length of the recording, and the approximate locations of each video frame within the video recording 1201.

In particular, video recording 1201 includes a plurality of video frames that when rendered at a client device is sequentially displayed. The video recording 1201 was generated during the game play of a player participating in a gaming application, and may be of a selectable length. For purposes of illustration, the video recording includes at least video frames 1210-1214 located at various points as shown in the navigation bar 1201. It is understood that one or more additional video frames may be located between any two of the video frames shown in FIG. 12A.

In addition, each of the video frames can be associated with at least one snapshot captured during the game play of the player. For purposes of illustration, FIG. 12A shows a close correlation between a video frame and a snapshot, such that the video frames 1210-1214 are shown because snapshots were captured at or near the points in the game play where the video frames were generated. It is important to note that a particular video frame may not directly correspond to a snapshot, but may be closely associated to a snapshot. For example, a video frame may be associated with the nearest captured snapshot. In that manner, the relationship between a video frame/video recording and a snapshot allows selection by association. For instance, by selecting a snapshot, its associated video frame and/or video recording is known. Also, by selecting a video frame within a video recording, its associated snapshot is known.

Video recording 1201 includes video frame 1210 that closely correlates to a captured snapshot SS-1 and its snapshot image 610. In particular video frame 1210 and snapshot image 610 show a point in the game play where the character 308 (woman protagonist) first comes upon a bear loitering in front of a cave located in the forest. In addition, video recording 1201 includes video frame 1212 that closely correlates to a captured snapshot SS-2 and its snapshot image 360e. In particular video frame 1212 and snapshot image 360e show a point in the game play where the character 308 is actively engaging or battling with an aggressive bear, wherein character 308 is shown with a coiled rope used as a weapon. Video recording 1201 includes video frame 1213 that closely correlates to a captured snapshot SS-3 and its snapshot image 615. In particular video frame 1213 and snapshot image 615 show a point in the game play where the character 308 has successfully subdued the bear and has tied up the limbs of the bear using the coiled rope. Further, video recording 1201 includes video frame 1214 that closely correlates to a captured snapshot SS-4 and its snapshot image 620. In particular video frame 1214 and snapshot image 620 show a point in the game play where the character has won a reward after the successful battle with the bear, to include a treasure chest full of coins as well as a rifle that can be used for subsequent battles.

In addition, video recording 1201 includes video frame 1211 that is located between video frame 1210 (e.g., SS-1) and video frame 1212 (e.g., SS-2). That is, video frame 1211 is located at a point in the game play of the player that is between two snapshots SS-1 and SS-2. A close association can be made between video frame 1211 and at least one of the two snapshots SS-1 and SS-2, such that either snapshot SS-1 or SS-2 can be used to provide interactive access to the game play of the player. Specifically, embodiments of the present disclosure provide for the selection of video frame 1211 (as shown by arrow that is located between two snapshots SS-1 and SS-2 as a mid-snapshot jump point, and using either snapshot SS-1 or SS-2 to initiate a jump game play. The jump game play includes a replay portion and a live portion, such that the jump game play may be automatically executed through the replay portion to reach the jump point (e.g., using saved input commands from the stored game play), after which the jump game play becomes live for the requesting user by handling input commands from the user.

Figure 12B:
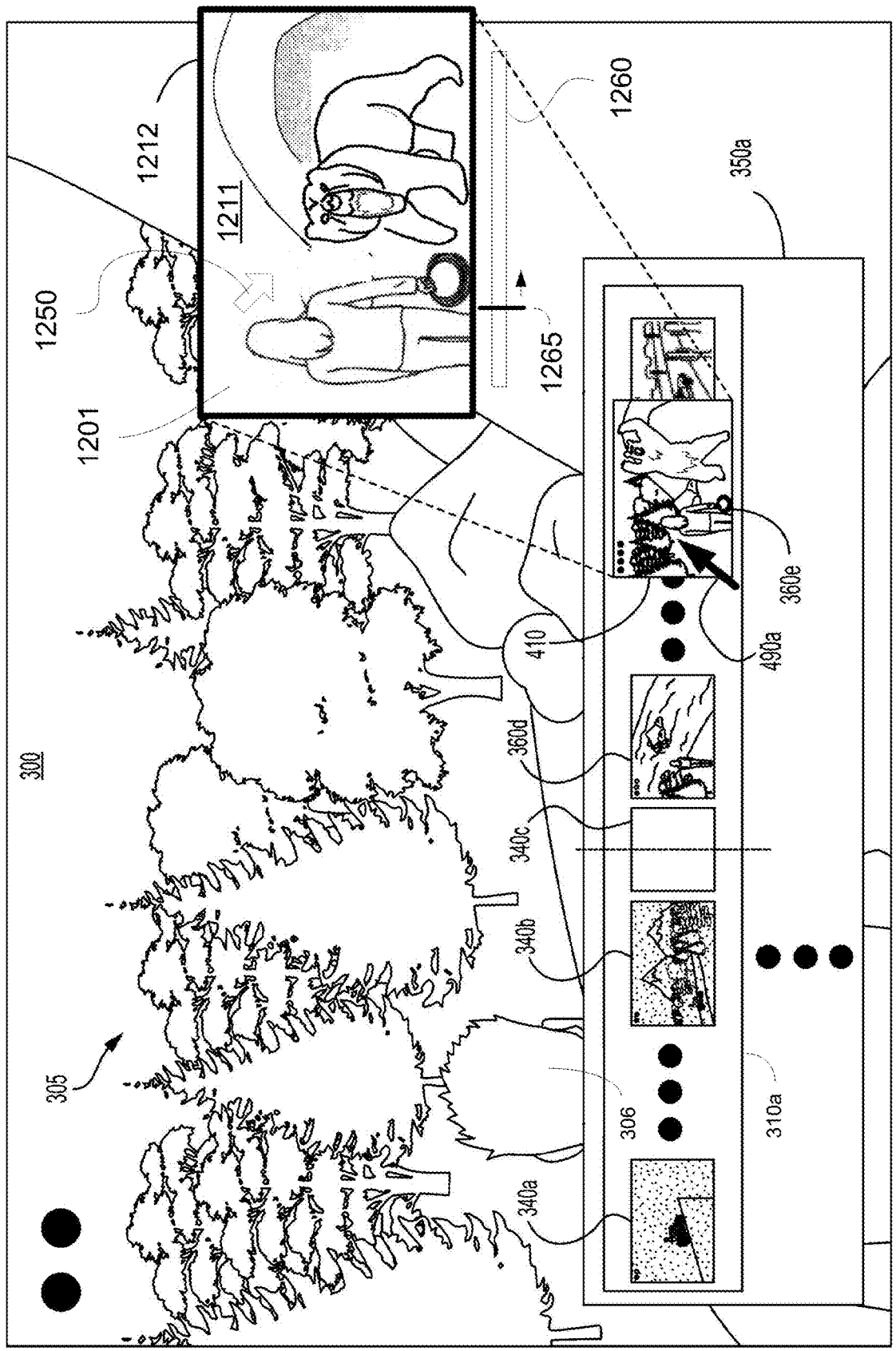
FIG. 12B is an illustration of a timeline displayed during game play of a gaming application by a user, wherein a timeline shows snapshot images of game play of the gaming application by a player, wherein selection of a snapshot image in the timeline provides for the display of a video recording of the game play corresponding roughly to a point in the game play associated with the snapshot image, and wherein selection of a video frame in the video recording instantiates an instance of the gaming application to execute a jump game play based on a snapshot captured during game play of the player so that the jump game play is playable by the user, in accordance with one embodiment of the present disclosure.

FIG. 12B is an illustration of a timeline 310a displayed during game play of a gaming application by a user, wherein passive or active interaction with the timeline 310a provides for display of a video recording of a stored game play of a player, and wherein further passive or active interaction with the video recording provides for interactive access with the game play of the player, in accordance with one embodiment of the present disclosure. In one implementation, the timeline 310a is used in the selection of a video recording as described in operation 1110 of FIG. 11, for selection of a jump point 1290 as described in operation 1120 of FIG. 11, and for initiating an instance of the gaming application to instantiate a jump game play as described in operation 1130.

As previously described, window 300 shows the currently rendered image 305 of the game play of the gaming application by a user. Timeline 310a includes snapshot images includes snapshot images (e.g., 360d, 360e, 360f, . . . ) of game play by the player (e.g., friend F1 playing character 308) at points in the progression through the gaming application occurring after the currently rendered image 305. The snapshot images may be presented in timeline 310a via thumbnails, for example. Active or passive selection of thumbnail provides for enlargement of the corresponding snapshot image, such as is shown by window 410 that is generated and displayed approximately in the same area of the selected thumbnail.

In one embodiment, active or passive interaction with the timeline 310a provides for selection of the video recording 1201 of the game play of the player. In particular, further active or passive selection (e.g., via cursor 490a) of a snapshot image 360e in timeline 310a provides for the selection of video recording 1201 of the game play of the player. For example, selection of snapshot image 360e may be through active or passive selection of window 410. The video recording 1201 may be shown in window 1212 concurrent with currently displayed image 305, in one implementation. In other implementations, window 1212 may be shown independently of window 300, such as in a full screen mode. The video recording 1201 corresponds roughly to a point in the game play associated with the selected snapshot image 360e. For example, the clip shown in video recording 1201 may be focused on the boss battle between the character 308 and the bear, and begin with video frame 1210 where the character 308 first comes up on the bear, and ends with video frame 1214 where the character 308 examines the loot after successfully battling the boss bear. As such, the video recording 1201 may begin play with video frame 1210, or may begin play with any video frame within video recording 1201, such as a video frame near the selected snapshot 360e.

Furthermore, the video recording 1201 shown in window 1212 may display any video frame that is shown by and selectable through navigation bar 1260. For example, moveable locator 1265 shows the approximate location of the video frame 1211 within the video recording 1201. Also, moveable locator 1265 may be directed to any point and/or video frame within the video recording 1201. As such, the video recording 1201 may play through video frames (e.g., forward, reverse, fast, slow), or pause on a particular video frame. For instance, after viewing the entirety of the video recording 1201, the user may elect to go back to video frame 1211 by moving locator 1265 to the appropriate location on navigation bar 1260. That is, the user is intrigued with the contents of the video recording 1201, and would like to interactively access the stored game play of the player, as described below. As an illustration, the user would like to experience the boss battle with the bear, and would like to begin the battle at video frame 1211, where the bear is aggressively approaching character 308.

In particular, further active or passive selection of the video recording provides interactive access to the stored game play. More specifically, further active or passive selection of a video frame (e.g., frame 1211) in the video recording 1201 defines a jump point 1290, and instantiates an instance of the gaming application to execute a jump game play based on an associated snapshot (e.g., SS-1 or SS-2) captured during game play of the player so that the jump game play is playable by the requesting user beginning from the selected jump point 1290. As previously described, the jump game play includes a replay portion and a live portion, such that the jump game play may be automatically executed through the replay portion to reach the jump point 1290 (e.g., using saved input commands from the stored game play), after which the jump game play becomes live for the requesting user by handling input commands from the user. Though the associated snapshot (e.g., SS-1 or SS-2) is shown having a corresponding video frame within the video recording 1201, in other embodiments the associated snapshot may not correspond to or be associated with a video frame of video recording 1201. That is, the associated snapshot may be outside of the video recording 1201. In any case, the associated snapshot provides for interactive access to the stored game play in a jump game play, and allows the user to begin interactive play with the jump game play beginning at the jump point 1290.

Figure 13A:
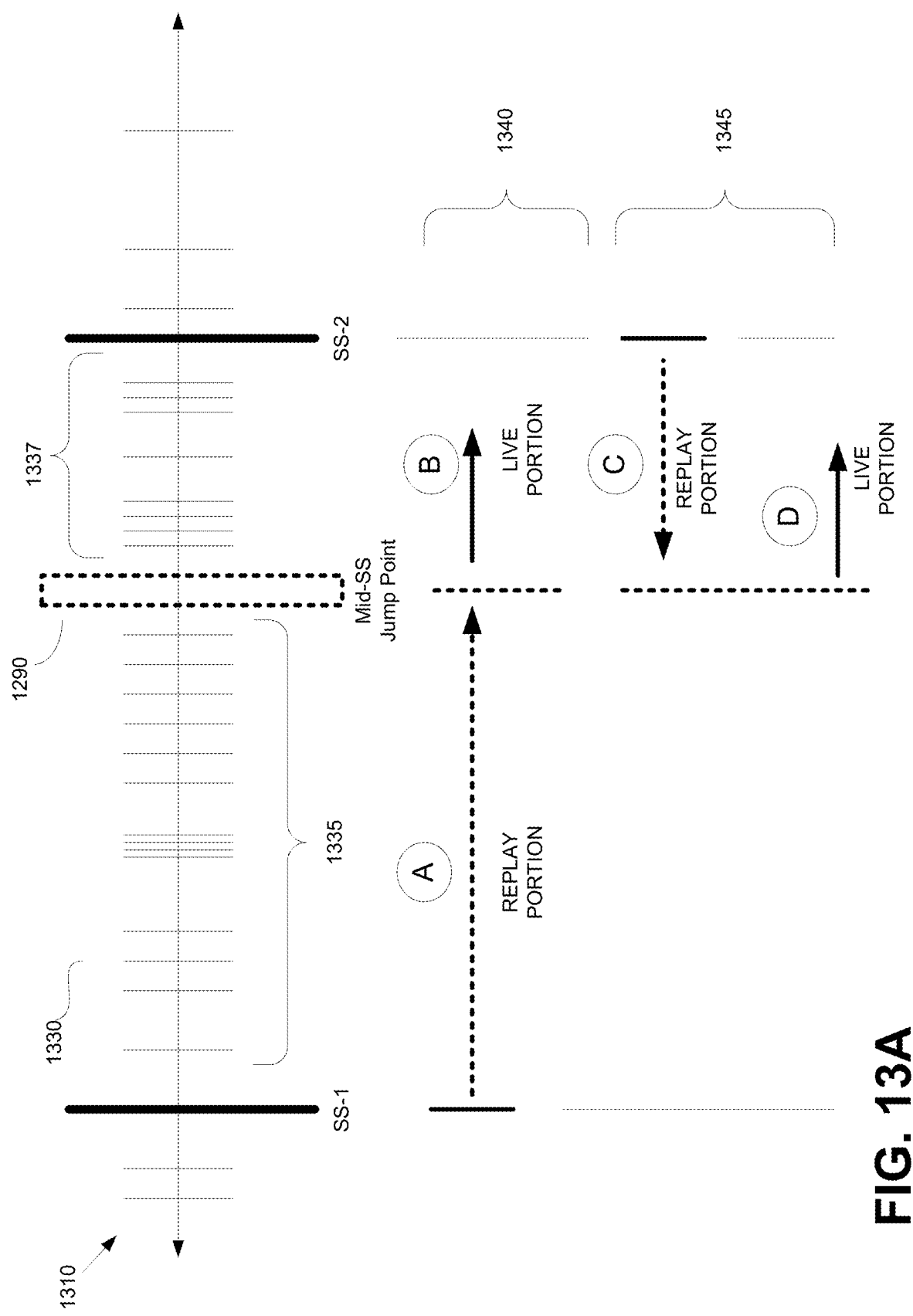
FIG. 13A is an illustration of a plurality of input commands previously used to direct a stored game play of a player participating in a gaming application, wherein a portion of the input commands (e.g., a sequence) is used to implement a replay portion of the jump game play, in accordance with one embodiment of the present disclosure

FIG. 13A is an illustration of a plurality of input commands 1330 previously used to direct a stored game play 1310 of a player participating in a gaming application, wherein a portion of the input commands (e.g., a sequence) is used to implement a replay portion of the jump game play, in accordance with one embodiment of the present disclosure. In particular, the stored game play 1310 includes a plurality of snapshots, including at least SS-1 and SS-2, wherein a snapshot includes metadata and/or information enabling the instantiation of an instance of the gaming application at a point corresponding to snapshot capture, as previously described. Snapshots SS-1 and SS-2 are shown at their approximate locations defining capture points during the game play 1310 of the player.

In addition, the stored game play 1310 includes the plurality of input commands 1330. Purely for illustration, these input commands may include directional commands issued through a toggle, left front button, right front button, up, down, right, left, and other selectable commands corresponding defined by symbols (e.g., box, triangle, cross, etc.) or letters, etc. These input commands were previously used to direct the stored game play 1310. As shown, the input commands may be ordered sequentially with or without periodic spacing between commands, in one embodiment. In other embodiments, the input commands may not be ordered, and/or may not be sequential. For example, multiple input commands may be simultaneously issued across different controllers to direct multiple objects, wherein the order may not be important.

As shown in FIG. 13A, a jump point 1290 is defined within the context of the game play 1310. For example, selection of a video frame (e.g., video frame 1211) defines the jump point 1290 both within the context of game play 1310, and within the context of the jump game play newly instantiated. For example, the jump point may be defined between SS-1 and SS-2, and is selectable through a corresponding video frame 1211 of video recording 1201, as an example. More particularly, the plurality of input commands 1330 includes a sequence of input commands 1335 that were issued between SS-1 and the jump point 1290. Also, the plurality of input commands 1330 includes a sequence of input commands 1337 that were issued between jump point 1290 and SS-2. These sequences 1335 and 1337 are used to implement and describe the replay portion of the jump game play, as will be further described below. Additional input commands are shown both before SS-1 and after SS-2.

Active or passive selection of the video recording, and more specifically video frame 1211, provides for the instantiation of the jump game play using an associated snapshot, such as SS-1 or SS-2, as previously described. Depending on which snapshot is selected, the jump game play will forward through a sequence of input commands to reach the jump point 1290, or rewind through a sequence of input commands to reach the jump point 1290.

Jump game play 1340 shows the determination that SS-1 is the associated snapshot used to initiate the instance of the gaming application to instantiate jump game play 1340. As shown, jump game play 1340 includes a replay portion defined by section A, and a live portion defined by section B. In the replay portion of section A, the jump game play 1340 automatically executes the game play 1310 of the player between SS-1 and jump point 1290 using the saved input commands from the stored game play 1310 (e.g., the sequence of input commands 1335). In this case, the sequence of input commands 1335 is executed in forward fashion to reach the jump point 1290. In one embodiment, the execution of the sequence 1335 is overclocked to quickly reach the jump point. After reaching the jump point 1290 in the replay portion, a transition is made from the replay portion of section A to the live portion shown by section B, where the jump game play 1340 becomes live by handling input commands from the user, such that the user is interactively directing the jump game play 1340.

Jump game play 1345 shows the determination that SS-2 is the associated snapshot used to initiate the instance of the gaming application to instantiate jump game play 1345. As shown, jump game play 1345 includes a replay portion defined by section C, and a live portion defined by section D. In the replay portion of section C, the jump game play 1345 automatically executes the game play 1310 of the player between SS-2 and jump point 1290 using the saved input commands from the stored game play 1310 (e.g., the sequence of input commands 1337). In this case, the sequence of input commands 1337 is executed in reverse fashion to reach the jump point 1290. In one embodiment, the execution of the sequence 1337 is overclocked to quickly reach the jump point. After reaching the jump point 1290 in the replay portion of section C, a transition is made from the replay portion of section C to the live portion shown by section D, where the jump game play 1345 becomes live by handling input commands from the user, such that the user is interactively directing the jump game play 1345.

In still another embodiment, during the replay portion, as the jump game play 1345 is executing additional or auxiliary content may be displayed in a separate window (not shown). In one embodiment, the auxiliary content may be overlaid the image frames being generated for display in the replay portion. For example, the auxiliary content may include an advertisement that is shown as the jump game play 1345 is executing during the replay portion. Further, in another embodiment, the auxiliary content may be responsive to user input. For example, the auxiliary content may be another jump game play.

Figure 13B:
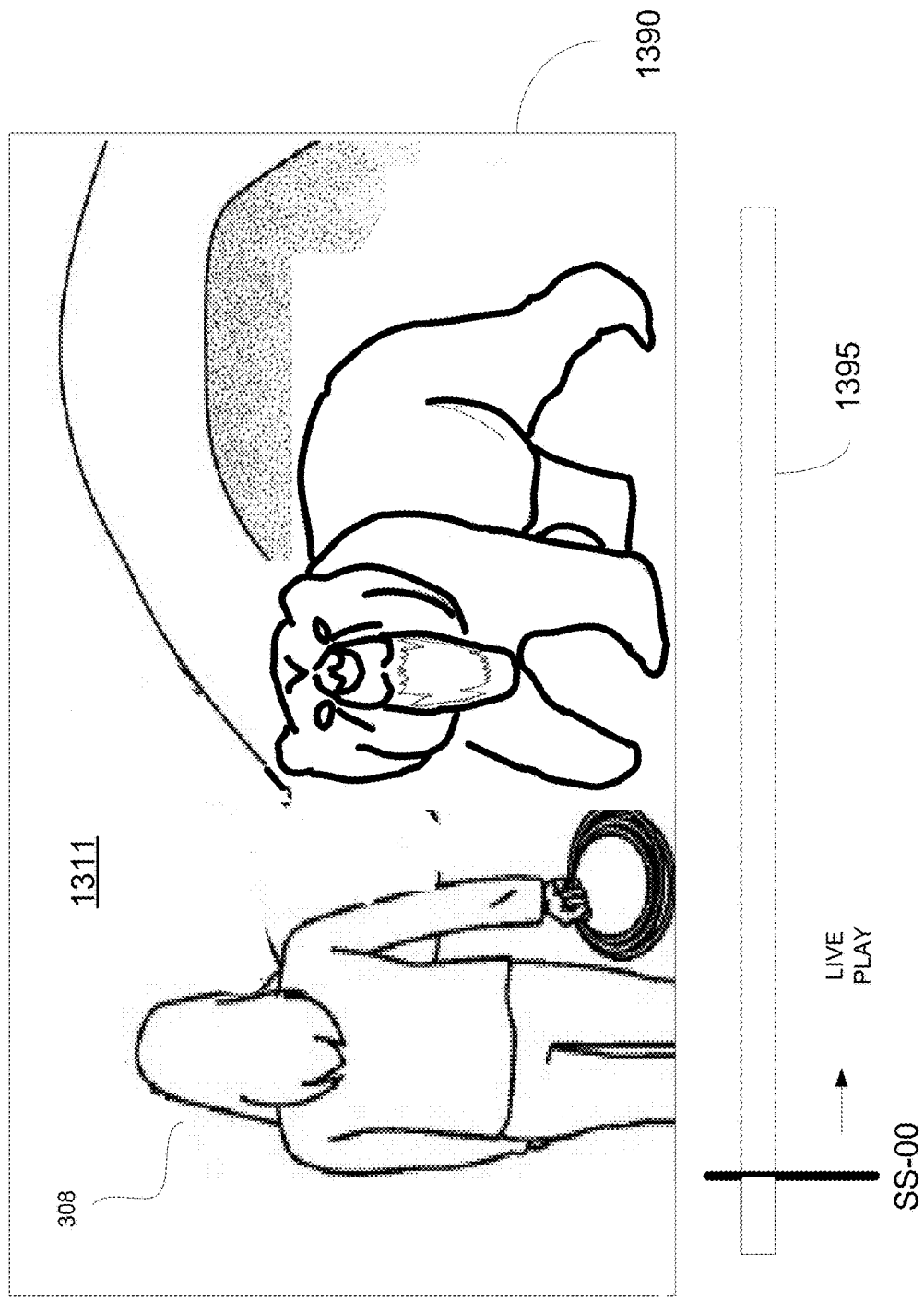
FIG. 13B is an illustration of an image frame corresponding to a jump point of a jump game play, wherein the jump game play is automatically executed to replay the game play of the player up to the jump point using saved input commands directing the game play, after which the jump game play becomes live by handling input commands from the requesting user, in accordance with one embodiment of the present disclosure.

FIG. 13B is an illustration of an image frame 1311 in a jump game play shown in window 1390, wherein selection of a video frame of a video recording instantiates an instance of a gaming application to execute the jump game play based on an associated snapshot captured during game play of the player, so that the jump game play is playable by the requesting user, in accordance with one embodiment of the disclosure. As shown, the image frame 1311 roughly corresponds to the jump point 1290 that is associated with video frame 1211 of the video recording 1201. That is, image frame 1311 shows that the bear is acting aggressively by turning and walking towards the character 308. As such, the user is able to interactively direct the jump game play shown in window 1390 beginning approximately from image frame 1311, which roughly corresponds to the jump point 1290, in a live portion of the jump game play.

In various embodiments, window 1390 may be independent of or shown simultaneously with window 300, wherein window 300 shows the current game play of the user participating in the gaming application. In that manner, the jump game play may be shown simultaneously with the current game play of the user (e.g., in a window overlay shown by window 1212), or the jump game play may be shown independently, such as in a full screen mode. The current game play of the user and the jump game play may be of the same gaming application, or different gaming applications, in embodiments.

In one embodiment, the jump game play is separately recorded and stored in a video recording. In addition, a plurality of snapshots may be captured during the jump game play at any point during the execution of the jump game play. For example, snapshot SS-00 is captured in the live jump game play, as is shown in progress bar 1395, where future/anticipated progress to the right of snapshot SS-00 is shown in a dotted manner In that manner, any user can experience the jump game play via a captured snapshot, and through a secondary jump game play that is newly instantiated. In particular, a selected snapshot captured during the jump game play can be used to instantiate an instance of a gaming application to execute a secondary jump game play based on the selected snapshot captured during the primary jump game play. In that manner, the user is able to experience any previous jump game play created by the same user, or may be able to experience stored jump game plays of other players.

Figure 14:
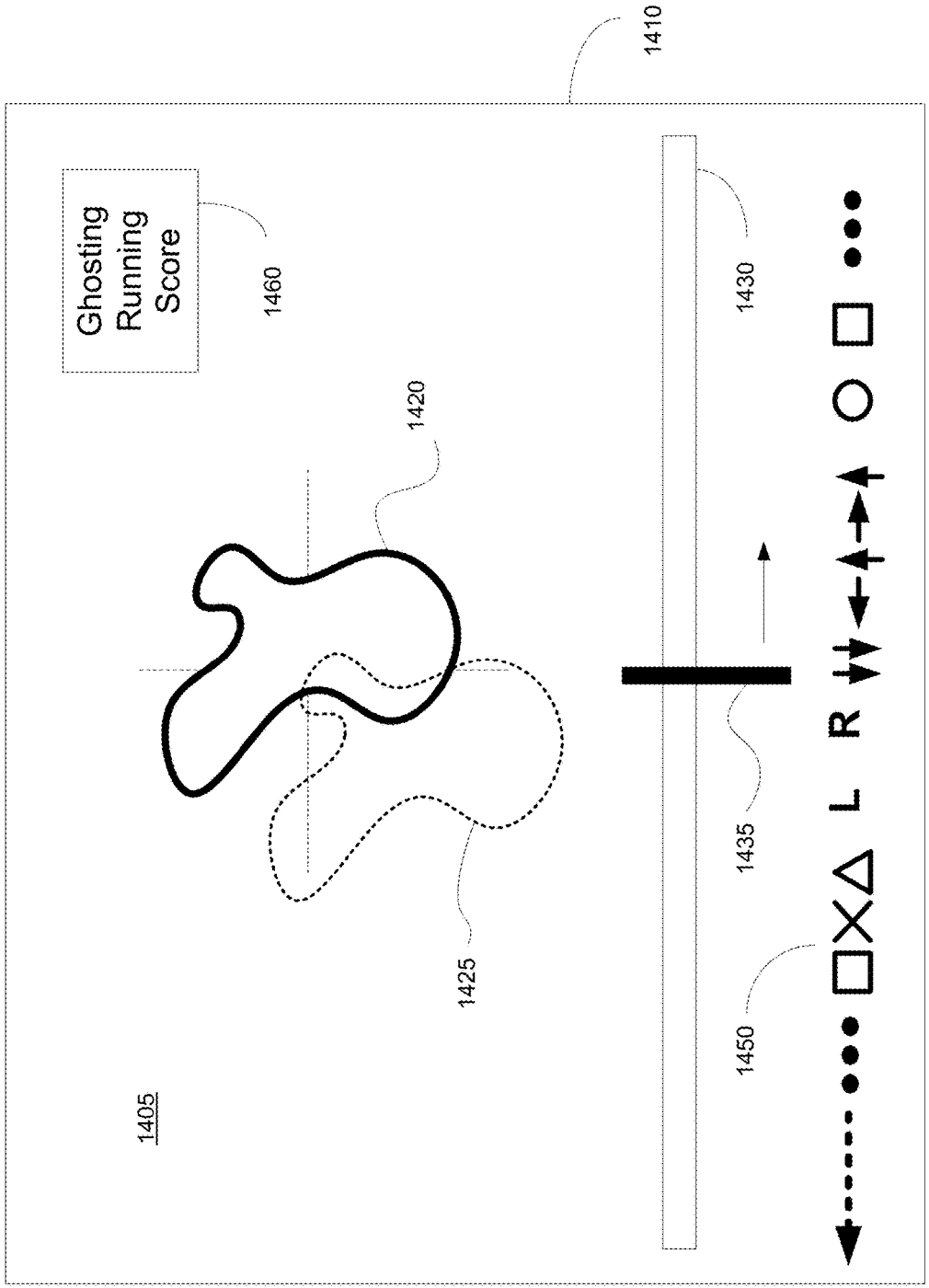
FIG. 14 is an illustration of a sequence of input commands presented during a jump game play that is instantiated based on a snapshot captured during game play of a player participating in a gaming application, wherein the sequence of input commands is automatically executed to replay the game play of the player up to a jump point after which the jump game play becomes live by handling input commands from the requesting user, and wherein the requesting user can mimic the sequence of input commands to direct a ghost object that is presented along with the original and corresponding object in corresponding image frames, in accordance with one embodiment of the present disclosure.

FIG. 14 is an illustration of a sequence of input commands presented during a jump game play that is instantiated based on a snapshot captured during game play of a player participating in a gaming application, in accordance with one embodiment of the present disclosure. By displaying the sequence of input commands, additional functionality may be provided to the user. In one embodiment, the displayed sequence of input commands may provide a guiding feature that helps guide the user to the jump point. In another embodiment, the displayed sequence of input commands may be used as for purposes of ghosting, wherein the user attempts to mimic the sequence of input commands in the correct and with the same timing, for example. A running score 1460 may be provided that indicates how closely the user is able to mimic the original game play.

As shown, window 1410 displays the jump game play via one or more image frames, including image frame 1405. In one embodiment, the replay portion of the jump game play is displayed in window 1410. For example, object 1420 is displayed as an executable of the replay portion of the jump game play, wherein the sequence of input commands 1450 is automatically executed to replay the game play of the player up to a jump point after which the jump game play becomes live by handling input commands from the requesting user. Object 1420 was originally generated in the game play of the player. The sequence of input commands 1450 used to direct the game play of the player is also shown. The sequence 1450 may be provided in an ordered sequence, wherein the input commands are presented in the order they were generated by a client device. For example, the sequence 1450 is overlaid on each of a plurality of image frames generated during the replay portion of the jump game play. Locator 1435 on progress bar 1430 indicates the current input command (e.g., down) corresponding to the image frame 1405. In one implementation, the locator 1435 is static as the sequence of input commands 1450 scrolls from right to left, or left to right. In another implementation, the locator 1435 also moves in relation to the sequence of input commands 1450, as long as the locator 1435 gives a relationship between the currently displayed image frame 1405 and the corresponding input command Other implementations are supported, such as displaying the sequence 1450 in a top down fashion, etc.

In one embodiment, the requesting user can mimic the sequence of input commands to direct a ghost object that is presented along with the original and corresponding object in corresponding image frames. In particular, the ghost object 1425 is responsive to a plurality of mimicked input commands (not shown). The ghost object 1425 overlays the image frame 1405 showing object 1420, and may be presented in a manner that does not interfere with object 1420 or other objects in the image frame 1405. The mimicked commands are generated at a client device of the user, and attempt to follow the sequence of input commands 1450. Depending on how closely the mimicked commands follow the sequence of input commands 1450 will determine the location and movement of ghost object 1425. The closer the mimicked commands follow the sequence 1450, the closer the alignment will be between the ghost object 1425 and the object 1420.

Figure 15C:
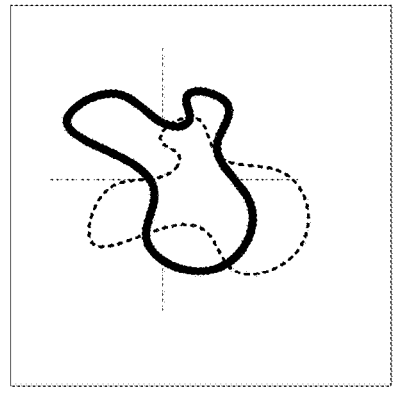
FIG. 15A-15E are illustrations of a ghost object mimicking the movement of a corresponding object, directed by saved input commands of a stored game play, throughout a sequence of image frames during a jump game play that is instantiated based on a snapshot captured during the stored game play associated with a player participating in a gaming application, wherein the saved input commands are automatically executed to replay the game play up to a jump point after which the jump game play becomes live by handling input commands of the requesting user, in accordance with one embodiment of the present disclosure.
Figure 15B:
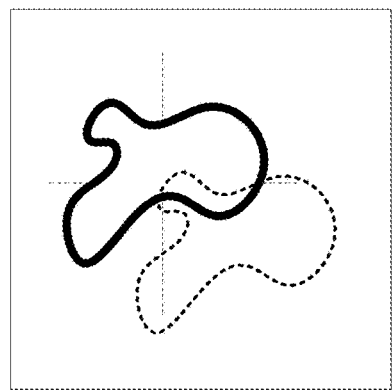
Figure 15A:
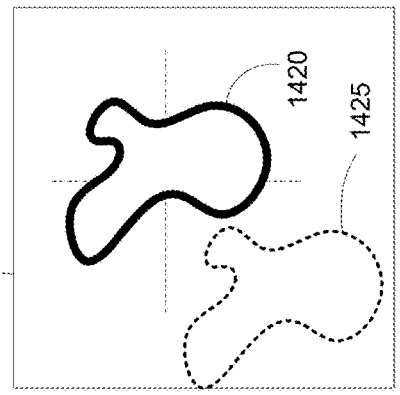
Figure 15E:
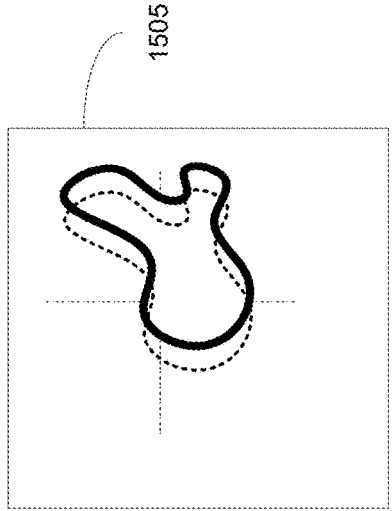
Figure 15D:
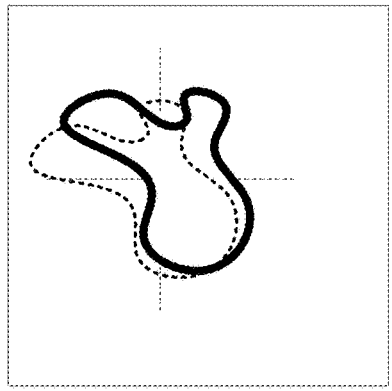

A score 1460 may be generated based on how closely the mimicked commands follow the sequence of input commands 1450 in terms of commands, order of commands, and/or timing of commands, etc. The score may overlay the image frame 1405. For illustration, FIGS. 15A-15E show the relationship and/or alignment between the object 1420 and the ghost object 1425 throughout various images frames as the user provides mimicked commands following the sequence of input commands 1450. As shown, the alignment between the objects becomes closer throughout the progress of the image frames. While image frame 1501 in FIG. 15a shows a coarse alignment (i.e., not closely aligned) between object 1420 and ghost object 1425, image frame 1505 in FIG. 15E shows a finer alignment (i.e., closely aligned) between the objects.

In another embodiment, the sequence of input commands 1450 is presented in the form of a tutorial. That is, the input commands instruct the user on how to proceed through a particular portion of the game play. For example, during the jump game play, control of the replay portion may actually be directed by the user, instead of automatically replaying the original game play. A ghost object 1425 may or may not be shown in FIG. 14 during the tutorial. As such, during the replay portion, input commands from the client device may be handled and used to control at least object 1420. The sequence of input commands is displayed and may help to direct the user towards the jump point. Further, in an effort to bring the jump game play to the jump point, an input command from the client device may be restricted in terms of handling, wherein the restricted input command does not follow a path to the jump point, and may unavoidably lead away from the jump point, for example. As such, an input command may be provided as guidance to the user (e.g., through the sequence of input commands) to bring the jump game play to the jump point.

Figure 16:
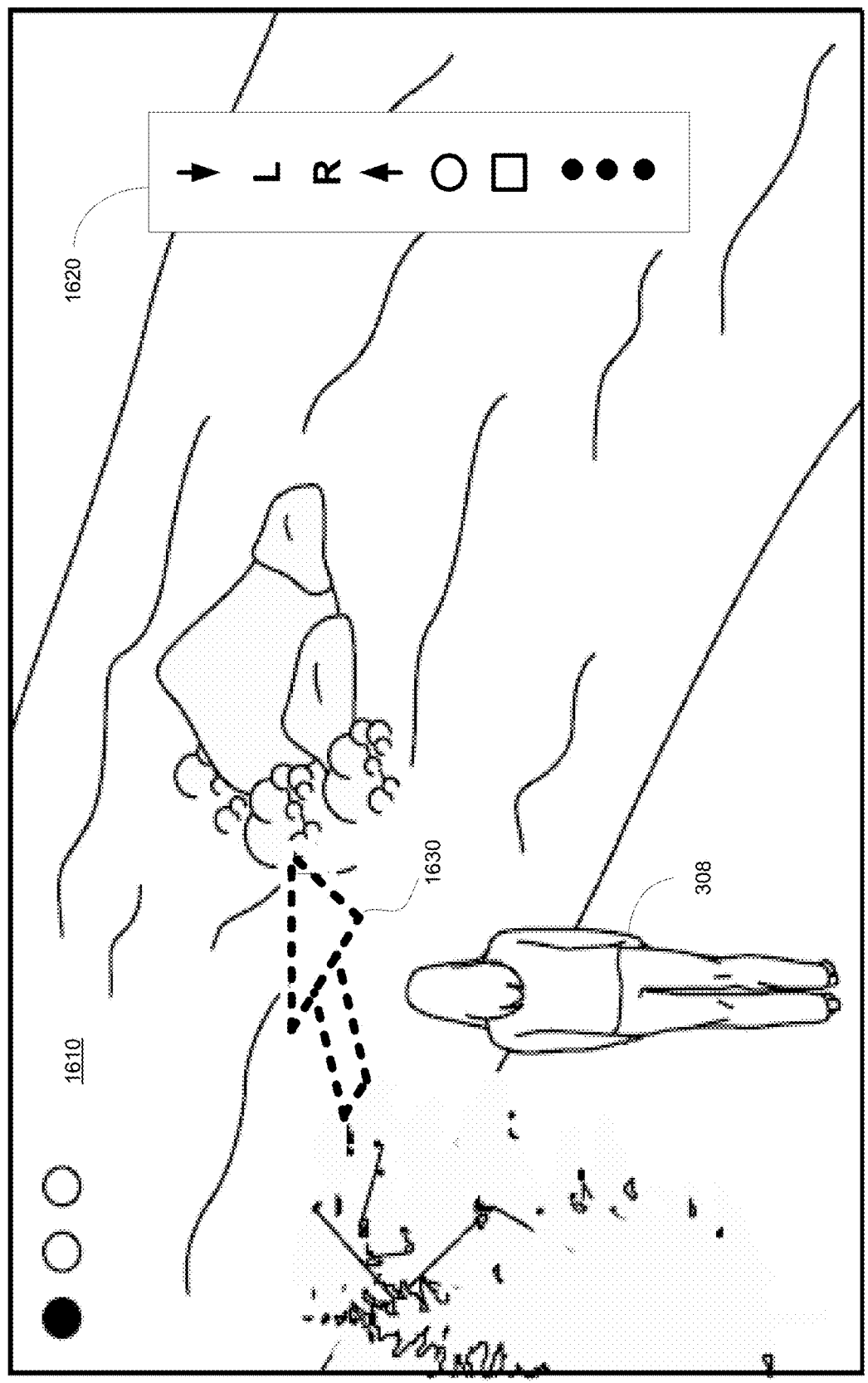
FIG. 16 is an illustration of feature used to guide a player to a jump point in a jump game play that is instantiated based on a snapshot captured during the stored game play associated with a player participating in a gaming application, in accordance with one embodiment of the present disclosure.

FIG. 16 is an illustration of feature used to guide a player to a jump point in a jump game play that is instantiated based on a snapshot captured during the stored game play associated with a player participating in a gaming application, in accordance with one embodiment of the present disclosure. As shown, a sequence of input commands 1620 may be displayed that when executed help guide the character 308 in a direction that leads to a jump point. For example, image frame 1610 closely corresponds with snapshot image 360d, which occurs before the jump point 1290 associated with video frame 1211 (an aggressive bear that is turning towards and walking towards character 308). The user may elect to start the jump game play at a point that occurs way before SS-1 corresponding to video frame 1210 (showing the bear in front of a cave), such as when character 308 is walking through the forest. The guiding feature will help lead the character 308 to the jump point 1290 by displaying the sequence of input commands 1620 used by the player in the stored game play. In addition, an aid, such as arrow 1630 (a visual aid), may be presented to help point the character 308 in the right direction (e.g., across the river).

Figure 17:
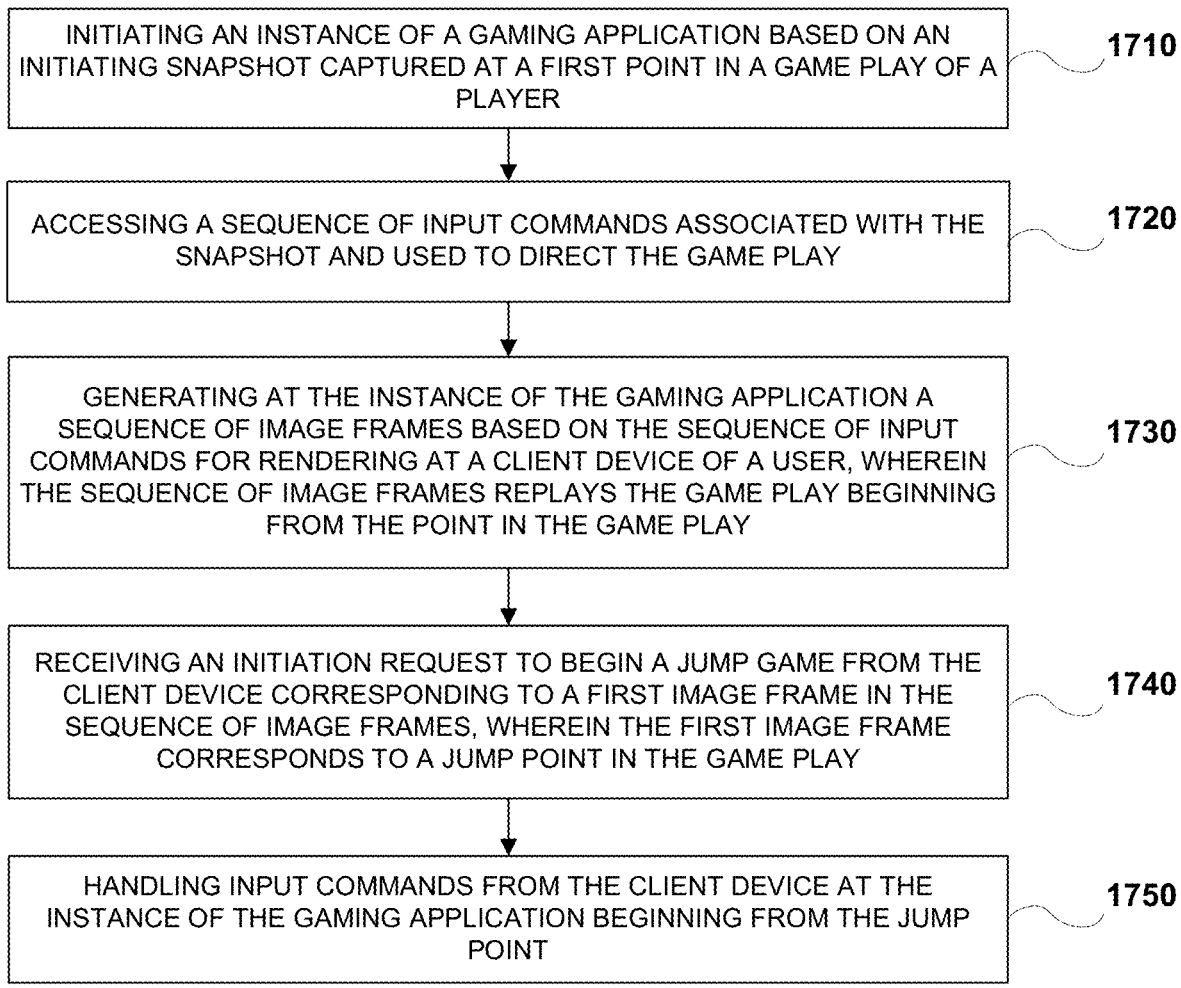
FIG. 17 is flow diagram illustrating steps in a method for gaming, and more particularly a method that allows a user to jump into the stored game play of a player participating in a gaming application based on snapshots generated and captured during the game play, in accordance with one embodiment of the present disclosure.

FIG. 17 is flow diagram 1700 illustrating steps in a method for gaming, and more particularly a method that allows a user to jump into the stored game play of a player participating in a gaming application based on snapshots generated and captured during the game play, in accordance with one embodiment of the present disclosure. Flow diagram 1700 may be implemented by the various modules of gaming serve 205 and client device 10 that are communicating over a network 150. In particular, flow diagram 1700 illustrates steps in a method that provides interactive access to a stored game play of a player participating in a gaming application. More specifically, the method of flow diagram 1100 discloses a method that provides for a user to jump into the stored game play based on a snapshot generated and captured during the game play. Flow diagram 1100 illustrates the process and data flow of operations involved at the game server 205 side of a cloud-based gaming system 201 (e.g., GCS 201) for purposes of generating information that is displayed over a network 150 at a client device 200.

At operation 1710, the method includes initiating an instance of a gaming application based on an initiating snapshot captured at a first point in a game play of a player. The instance of the gaming application instantiates a jump game play. The initiating snapshot includes metadata and/or information enabling the instantiation and/or initiation of an instance of the gaming application at the point corresponding to where the initiating snapshot was captured in the game play.

The initiating snapshot may be selectable through a video recording of the game play. In one implementation, the video recording is a live streaming video, such that the stored game play is considered a live game play that is also concurrently stored in real-time. Video frames in the video recording can be associated with one or more snapshots generated and captured during the game play of the player, including the initiating snapshot that is captured at a first point in the game play of the player. For example, a snapshot includes a snapshot image comprising a rendered image generated by a first instance of the gaming application executed in association with the game play of the player. The snapshot image corresponds to a video frame that corresponds to a point in the game play of the player, and may be used to initiate a jump game play beginning at that point.

At operation 1720, the method includes accessing a sequence of input commands associated with the initiating snapshot, wherein the sequence of input commands were previously used to direct the stored game play of the player.

At operation 1730, the method includes generating at the instance of the gaming application a plurality of image frames based on the sequence of input commands for rendering at a client device of a user. In particular, the plurality of image frames replays the game play from the first point in the game play. At this point, the replay portion of the jump game play is executing. In one embodiment, the replay portion executes until reaching a jump point, which can be defined through active or passive selection of a video frame of the video recording.

In another embodiment, the jump point is actively defined during the replay portion. In particular, at operation 1740, the method includes receiving an initiation request to begin the live portion of the jump game play at a selected image frame in the plurality of image frames. For example, as the plurality of image frames are being displayed during the replay portion, active or passive interaction with a first image frame provides the initiation request to begin the live portion, after which the jump game play becomes live for the user through the handling of input commands from the client device of the user. Further, the replay portion is deactivated, such that remaining input commands in the sequence that have not been executed are blocked from execution at the instance of the gaming application instantiating the jump game play. In this manner, the jump point may be selectable during the replay portion, such that a previously defined jump point (selected via a video frame of the video recording) may be redefined during the replay portion. For example, the user may eagerly want to begin active interaction within the jump game play. In another implementation, the jump point may be initially defined through interaction with the replay portion of the jump game play.

Companion Application

Generally speaking, the various embodiments of the present disclosure describe systems and methods providing for gaming that includes the implementation of a companion application supporting the game play of a first user is disclosed. The companion application provides information relating to the game plays of a plurality of users, all simultaneously playing the same gaming application in either single-player or multi-player modes. The information provided is synchronized to the current game plays of the users, so that the information is relevant within the context of the gaming environment of the first user. In that manner, navigation assistance can be provided within a companion application interface that shows the locations of one or more characters within a gaming world of a gaming application, wherein the characters are instantiated within the game plays of the users. For example, navigation assistance (e.g., pointers) can be provided in the interface that gives guidance to the first user to a location of an object within the gaming application, wherein the object may be character instantiated within the game play of a friend to the first user, a point of interest within the gaming world or universe, a boss, interesting game feature, etc. For example, the interface may provide the location of a first character of the first user in relation to locations of other characters of other users simultaneously playing the gaming application. The companion application may also provide coaching to help the first user achieve a goal, wherein the coaching may be based off the game play of a second user, or wherein the coaching may be directly provided by a second user. For example, the coaching may show controller inputs that generally or directly help to achieve a goal or task (e.g., beat the boss) within the gaming application.

Accordingly, embodiments of the present disclosure provide for additional uses of a gaming application. Embodiments provide benefits and advantages including allowing older gaming applications that have fallen out of favor to gain new life by providing information relating to multiple game plays to circulate amongst the users (e.g., for each user through a corresponding companion application interface). This enables a multi-player experience for a gaming application that was originally developed for a single-player experience. For example, a second user is able to provide helpful information to a first user through the companion application in order to achieve a goal (e.g., beat a difficult section of the gaming application), or to bring the first user to an interesting part of the gaming world, or to provide an avenue to enable communication between the two users while both are simultaneously playing the gaming application to create a multi-player gaming experience. In that manner, a new form of a multi-player gaming experience is enabled that provides for one user to participate in the game play of another user. For instance, each user can be commenting (e.g., text, audio, etc.) on the game play of the other user (e.g., encouragement, gamesmanship, shaming, celebration, taunting, etc.). Also, a second player may directly participate in the game play of a first user through the insertion of a character overlay into the game play, wherein the second user directly controls the inserted character within the gaming environment associated with the game play of the first user. Still other embodiments provide the above accomplishments, and provide additional benefits and advantages including integrating the game play of multiple users that are executed in isolation in a game cloud system (GCS) within a single gaming world (e.g., of a first user). Still other embodiments of the present disclosure provide the above accomplishments and provide further benefits and advantages including providing a better user experience within the game play of a gaming application to a user. For example, the user need not struggle through difficult sections of a gaming application, and may enlist of the help of other users (e.g., step by step command instructions, video recording of successful game play, etc.) via a companion application, or may directly discover (e.g., through information from other users) interesting sections of the gaming application without having to randomly discover those sections. Also, the user can play new and older gaming application in a new way that integrates the game plays of multiple users all simultaneously playing a single gaming application, and possibly in isolation.

Embodiments of the present disclosure providing for the implementation of a companion application supporting the game play of a user that includes information relating to the game plays of a plurality of users all simultaneously playing a gaming application may be implemented within the systems of FIGS. 1-2 previously described.

Figure 18:
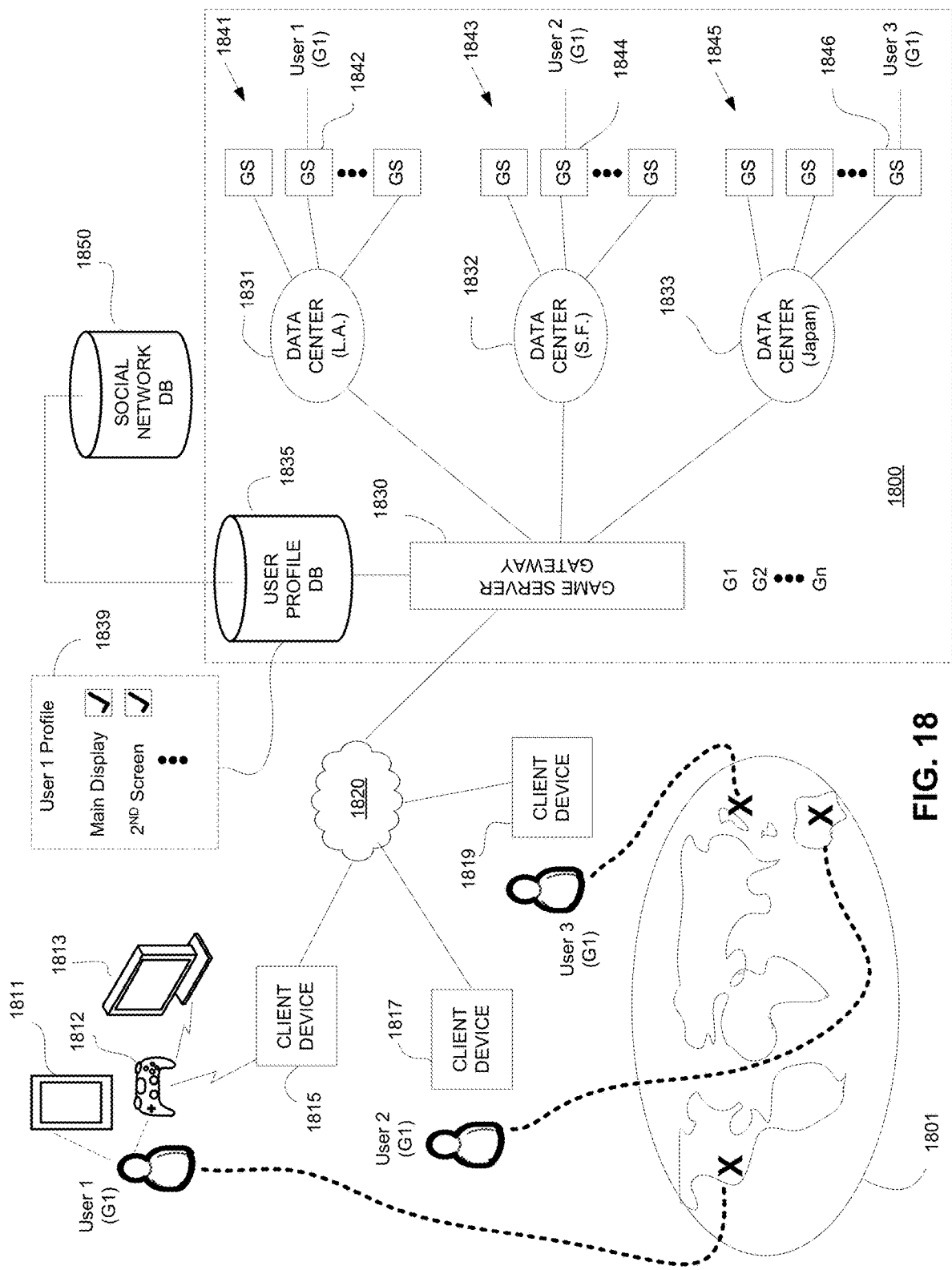
FIG. 18 illustrates a system diagram for enabling simultaneous game play of a gaming application for a plurality of users as executed within a game cloud system (GCS), and for implementing a companion application supporting the game play of a first user, wherein the companion application provides information relating to the game plays of a plurality of users including the first user, all simultaneously playing the same gaming application, in accordance with one embodiment of the present disclosure.

FIG. 18 illustrates a system diagram for enabling simultaneous game play of a gaming application for a plurality of users as executed within a game cloud system (GCS), and for implementing a companion application supporting the game play of a first user, wherein the companion application (also referred to as a 'companion interface' or 'companion application interface') provides information relating to the game plays of a plurality of users including the first user, in accordance with one embodiment of the present disclosure. The information may be based on current and/or past game plays of multiple users playing the same gaming application in a crowd sourcing environment, such that the information may be determined through observation and/or analysis of the multiple game plays. In one embodiment, the information provided in the companion interface may be related to game plays of users simultaneously playing the same gaming application (e.g., information is related to game plays of friends of the user who are simultaneously playing the gaming application, wherein the information provides real-time interaction between the friends), wherein the information advances the user's game play or provides an enhanced user experience. In another embodiment, the first user is playing the gaming application in isolation, and receiving information through the companion interface that is helpful in advancing the game play of the first user, or for providing an enhanced user experience.

As shown in FIG. 18, a plurality of users can access a plurality of gaming applications (e.g., video games) (e.g., G1, G2 . . . Gn) stored and/or executed in GCS 1800. In particular, users 1-3 each access GCS 1800 through network 1820. For example, user 1 accesses GCS 1800 through network 1820 via a client device 1815, wherein client device may be any type of computing device having at least a memory and a processor module configured for providing network capability to the GCS 1800, such as a thin client (in the case of GCS execution of the gaming application), or a gaming console allowing for partial or complete execution (e.g., local execution) of the gaming application. In one implementation, client device 1815 is configured for requesting access to gaming applications over network 1820 and for rendering instances of the gaming applications executed by the GCS 1800 and delivered to display device 1813 for user 1. Client device 1815 may receive input from various types of input devices for providing commands to the instances of gaming applications, such as game controller 1812, tablet computers 1811, keyboards, gestures captured by video cameras, mice, touch pads, etc. A second computing device 1811 (e.g., tablet computer, etc.) provides user 1 access to a companion application interface that supports the game play of user 1 with additional information relating to the game plays of multiple users, all simultaneously playing the same gaming application. User 2 and user 3 have similar configurations of client devices, input devices, and secondary computing devices, wherein user 2 is associated with client device 1817, and user 3 is associated with client device 1819.

More particularly, each of the users 1-3 accesses a corresponding instance of a particular gaming application (designated as "G1") that is executing in GCS 1800. In that manner, users 1-3 are simultaneously playing gaming application G1, though not necessarily in a multi-player gaming environment. For example, each of users 1-3 may be playing gaming application G1 in a single-player mode, but may provide game play information to the other users through a companion application interface. As shown, user 1 is geographically located in the western part of the United States of America as shown on world map 1801, user 2 is geographically located in Australia, and user 3 is located in Japan.

In one embodiment, GCS 1800 provides similar functionality as GCS 201 of FIG. 2, but through a different and/or more detailed configuration. Generally speaking, GCS 1800 may be a cloud computing system operating over a network 1820 to support a plurality of users. GCS 1800 includes a game server gateway 1830 that controls distribution of services provided by GCS 1800, one or more data centers (e.g., data center 1831 located in Los Angeles of U.S.A., data center 1832 located in San Francisco of U.S.A., and data center 1832 located in Japan), and game servers supporting the data centers (e.g., plurality of game servers 1841 support L.A. data center 1831, plurality of game servers 1843 support San Francisco data center 1832, and plurality of game servers 1845 support Japan data center 1833). The game servers in the pluralities 1841, 1843, and 1845 may be configured similarly as game server 205 first introduced in FIGS. 1-2. In particular, game server gateway 1830 is able to determine to which data center, and possibly which game server (GS) in which data center, should handle a request for services from a corresponding user. For example, gateway 1830 may take into consideration quality of service (QoS), bandwidth supplied or contracted for a requesting user, geographic location of the requesting user, geographic location of the data center supporting the user, and/or the requested gaming application (i.e., certain game servers are preconfigured or preloaded to handle a particular gaming application that is requested), in addition to other parameters in order to determine how to assign back-end game server support to a requesting user. Some of this information may be accessed via user profiles stored in database 1835, wherein the user profile may include information relating to contracted QoS, bandwidth support, geographic location of the user, etc. As shown, gateway 1830 has assigned user 1 to game server 1842 of L.A. data center 1831, has assigned user 2 to game server 1844 of San Francisco data center 1832, and has assigned user 3 to game server 1846 of Japan data center 1833. In one implementation, gateway 1830 assigns a user to a particular data center, and the data center handles the distribution of the request to a corresponding game server.

As shown, game server gateway 1830 may access user profiles of the users 1-3 from database 1835 to determine additional information necessary for providing companion application features, such as the gaming application currently playing, list of friends for matching purposes, etc. For example, user profile 1839 for user 1 may indicate that user 1 has a main display and second screen activated, wherein the second screen is configured to display a companion application interface, as will be further described below. Also, user profile database 1835 may include information from other databases such as the social network database 1850 to populate a list of friends in a user profile of a corresponding user for purposes of accessing information from game plays of those friends useful to user 1 and provided through a companion application interface.

Figure 19:
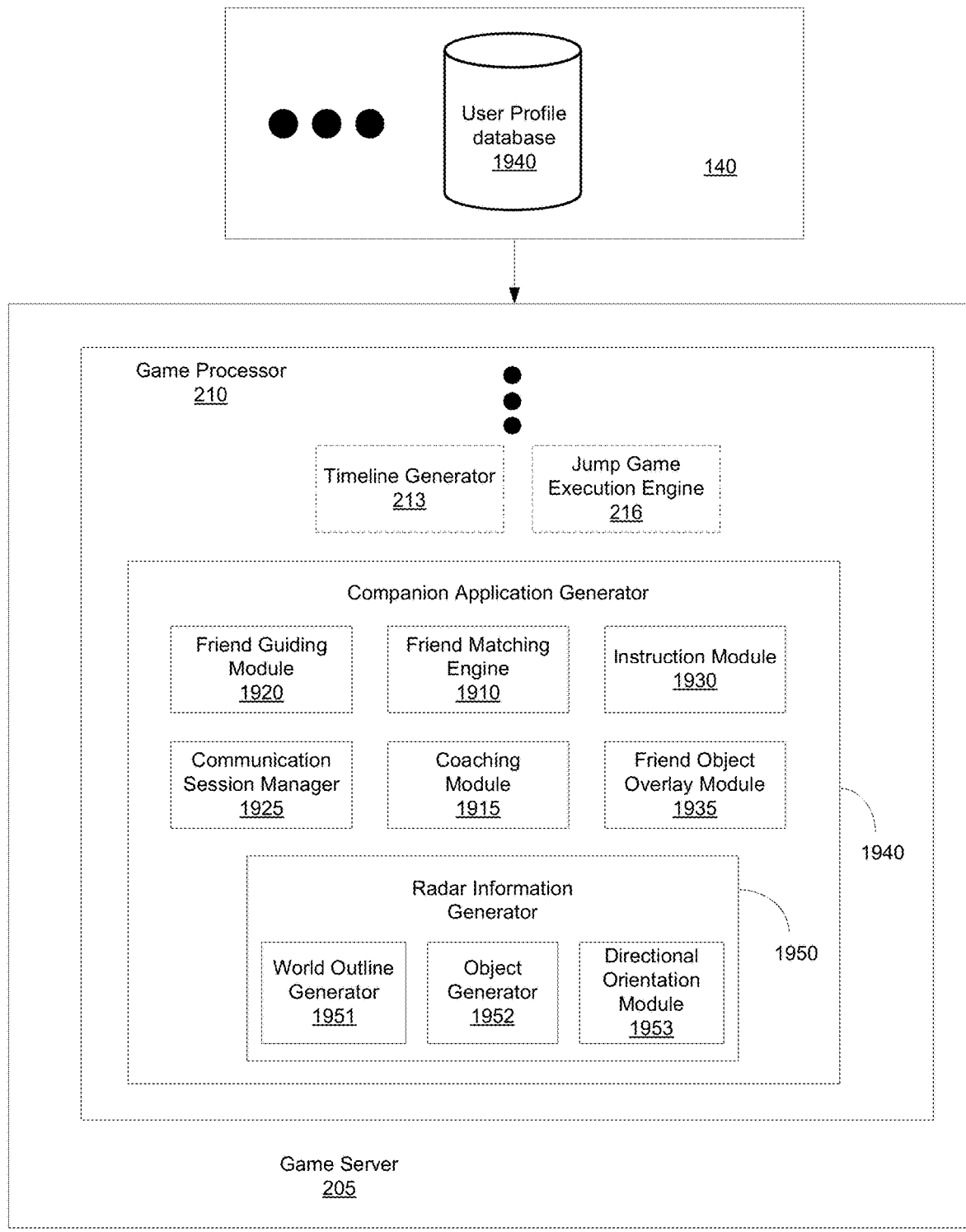
FIG. 19 illustrates a block diagram of a system used for generating and implementing a companion application supporting the game play of a first user, wherein the companion application provides information relating to the game plays of a plurality of users including the first user, all simultaneously playing the same gaming application, in accordance with one embodiment of the present disclosure.
Figure 20:
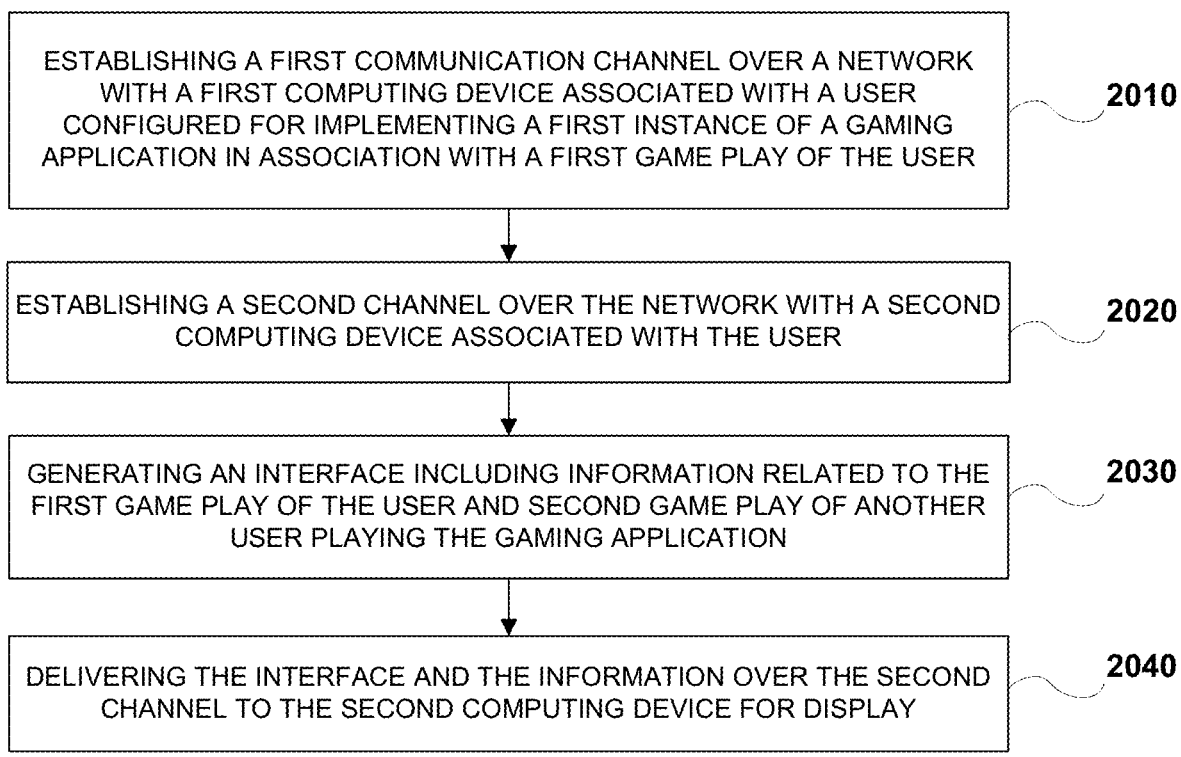
FIG. 20 is a flow diagram illustrating steps in a method for gaming that includes the implementation of a companion application supporting the game play of a first user, wherein the companion application provides information relating to the game plays of a plurality of users, all simultaneously playing the same gaming application, in accordance with one embodiment of the present disclosure.

FIG. 19 illustrates a block diagram of a system used for generating and implementing a companion application supporting the game play of a first user, wherein the companion application provides information relating to the game plays of a plurality of users including the first user, in accordance with one embodiment of the present disclosure. The information may be based on current and/or past game plays of multiple users playing the same gaming application. In that manner, crowdsourced content may be discovered during the game plays, wherein the content may be helpful for other players playing the same gaming application, or provide an enhanced user experience to these other players. For example, in some embodiments components used for the implementation of a companion application may be included within the game processor 210 of game server 205, previously introduced in FIG. 1, or within a separate processor configured to provide a companion application within game server 205. Further, the game server 205 is included within the game cloud system (GCS) 201 of FIG. 2, such that GCS 201 is configurable to provide companion application features to a first user while the first user is playing a gaming application. In another embodiment, the components used for implementation of the companion application may be included within a game processor that is local to the user.

In particular, game processor 210 includes various components configured to instantiate an instance of a gaming application. In some embodiments, the instance of the gaming application is instantiated as a jump game play and is based on a snapshot (e.g., accessed via a timeline or video recording) captured during a previous game play of a player playing or participating in a gaming application. Game processor 210, previously introduced in FIG. 1, includes game executing engine 211, snapshot generator 212, timeline generator 213, node graph generator 214, AI overlay module 215, and jump game executing engine 216. Further, game processor 210 may include additional components previously introduced in FIG. 10, such as a video player 1010, replay engine 1015, jump game input manager 1020, replay start point selector 1025. For brevity and clarity, not all components previously introduced are shown in FIG. 19. In addition, as shown in FIG. 19, game processor 210 further includes a companion application generator 1940, and a radar information generator 1950, both of which are used to provide companion application features. One or more components of game processor 210, taken alone or in combination, are configurable to provide for a the implementation of a companion application supporting the game play of a first user, wherein the companion application includes information relating to the game plays of a plurality of users playing the same gaming application either in single-player or multi-player mode.

In particular, game server 205 includes a game processor module 210 that provides access to a plurality of interactive video games or gaming applications. For example, game processor module 210 may be configured for executing an instance of a gaming application (e.g., on a game executing engine 211 of FIG. 2) and for delivering rendered images for display at a client device of a first user that are in response to input commands for a corresponding client device of the first user in association with game play of the first user.

Moreover, game server 205 is configurable to implement a companion application providing features in support of the game play of the first user. For instance, the companion application generator 1940 includes a friend guiding module 1920, friend matching engine 1910, instruction module 1930, communication session manager 1925, coaching module 1915, friend object overlay module 1935, and radar information generator 1950. The companion application provides an interface enabling the first user to access information that is generally helpful to the game play of the first user while playing a gaming application. The information is based on the game plays of the first user and other users, such as friends of the first user. The information may include navigation pointers, interesting game features and their locations, instructions, coaching, radar mapping interface, access to other features such as snapshot information and jump game play instantiation, etc.

In particular, the friend matching engine 1910 is configured to discover friends of the first user (e.g., by accessing profile information of social networks), and match the user with a group of friends that are currently playing the gaming application simultaneous with the first user based in part on information included within the user profile database 1940. A communication session manager 1925 is configured to establish a communication channel for delivering and supporting the companion application, wherein the companion application may be displayed on a secondary device that is different than a primary device used for displaying and interacting with rendered images generated during game play of the first user.

The companion application generator 1940 includes a radar information generator 1950 that is configured to generate radar mapping showing locations of various objects of interest to the first user within a gaming world of the gaming application. In particular, object generator 1952 is configured to create and locate objects associated with game plays of the first user and other users into the radar mapping of the first user. These objects include locations of the character associated with game play of the first user and other characters associated with game plays of the friends of the first user. In that manner, the first user is able to navigate to areas of the gaming world currently occupied by his or her friends, so that they may participate in some form of multi-player gaming. Also, radar information generator includes a world outline generator 1951 that is configured to create and integrate an outline of at least a portion of the gaming world within the radar mapping. Further, the radar information generator includes a directional orientation module 1953 that is configured to show an orientation of the first user within the gaming world via the radar mapping.

Companion application generator 1940 also includes an instruction module 1930 that is configured to generate for display instructions that provide information to or assist the first user on possibly difficult sections of the gaming application. For example, instruction module 1930 may provide instructions on how to achieve a goal, or how to complete a task, etc. The instructions may be generated in response to a request for assistance from the first user through a companion application interface, and may be based on game plays of other users. Similarly, the coaching module is configured to provide for display coaching information that assists the first user, or may include live coaching delivered from another user, wherein the coaching may be based on game plays of other users. The coaching may be generated in response to a request for assistance from the first user. Further, companion application generator 1940 includes a friend guiding module that is controlled by a friend of the first user. For instance, a directional object may indicate the proper direction for a character of the first user to take within a gaming world, wherein the directional object is controlled by the friend. For purposes of illustrating the guiding module 1920, the friend may be assisting the first user to navigate an area of the gaming world where the boss is located. Further, the companion application generator 1940 may include a friend object overlay module 1935 that is configured to overlay and/or insert a character of a friend of the first user into the rendered images associated with the game play of the first user. In that manner, the first user and the friend may be participating in a multi-player gaming mode for the gaming application that possibly was originally designed to support only a single-player mode.

With the detailed description of the various modules of the game server 205, a method for gaming that includes the implementation of a companion application supporting the game play of a first user is now described in relation to flow diagram 2000, in accordance with one embodiment of the present disclosure. In particular, flow diagram 2000 illustrates steps in a method that provide relevant information related to game plays of one or more users, such as the first user and friends of the first user, and wherein the game plays are occurring simultaneously in association with a particular gaming application. In general, the information assists the first user in understanding the gaming application, such as areas, points of interest, information useful in completing a goal or task, all within the gaming world of the gaming application. Other information may assist the first user in locating characters in the game play of friends, so that the first user is participating in an interactive gaming session (e.g., coaching, communication, character overlay, etc.) with other users via the companion application.

Operation 2010 in the method includes establishing a first communication channel with a first computing device associated with a first user configured for implementing a first instance of a gaming application in association with a first game play of the first user. The communication channel is implemented for example through a network, such as the internet, and is configured to deliver rendered images for display at a client device of the first user as generated by the instance of the gaming application as executed at a game server of a game cloud system. The communication channel is also configured for delivering input commands from the client device back to the game server for directing the execution of the instance of the gaming application. In that manner, game play of the first user in association with the gaming application is enabled.

Operation 2020 in the method includes establishing a second channel with a second computing device associated with the first user. The second channel may be configured within the same network used to establish the first channel (e.g., internet), or may be configured within a different network (e.g., mobile phone network). For instance, the second channel may provide communication support with a tablet computer with video and audio capabilities. Because the game server is configured to control execution of the instance of the gaming application associated with the first user as well as the information and/or data distributed through the second channel, the game play of the first user may be augmented through features implemented via the second channel. For example, communication session manager 1925 of FIG. 19 may be configured to establish and maintain the second channel.

Operation 2030 in the method includes generating an interface including information related to the first game play of the first user and second game play of a second user, both simultaneously playing the gaming application. In other embodiment, the information is related to game plays of multiple users other than the first user. The interface provides current information that is relevant to the current game play of the first user. In that manner, the interface is able to connect the information based on the game plays of other multiple users with the game play of the first user.

At operation 2040, the method includes delivering the interface and the information over the second channel to the second computing device for display. More particularly, the interface is delivered concurrent with the first game play of the first user, such that the information provided through the interface supports the first game play. For example, the information may include helpful information (e.g., in the form if visual cues, textual instructions, navigational cues, etc.) that help the first user progress through the gaming application.

The game plays of the multiple users provide crowdsourced content from which information can be determined and/or observed, wherein the information provides assistance to advance the game plays of users and/or provides an enhanced user experience. In one use-case, the information is based off game plays of multiple related users that are simultaneously playing the gaming application, such as multiple friends simultaneously playing the gaming application, and interacting with each other through respective companion interfaces. That is, the companion interfaces provide real-time interaction between the users. In another use-case, the information is based off current and/or past game plays of multiple users, wherein the users may or may not be related to the first user receiving information through a corresponding companion interface. For example, the first user may be playing the gaming application in isolation or is playing alone. In the solo case, the information (e.g., help, coaching, etc.) could be delivered in the form of recorded video, image, and/or text content. This information may not be generated in real-time, and may be generated by someone associated with the game developer (e.g., employed by the game publisher, console maker, etc.) whose role is to generate information for the benefit of users as conveyed through respective companion interfaces. In addition, third parties (profit based, non-profit based, etc.) may take it upon themselves to generate the information for the benefit of the gaming public. Further, the information may be generated by friends of the first user for the benefit solely for that player or for friends in a group. Also, the information may be generated by other related and/or unrelated users playing the gaming application (e.g., crowdsourced).

As previously described, the user-generated content (e.g., information presented in the companion interface) is generated by friends of the first user, or by anyone else in the gaming community. The crowdsourced content could be surfaced to the first user through the companion interface through any number of ways. For example, the information displayed may be determined through a popularity factor, such that the most popular (e.g., based on the number of views) information is surfaced on the companion interface. In another embodiment, the information displayed may be determined through voting (e.g., users may be able to provide feedback on the information, such as through a thumbs up/down message). In one embodiment, the information displayed may be determined through a review score (i.e., star rating provided by viewers of the information). In still other embodiments, the information displayed may be filtered based on the experience of those providing the information provided in the companion interface (e.g., the number of hours the user generating the content has played the gaming application). In other embodiments, the information displayed may be filtered by a defined group (e.g., friend relationship with the first user). As such, the information provided in the companion interface can be filtered from the vast realm of crowdsourced content generated by the community of users playing the gaming application. In that manner, the information displayed has more worth and is more beneficial to the user.

In one embodiment, the crowdsourced content available for display in a companion interface is filtered by the corresponding user (e.g., first user). For example, a slidable bar may be presented to the user (e.g., in the corresponding companion interface) that allows a user to select what type of information is displayed in the companion interface. In one embodiment, the slidable bar is used to define a user persona, wherein information is displayed in a corresponding companion interface depending on the persona. For illustration, a user who is an expert gamer would probably use an extreme filter on the information displayed in a corresponding companion interface, such that little or no information is displayed. On the other hand, a user who is relatively inexperienced in gaming, plays gaming applications poorly, and/or has limited time to play (e.g., desires to quickly finish the gaming application or is extremely busy) would probably use a light filter to display as much relevant information as possible in the corresponding companion interface.

Various exemplary personas that illustrate how a user may be defined for purposes of filtering crowdsourced content include but is not limited to the following: Purist, Hardcore Gamer, Completionist, Social One, Casual One, and Earnest Terribad. The Purist may disfavor walkthroughs/guides, is sensitive to any change to the original game/story, and usually only plays games from a particular publisher/franchise/genre. The Purist wants/needs bonus materials that can only be unlocked through playing the gaming application, but may not have any bearing on the outcome/plot of the game (e.g., easter eggs provided by the gaming publisher/developer). The Hardcore Gamer plays all games on all platforms, may not be totally against using guides/walkthroughs (contrary to the Purist), plays to the end for credibility without completing everything in the gaming application (e.g., just wants to finish), and seeks information that optimizes how quickly the gaming application can be finished. The Hardcore Gamer desires video walkthroughs, and/or pro-tips or chats that reveal shortcuts enabling skipping of sections or hints on how to quickly reach the end of a section. The Completionist may be further defined by type, including but not limited to: item type needs to get every item or the best item in the gaming application; the quest type needs to finish every quest/storyline possible (e.g., lore-ist); the exploration type needs to know and search for all easter eggs, the class type will replay the game with a different build/class (e.g., easy level, hard level, etc.). The Completionist desires an achievement system possibly defined by the developer (e.g., developer/publisher provide application specific achievements). The Social One plays or tries a gaming application because their friends are playing the game, is more interested in the social interactions of friends playing the gaming application (e.g., chat), is interested in guilds/clans, and is usually active on forums. The Social One desires a single-player game that may be enhanced with a multi-player experience with one or more friends (e.g., collaborative multi-player experience facilitated through companion interfaces), prefers messaging capabilities (e.g., message platforms), utilizes friends list, and implements in-game chats. The Casual One enjoys playing gaming applications and just wants to get through most of the content (e.g., does not care whether they finish the gaming application), and plays to have fun (e.g., will quit the gaming application if not fun). The Casual One would most likely use a walkthrough/guide to get through the gaming application quickly, and would not mind spoilers as they desire as much information as possible. The Earnest Terribad is really terrible at playing gaming applications in general but truly enjoys playing them, often enjoys watching someone else play through a gaming application, tends to need a lot of assistance/help/tips on what to do next in a gaming application, and welcomes help from friends (e.g., providing instruction) instructing the Earnest Terribad the various builds/techniques (e.g., how to play) required to play the gaming application.

In one embodiment, after viewing a particular piece of information in a companion interface, a user may be provided with an interface allowing the user to provide feedback on that information. For example, the interface may implement a rating system, such as a number rating (e.g., 4 out of 5), star rating (3 stars out of 5), or binary rating system (e.g., thumbs up/down). This rating information may be used for filtering the crowdsourced content that is presented to other users, as previously described.

In one embodiment, the other users include friends of the first user. For example, the method may include accessing a first user profile of the first user. The first user profile includes information related to the first user, and may include the gaming application the first user is currently playing, friends of the first user, whether the companion application is enabled, how a companion application interface is displayed to a corresponding user, etc. The first user profile may be accessed to determine a plurality of friends of the first user that is also simultaneously playing the gaming application. Friends of the user may be determined in part by accessing and cross referencing profiles of users in one or more social networks (e.g., social media providers 240) to augment the user profiles (e.g., with friend associations) of the network of users of the game cloud system GCS 1800 of FIG. 18. Further, because GCS 1800 supports the instantiation and execution of multiple instances of the gaming application, the corresponding users are known and are included within the user profiles stored in database 1850. In that manner, the friends of the first user that are also currently playing the gaming application can be determined. For example, the user profile of user 2 (friend of the first user) may be accessed to determine if user 2 is also currently playing the gaming application.

Figure 21A:
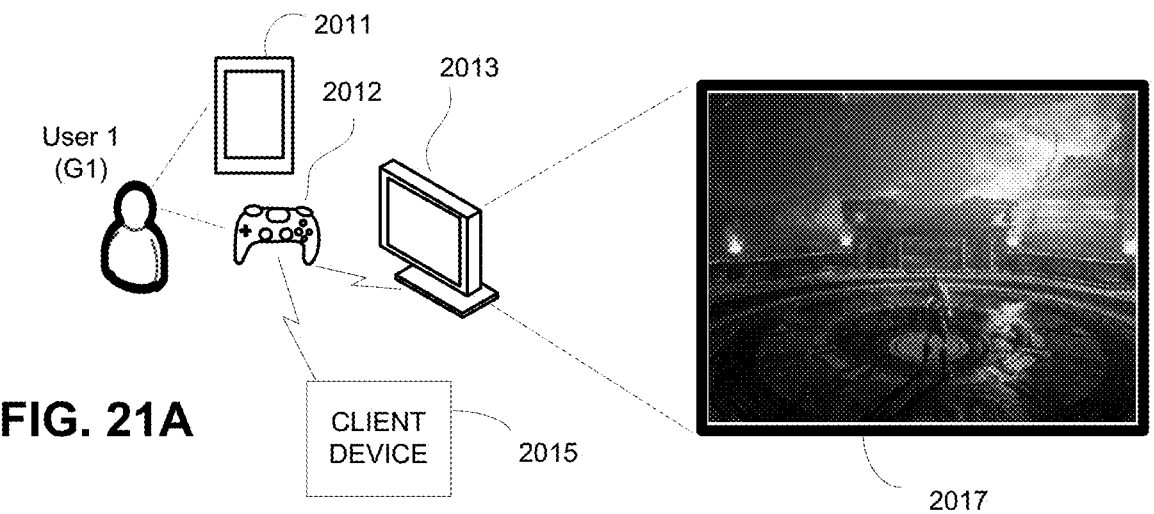
FIGS. 21A-21C illustrate current scenes of game plays of three users simultaneously playing a gaming application, in accordance with one embodiment of the present disclosure.
Figure 21B:
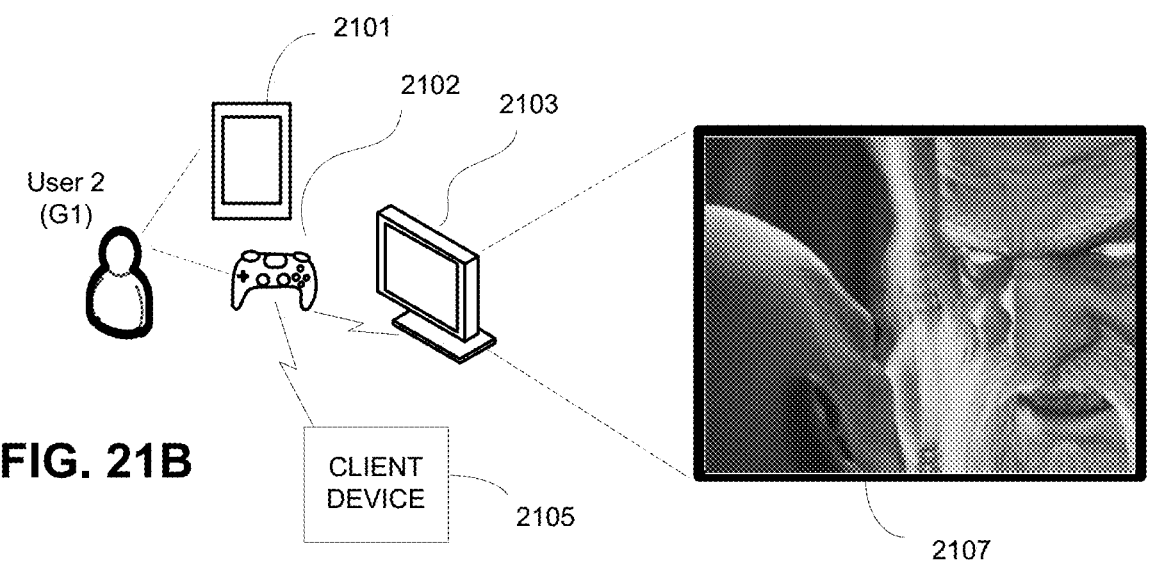
Figure 21C:
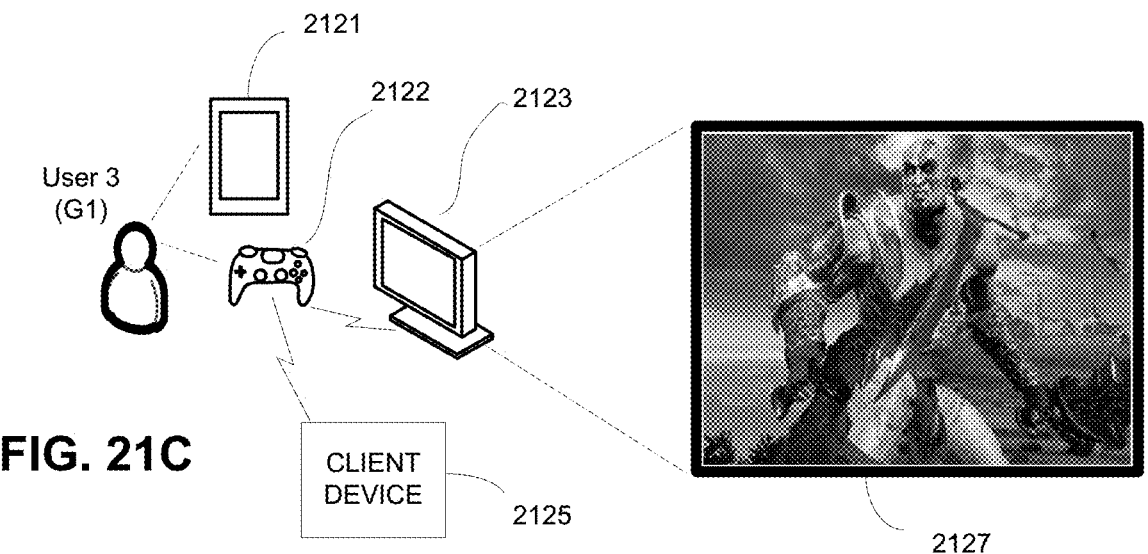

For example, FIGS. 21A-21C illustrate the game plays of the first user (e.g., user 1) and two friends (e.g., user 2 and user 3) of the first user, in accordance with embodiments of the present disclosure. As shown, the local gaming system associated with user 1 includes client device 2015, display 2013, and controller 2012 supporting the game play of user 1 as executed as an instance of a gaming application at a game cloud system (GCS) over a corresponding first communication channel, as previously described in relation to at least FIG. 18. A second device (e.g., tablet) 2011 provides a companion interface over a corresponding second communication channel and is supported by the GCS. Also, for user 2, the local gaming system includes client device 2105, display 2103, and controller 2102 supporting the game play of user 2 as executed as an instance of a gaming application at GCS over a corresponding first communication channel, as previously described in relation to at least FIG. 18. A second device (e.g., tablet) 2101 provides a companion interface over a corresponding second communication channel and is supported by the GCS. Also, for user 3, the local gaming system includes client device 2125, display 2123, and controller 2122 supporting the game play of user 3 as executed as an instance of a gaming application at GCS over a corresponding first communication channel, as previously described in relation to at least FIG. 18. A second device (e.g., tablet) 2121 provides a companion interface over a corresponding second communication channel and is supported by the GCS.

All three users 1-3 are simultaneously playing the same gaming application G1, such as one of the game editions of the "God of War" series published by SONY Computer Entertainment (SCE) (storyline revolves around the warrior Kratos as he becomes enmeshed in the world of mythical gods and seeks revenge against that world, wherein Kratos is initially manipulated into killing his wife and daughter by the God of War—Ares). For example, FIGS. 21A-21C show the current scenes of game plays of users 1-3 as shown in corresponding displays, and wherein the game plays show different levels of progression through the gaming application in accordance with one embodiment of the disclosure. In particular, FIG. 21A shows the game play of the user 1 (e.g., the first user) in window 2017 of display 2013, where Kratos is seen in a staging area or platform. FIG. 21B shows the game play of user 2 (e.g., the second user, also referred to as the first friend of the first user) in window 2107 of display 2103, where Kratos is seen face-to-face with the god Zeus, who is plotting the death of Kratos, the new God of War, after the death of Ares at the hands of Kratos. FIG. 21C shows the game play of user 3 in window 2127 of display 2123, where Kratos is seen engaged in battle.

The users 1-3 may be playing in single-player mode or in multi-player mode. Further, the first user (e.g., user 1) has enabled the companion application that enables the collection and distribution of information from game plays of all of users 1-3 for the benefit of the game play of the first user. Also, the companion application may include communication between the first user and one or more other users for the distribution of information for the benefit of game play of the first user, thereby enabling some form of multi-player participation that is centered on the game play of the first user (e.g., provide assistance related to the game play of the first user).

In addition, the companion interface may be used by the first user to share content with one or more friends. Since friends of the first user that are playing the gaming application are discoverable and known, and the locations of the friends are known within a gaming environment, the companion interface could be configured to suggest to the user and/or enable the user to share information with one or more friends. For example, a message may be presented to the first user, such as "Your friend Gary is playing the same level of 'God of War right now. Would you like to help him by sharing this video (e.g., a tutorial, game play of the first user, etc.) with him?"

Figure 22A:
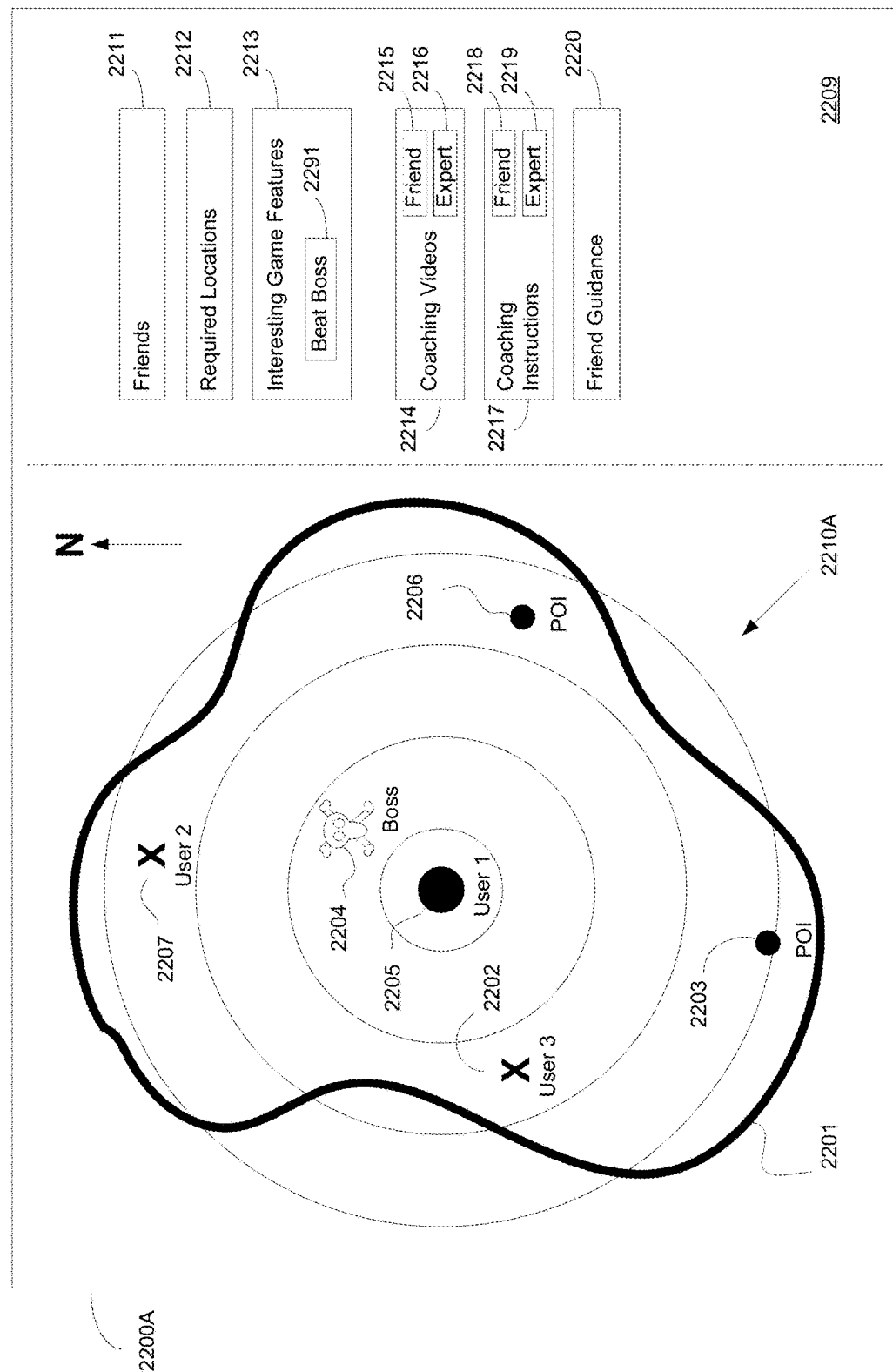
FIG. 22A illustrates a companion application interface supporting the game play of a first user playing a gaming application, wherein the interface includes a radar mapping showing the location of the first user relative to locations of other objects in a gaming world of the gaming application, wherein the objects are generated in the game plays of the first user and a second user, in accordance with one embodiment of the present disclosure.
Figure 22B:
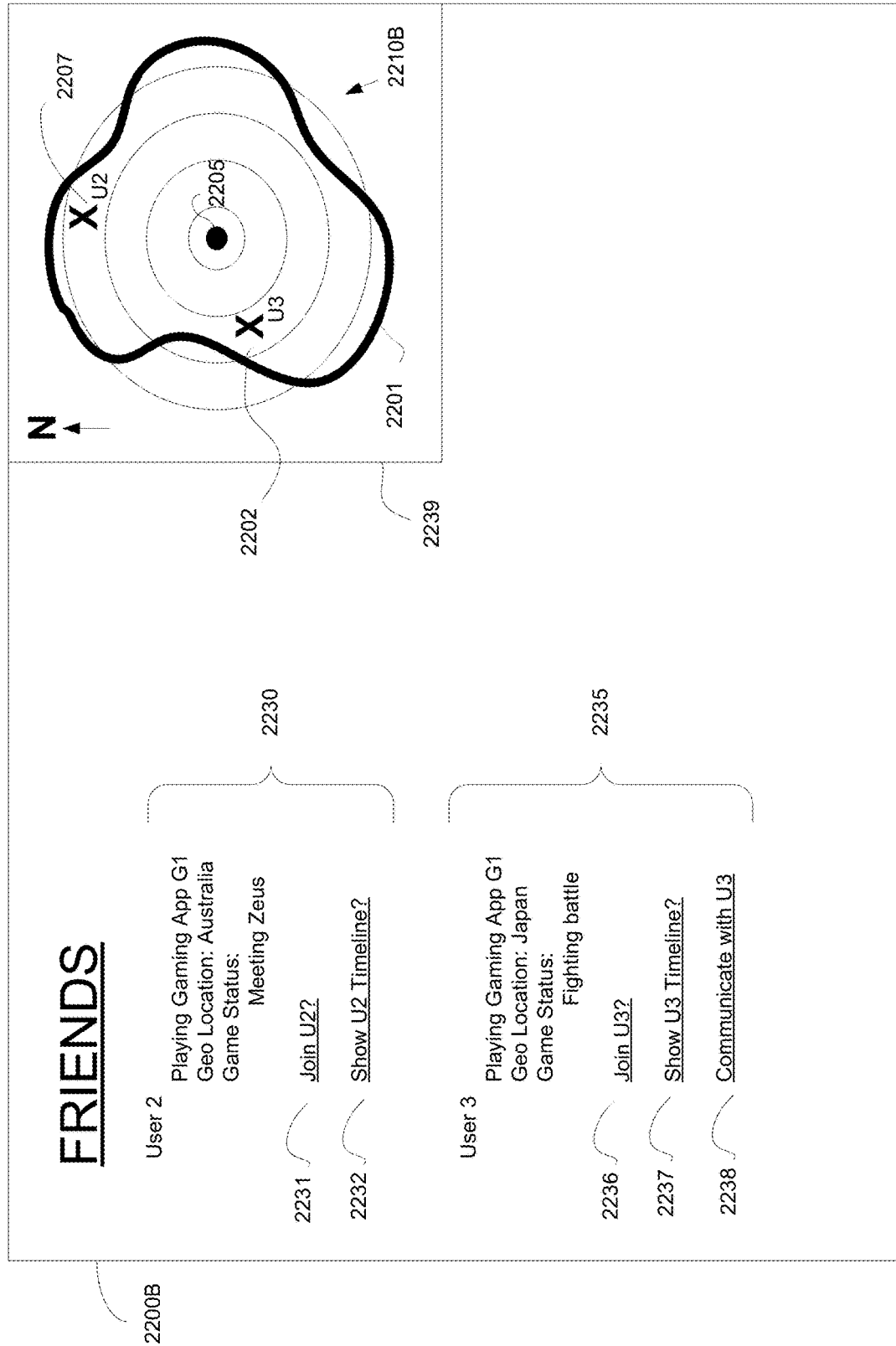
FIG. 22B illustrates a companion application interface supporting the game play of a first user in association with a gaming application, wherein the interface includes a list of friends currently playing the gaming application and a radar mapping showing the location of the first user relative to locations of the discovered friends in a gaming world of the gaming application in association with respective game plays of the friends, in accordance with one embodiment of the present disclosure.
Figure 22C:
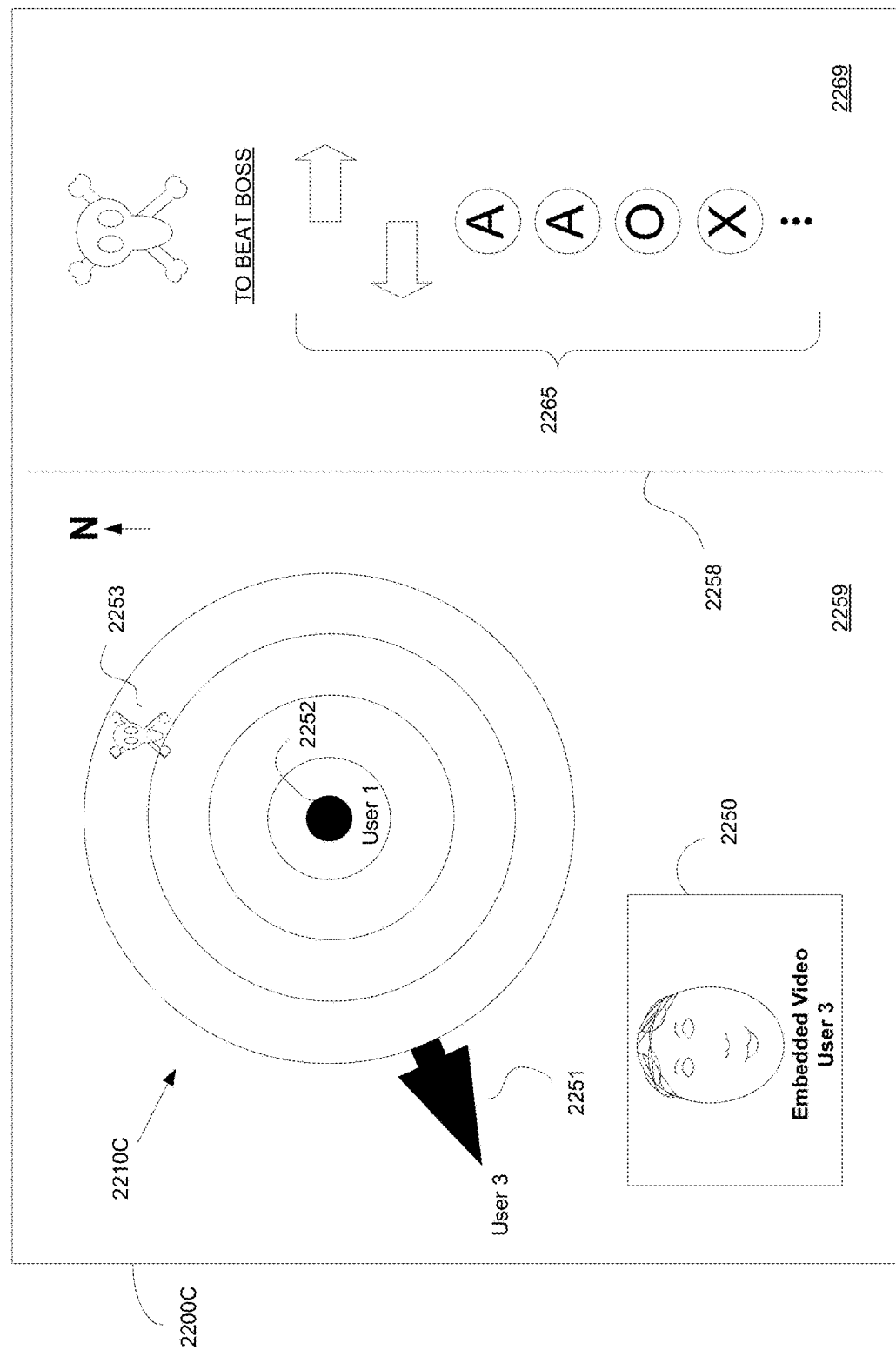
FIG. 22C illustrates a companion application interface supporting the game play of a first user in association with a gaming application, wherein the interface includes radar mapping showing the location of the first user within a gaming world of the gaming application and a directional pointer to the location of a second user within the gaming world, in accordance with one embodiment of the disclosure.
Figure 22D:
FIG. 22D illustrates a current scene of a game play of a first user in association with the execution of a first instance of a gaming application, wherein the current scene includes a directional pointer providing guidance within a gaming world of the gaming application to an object, wherein the directional pointer is based on game play of a second user simultaneously playing the gaming application and/or controllable by a second user simultaneously playing the gaming application, wherein the directional pointer is generated through a companion application interface in support of the game play of the first user.

FIGS. 22A-22D illustrate various embodiments of the companion application interface. For example, FIG. 22A illustrates radar mapping, FIG. 22B illustrates friends of the first user (e.g., user 1) in their game plays, FIG. 22C illustrates instructions provided to assist in beating a boss, and FIG. 22D illustrates a guiding feature that provides navigational assistance to the first user.

More particularly, FIG. 22A illustrates a companion application interface 2200A supporting the game play of a first user playing a gaming application, such as the first user introduced in FIGS. 18 and 21A-C. Interface 2200A includes a radar mapping 2210A showing the location of a first character associated with the game play of the first user (e.g., user 1) relative to locations of other objects in a gaming world of the gaming application, wherein the objects are generated in the game plays of the first user (e.g., user 1) and a second user (e.g., friend of user 1), in accordance with one embodiment of the present disclosure. As shown, the first character of user 1 is located at the center 2205 of the radar mapping 2210A represented by concentric circles. Center 2205 may be enlarged and darkened to represent the location of the first character. In addition, a plurality of objects of interest is shown at a plurality of locations on the radar mapping 2210A. For example, the location 2207 of a character object of user 2 is north of center 2205; the location 2204 of a boss character is north of center 2205, but closer than the character object of user 2; the location 2206 of a point of interest (POI) is approximately to the east of center 2205; location 2203 of another POI is approximately south of center 2205, and location 2202 of a character object of user 3 is approximately south west of center 2205. The objects shown in FIG. 22A are provided for illustration only, and other objects (location of a task to accomplish) can be provided in the interface 2200A in embodiments.

In one embodiment, the radar mapping 2210A is generic and provides a quick reference of where the first character associated with user 1 is in relation to other objects in the gaming world as provided through radar mapping, but need not have any direct reference to the gaming world (e.g., features or landmarks of the gaming world). That is, the radar mapping 2210A provides a plurality of directional relationships between the locations of the first character of the first user at center 2205 and the plurality of objects shown in FIG. 22A. The radar mapping can be scaled to any range (e.g., to include a small portion or a larger portion of the gaming world).

In another embodiment, the radar mapping 2210A is provided with reference to the gaming world, as represented by world outline 2201 that may be overlaid or superimposed over the radar mapping 2210A. In that manner, the first user is able to locate his or her character and other related objects in the gaming world through the use of the radar mapping 2210A in combination with the world outline 2201.

In one embodiment, the object representing the first character associated with the game play of user 1 is a directional object. That is, the directional object shows a general orientation of the point of view of the first character within the gaming world. For example, the enlarged circle at center 2205 may be enhanced to show the direction of the point of view, such as with an arrow extending off the enlarged circle in that direction. In another embodiment, the radar mapping 2210A may be rotated with the point of view of the first character.

As shown in FIG. 22A, a side bar 2209 provides navigation or access to additional features or information about those features as provided by the companion application. Side bar 2209 includes interactive blocks, which when selected (e.g., via clicking) provide access to those features by user 1. Interactive blocks may be enabled by implementing any form of selectable icons or means, in embodiments. For example, block 221 provides access to user 1 to a list of friends that are currently playing the gaming application via a "FRIENDS" feature; block 2212 provides access to user 1 to information relating to required locations within the gaming world that the first user must visit; block 2213 provides access to information relating to interesting game features within the gaming world, such as information related to a boss as provided by block 2291; block 2214 provides access to information relating to coaching videos by friends or experts including portions of stored game plays of friends or experts or video recordings providing instructional guidance of friends or experts, wherein block 2215 provides access to coaching videos of friends and block 2216 provides access to coaching videos of experts; block 2217 provides access to information related to coaching instructions (e.g., direct communication of instructions or instructions based on previously recorded game plays) by friends or experts, wherein block 2218 provides access to coaching instructions from friends and block 2219 provides access to coaching instructions from experts; and block 2220 provides access to information relating to guidance that is controlled by a friend. Additional details of these features are provided below in relation to FIGS. 22B, 22C, and 22D.

FIG. 22B illustrates a companion application interface 2200B supporting the game play of a first user in association with a gaming application, in accordance with one embodiment of the present disclosure. For example, after the "FRIENDS" feature of block 2211 of FIG. 22A is selected, interface 2200B is presented to the user over the second communication channel, and includes a list of friends of user 1 (e.g., the first user) as well as information about each of those users.

For example, user 2 is a friend, wherein related information 2230 of user 2 includes the following: an indication that user 2 is currently playing gaming application G1, user 2 is geographically located in Australia, and the game play of user 2 indicates that the corresponding character is meeting Zeus, as shown in window 2107 of FIG. 21B. Access to additional features may also be provided in the interface 2200B. For example, interactive icon 2231 allows the character of user 1 to join the game play of user 2, in one embodiment. In another embodiment, by selecting icon 2231, user 1 is inviting user 2 to join in the game play of user 1. In addition, interactive icon 2232 enables a timeline of the game play of user 2 to be shown within the interface 2200B, for instance. In that manner, user 1 is able to select a particular snapshot image in the timeline to initiate a jump game play based on the corresponding snapshot captured during the game play of user 2, as previously described.

Also, user 3 is a friend (also referred to as the first friend of user 1), wherein related information 2235 of user 3 includes the following: an indication that user 3 is currently playing gaming application G1, user 3 is geographically located in Japan, and the game play of user 3 indicates that the corresponding character is currently engaged in battle, as shown in window 2127 of FIG. 21C. Access to additional features may also be provided in the interface 2200B. For example, interactive icon 2236 allows the character of user 1 to join the game play of user 3, in one embodiment. In another embodiment, by selecting icon 2236, user 1 is inviting user 3 to join in the game play of user 1. Also, by selecting icon 2238, user 1 is establishing a communication session with user 3.

In addition, interactive icon 2237 enables a timeline of the game play of user 3 to be shown within the interface 2200B, for instance. In that manner, user 1 is able to select a particular snapshot image in the timeline to initiate a jump game play based on the corresponding snapshot captured during the game play of user 3, as previously described. For example, the timeline includes a plurality of thumbnails including a plurality of snapshot images associated with the game play of the user 3, wherein the plurality of snapshot images corresponds to a plurality of snapshots, wherein a first snapshot enables execution of an instance of the gaming application (e.g., a jump game play) beginning from a point in the gaming application where the first snapshot was captured. In particular, the jump game play may be instantiated in response to receiving selection of a first snapshot image by user 1 in the timeline, and initiating another instance of the gaming application based on the first snapshot for user 1. The jump game play may be implemented over the first communication channel or second communication channel (e.g., through the companion interface).

Further, a radar mapping 2210B in window 2239 is shown in interface 2200B (e.g., located in upper right hand corner). Radar mapping 2210B is a filtered version of the radar mapping 2210A of FIG. 22A that shows information related to friends, such as user 2 and user 3. For example, radar mapping 2210B shows the location of the user 1 relative to locations of the discovered friends in a gaming world of the gaming application in association with respective game plays of the friends. That is, the location of the character associated with the game play of user 1 (e.g., center 2205) is shown in relation to objects representing characters of other users. For example, location 2207 of a character object of user 2 that is north of center 2205, location 2202 of a character object of user 3 is south west of center 2205. Further, the locations of the characters associated with the various users may be further referenced with the gaming world outline 2201, as previously described.

FIG. 22C illustrates a companion application interface 2200C supporting the game play of a first user in association with a gaming application, in accordance with one embodiment of the present disclosure. In particular, portion 2259 to the left of line 2258 of interface 2200C includes a radar mapping 2210C showing the location of user 1 (e.g., the first user) within a gaming world of the gaming application, and a directional pointer 2251 that points to the location of a second user (e.g., user 3) within the gaming world. For example, interface 2200C may be generated in response to selection of one or more interactive blocks of FIG. 22A, such as block 2213 providing access to interesting game features. As shown, user 1 is located at center 2252 of radar mapping 2210C. Radar mapping 2210C may be a version of radar mapping 2210A of FIG. 22A that includes only information related to interesting features, such as location 2253 of the boss, and a directional pointer 2251 pointing to the character associated with the game play of user 3.

In addition, companion application interface 2200C provides assistance in how to complete a task, such as beating a boss (e.g., boss 2204 of FIG. 22A). The assistance may be enabled through selection of block 2218 requesting coaching instructions from a friend (e.g., user 3), or through selection of block 2291, as previously described. In response, an instruction feature for the information is generated, wherein the instruction feature includes a list of commands implementable by user 1 to accomplish the objective. The instruction feature may be further based on the game play of user 3, without necessarily any direct input from user 3. In particular, a sequence of instructions 2265 (e.g., right button, left button, A button, etc.) is provided in section 2269 to the right of line 2258 of interface 2200C. The sequence of instructions 2265 may be generated in response to receiving a request from a first computing device of user 1 for help in accomplishing an objective (e.g., beating boss).

Further, the assistance may be provided in the form of a video recording of a previously stored game play. For example, the assistance may be enabled through selection of block 2215 requesting a coaching video of a friend (e.g., user 3), or through selection of block 2291, as previously described. In response, a coaching feature for the information is generated, wherein the coaching feature includes a video recording or video clip showing a previous accomplishment of the objective based on the game play of user 3. In another embodiment, the coaching video may be an instructional video prepared by a friend or expert on how to approach a certain part of the gaming application.

Further, the video recording may be configured to enable initiation of a jump game or jump game play, as previously described. For example, the jump game may be instantiated in response to receiving from a first computing device of user 1 selection of a jump point in the game play of user 3 based on the video recording. Another instance of the gaming application is initiated based on a snapshot referenced in the video recording, wherein the snapshot is captured during the game play of user 3.

In addition, companion interface 2200C may provide assistance in the form of a communication session with another user, such as user 3. For example, the communication session may be enabled and/or established through selection of interactive icon 2238 of FIG. 22B. Specifically, window 2250 may display a live media stream of user 3 over a communication channel. For example, window 2250 may be embedded within the interface 2200C. The live media stream may include streaming video of user 3, and/or streaming audio of user 3. Further, directional pointer 2251 may be generated in response to establishing the communication session between user 1 and user 3. In that manner, user 1 may quickly navigate to a location of the gaming world that user 3 is experiencing. For instance, user 3 may be in an exciting part of the gaming application and user 1 would like to have the same experience in his or her own game play. As user 1 travels to that location, communication between user 1 and use 3 may augment the travel experience. For example, user 3 may be providing helpful hints on what user 1 should expect in the gaming application, or user 3 may be trash talking with user 1.

FIG. 22D illustrates a current scene 2270 of a game play of user 1 in association with the execution of a first instance of a gaming application, wherein the current scene 2270 includes a directional pointer 2275 providing guidance within a gaming world of the gaming application to an object, in accordance with one embodiment of the present disclosure. The directional pointer may be generated in response to selection of block 2220 of FIG. 22A in interface 2200A, wherein user 1 is seeking guidance from a friend (e.g., user 3). For instance, user 1 would like to know which direction to proceed from the staging area or platform shown in a current scene 2270, previously introduced in relation to FIG. 21A. As such, a controllable guidance icon (e.g., directional arrow) may be inserted or overlaid into a current scene 2270 generated for the first game play for display in window 2290 at a display 2013 of user 1. For example, the directional pointer points in a direction of a first object (e.g., location of a character associated with game play of a second user) or representational object (e.g., location of task performance) that is selectable via the companion application interface. Further, the directional pointer is based on game play of user 3, wherein the object is known to exist at a particular location through that game play, in one embodiment. In another embodiment, the directional pointer 2275 is controllable by user 3. Specifically, a command instruction is received from a computing device (e.g., client device 2125) of user 3 (also referred to as the second user) over the first communication channel, wherein the command instruction orients the directional pointer 2275 within the current scene 2270. The directional pointer 2275 may be generated as an overlay into the gaming application by the back end game cloud system executing the instance of the gaming application for the game play of user 1.

Figure 23:
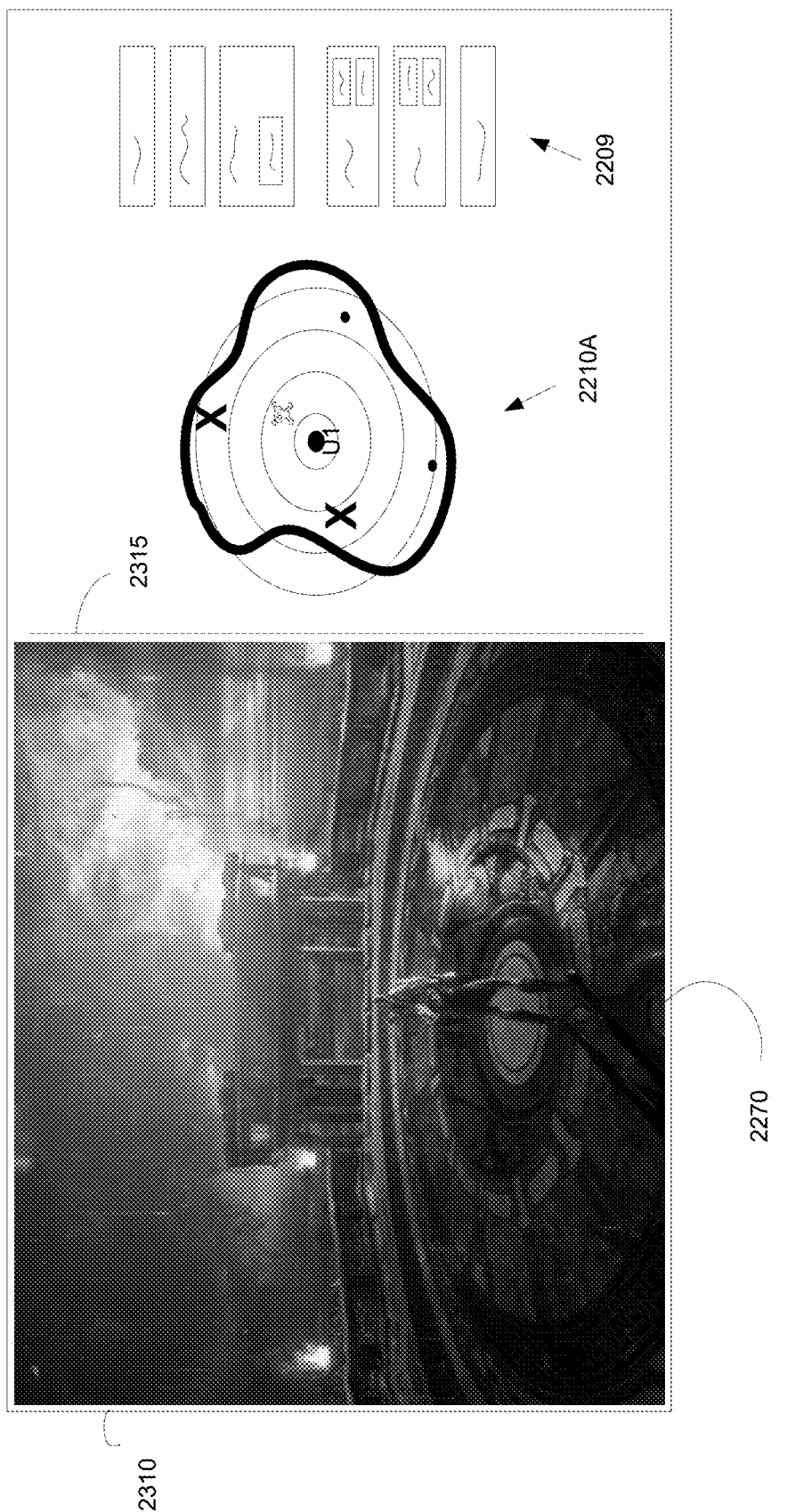
FIG. 23 illustrates a split screen as displayed showing current game play of a first user playing a gaming application, and a sidebar including a companion application interface supporting the game play of the first user, wherein the interface includes a radar mapping showing the location of the first user within a gaming world of the gaming application relative to locations of other objects in the gaming world that are generated in the game plays of the gaming application of the first user and a second user, in accordance with one embodiment of the present disclosure.

FIG. 23 illustrates a split screen 2300 as displayed showing current game play of user 1 (also referred to as the first user) playing a gaming application in a first screen 2320, and a sidebar or second screen 2325 including a companion application interface supporting the game play of user 1. That is, rather than providing the companion application interface through a second communication channel for display on a second computing device accessible by user 1, the interface is provided in conjunction with the display of the game play of user 1. That is, the companion application interface is delivered over the first communication channel to the computing device of user 1, for display in a side panel of a split screen 2300, for example. In particular, the first portion 2320 of split screen 2300 shows a current scene 2270 taken from the game play of the user 1 (e.g., the first user), where Kratos is seen in a staging platform or area, wherein the current scene 22270 is consistent with the scene introduced in FIG. 21A in association with user 1. The first portion 2320 of split screen 2300 is shown located to the left of line 2315.

A companion application interface first introduced in FIG. 22A is provided in a second portion 2325 of split screen 2300, wherein the second portion 2325 is located to the right of line 2315. The companion application includes radar mapping 2210A shows the location of user 1 within a gaming world of the gaming application relative to locations of other objects in the gaming world that are generated in the game plays of the gaming application of user 1 and at least one friend of user 1 (e.g., user 3, also referred to as the second user). Further, companion application interface shown in the second portion 2325 includes a side bar 2209 that provides navigation to additional features or information about those features as provided by the companion application, as previously described in relation to FIG. 22A.

Figure 24:
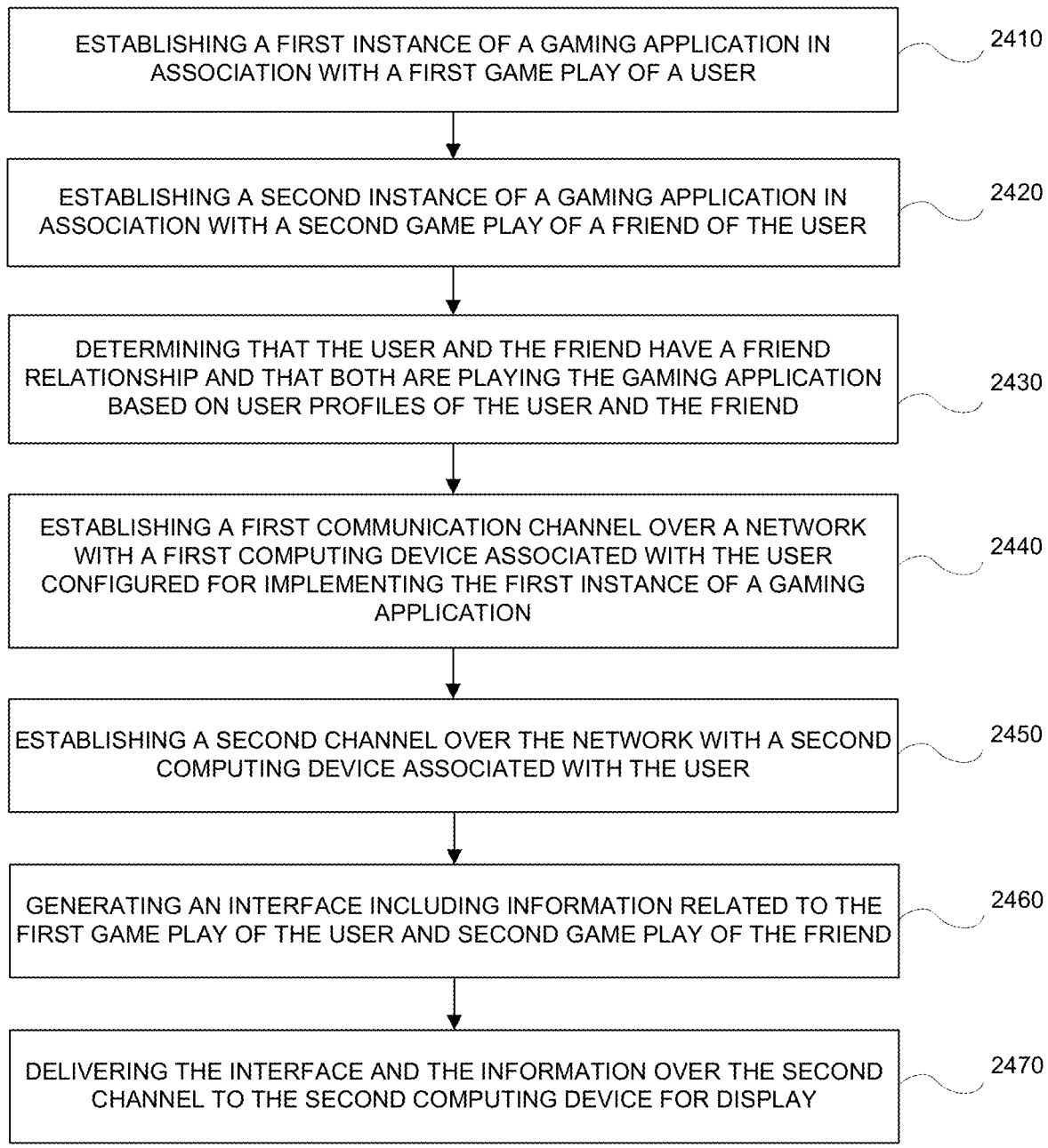
FIG. 24 is a flow diagram illustrating steps in a method for gaming that includes the implementation of a companion application supporting the game play of a first user, wherein the companion application provides information relating to the game plays of a plurality of users, all simultaneously playing the same gaming application as executed within a cloud-based gaming system by a plurality of instances of the gaming application, in accordance with one embodiment of the present disclosure.

With the detailed description of the various modules of the game server and client device of a user communicating over a network, a method for gaming that includes the implementation of a companion application supporting the game play of a first user is now described in relation to flow diagram 2400 of FIG. 24, wherein the companion application provides information relating to the game plays of a plurality of users, all simultaneously playing the same gaming application as executed within a cloud-based gaming system by a plurality of instances of the gaming application, in accordance with one embodiment of the present disclosure. Flow diagram 2400 illustrates the processes and data flow of operations involved at the game server side for purposes of generating information that is displayed over the network at the client device of the user.

At operation 2410, the method includes establishing a first instance of a gaming application in association with a first game play of a first user. For example, a game server operating within a game cloud system (GCS) previously described is configured for instantiating and executing the first instance to generate rendered images for display at a client device of the first user in association with the first game play.

At operation 2420, the method includes establishing a second instance of the gaming application in association with a second game play of a second user, wherein the second user is a friend of the first user. For example, the same or another game server in the GCS is configured for instantiating and executing the second instance of the gaming application to generate rendered images for display at a cline device of the second user in association with the second game play.

As such, the GCS is able to implement and support both instances of the gaming application in association with game plays of the first user and the second user. Because the game cloud system controls the execution of the first instance and the second instance of the gaming application, data and information generated within both game plays of the first user and second user may be communicated to the first user to assist in his or her game play. Additionally, the data and information generated within both game plays of the first user and second user may be integrated into the game play of the first user to provide for multi-player participation in the game play of the first user. Similarly, the data and information may be used to assist in the game play of the second user, and to provide for multi-player participation in the game play of the second user. As such, the data and information may be used to support the game play of either user, though for purposes of brevity and clarity the use and implementation of the data and information is described within the context of supporting the game play of the first user.

At operation 2430, the method includes determining that the first user and the second user have a friend relationship, and that both users are simultaneously playing the gaming application. In particular, because the game cloud system executes instances of the gaming application in association with the game plays of the first user and the second user, the user profiles within the game cloud system of the first user and the second user may provide the data necessary to determine friend relationships between users. For example, the user profiles include information related to the corresponding user, and may include what gaming application is currently being played, a list of friends, whether the companion application is enabled, etc. In particular, as the first and second instances of the gaming application are being instantiated, the user profiles for the first and second user are updated to indicate that the first and second users are currently playing the gaming application. In addition, the user profiles within the game cloud system may be augmented with information from profiles generated across other social networks, such as for populating the friend list for a particular user. In that manner, the friend list in the user profile of the game cloud system is continually updated. As such, by accessing both user profiles provides, cross referencing profiles in the game cloud system is possible to determine that the first and second user are friends and are playing the gaming application.

At operation 2440, the method includes establishing a first communication channel with a first computing device associated with the first user, wherein the first communication channel is configured for implementing the first instance of a gaming application. In particular, the communication channel is implemented through a network, such as the internet, and is configured for delivering the rendered images generated at the gaming server of the game cloud system to the client device of the first user for display. In addition, the communication channel is configured for delivering input commands from the client device back to the game server for directing the execution of the first instance of the gaming application to enable the game play of the first user.

At operation 2450, the method includes establishing a second channel with a second computing device associated with the first user. The same or different network may be configured for establishing the second channel. For instance, the second channel may be implemented over a mobile network, instead of the internet, to provide communication support to a table computer. For example, the communication session manager 1925 of FIG. 19 may be configured to establish and maintain the second channel. Information and/or data that are based on the game plays of the first and second user may be distributed through the second channel to augment the game play of the first user, as will be described below.

At operation 2460, the method includes generating an interface including information related to the first game play of the first user and second game play of a second user. The information may also be related to game plays of multiple users, such as one or more friends of the first user. In that manner, the interface is able to connect the information based on multiple game plays with the game play of the first user, such that the game plays of multiple users (e.g., friends) are linked with the game play of the first user. As previously described, the interface may include a radar mapping including the information that shows a first character associated with the game play of the first user and a plurality of objects of interest to the first user at a plurality of locations in the radar mapping. Moreover, the radar mapping provides a plurality of directional relationships between locations of the first character and the plurality of objects, wherein an object may include a character associated with the game play of the second user, a boss, a point of interest, etc. The interface may also include other information or features and/or access to the other information or features, such as those shown in FIG. 22A (e.g., friend, interesting locations, interesting game features, coaching videos, coaching instructions, friend guidance, etc.).

At operation 2470, the method includes delivering the interface and the information over the second channel to the second computing device for display concurrent with the game play of the first user. In that manner, the interface supports the game play of the first user. In particular, the information provides current information that is relevant to the game play of the first user. For purposes of illustration, the information and/or data assists the first user in understanding the gaming world of the gaming application. The information and/or data may provide for descriptions of areas in the gaming world, points of interest, etc. The information and/or data may assist the first user in accomplishing a task or goal, or to locate characters in the game plays of the second user and other friends of the first user. In that manner, the game plays of the first user and the friends of the first user may be linked. For example, the first user is able to participate in an interactive gaming session with the second user via a companion application delivered over the second channel to the second computing device. The interactive gaming session supporting the game play of the first user may include, but is not limited to coaching from the second user, communication with the second user, character (associated with the second user) overlay into the game play of the first user for character interaction within the game play of the first user, visual cues from the second user or based on the second game play, textual instructions from the second user or based on the second game play, navigational cues from the second user or based on the second game play, etc.

While specific embodiments have been provided to demonstrate the implementation of a companion application supporting the game play of a user including information relating to the game plays of multiple users, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD).

Figure 25:
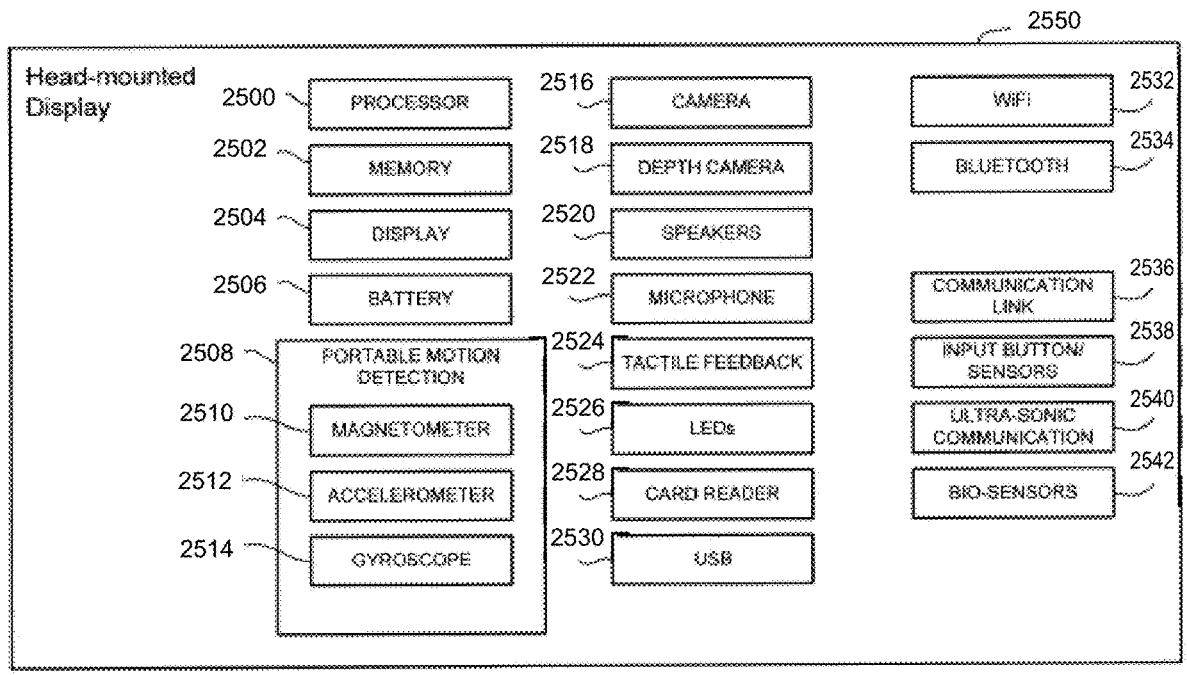
FIG. 25 is a diagram illustrating components of a head-mounted display is shown, in accordance with an embodiment of the disclosure.

FIG. 25, a diagram illustrating components of a head-mounted display 2550 is shown, in accordance with an embodiment of the disclosure. The head-mounted display 2550 includes a processor 2500 for executing program instructions. A memory 2502 is provided for storage purposes, and may include both volatile and non-volatile memory. A display 2504 is included which provides a visual interface that a user may view. A battery 2506 is provided as a power source for the head-mounted display 2550. A motion detection module 2508 may include any of various kinds of motion sensitive hardware, such as a magnetometer 2510, an accelerometer 2512, and a gyroscope 2514.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 2512 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 2510 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 2512 is used together with magnetometer 2510 to obtain the inclination and azimuth of the head-mounted display 2550.

A gyroscope is a device for measuring or maintaining orientation, based on the principles of angular momentum. In one embodiment, three gyroscopes 2514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 2516 is provided for capturing images and image streams of a real environment. More than one camera may be included in the head-mounted display 2550, including a camera that is rear-facing (directed away from a user when the user is viewing the display of the head-mounted display 2550), and a camera that is front-facing (directed towards the user when the user is viewing the display of the head-mounted display 2550). Additionally, a depth camera 2518 may be included in the head-mounted display 2550 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 2550 includes speakers 2520 for providing audio output. Also, a microphone 2522 may be included for capturing audio from the real environment, including sounds from the ambient environment, speech made by the user, etc. The head-mounted display 2550 includes tactile feedback module 2524 for providing tactile feedback to the user. In one embodiment, the tactile feedback module 2524 is capable of causing movement and/or vibration of the head-mounted display 2550 so as to provide tactile feedback to the user.

LEDs 2526 are provided as visual indicators of statuses of the head-mounted display 2550. For example, an LED may indicate battery level, power on, etc. A card reader 2528 is provided to enable the head-mounted display 2550 to read and write information to and from a memory card. A USB interface 2530 is included as one example of an interface for enabling connection of peripheral devices, or connection to other devices, such as other portable devices, computers, etc. In various embodiments of the head-mounted display 2550, any of various kinds of interfaces may be included to enable greater connectivity of the head-mounted display 2550.

A WiFi module 2532 is included for enabling connection to the Internet via wireless networking technologies. Also, the head-mounted display 2550 includes a Bluetooth module 2534 for enabling wireless connection to other devices. A communications link 2536 may also be included for connection to other devices. In one embodiment, the communications link 2536 utilizes infrared transmission for wireless communication. In other embodiments, the communications link 2536 may utilize any of various wireless or wired transmission protocols for communication with other devices.

Input buttons/sensors 2538 are included to provide an input interface for the user. Any of various kinds of input interfaces may be included, such as buttons, touchpad, joystick, trackball, etc. An ultra-sonic communication module 2540 may be included in head-mounted display 2550 for facilitating communication with other devices via ultra-sonic technologies.

Bio-sensors 2542 are included to enable detection of physiological data from a user. In one embodiment, the bio-sensors 2542 include one or more dry electrodes for detecting bio-electric signals of the user through the user's skin.

The foregoing components of head-mounted display 2550 have been described as merely exemplary components that may be included in head-mounted display 2550. In various embodiments of the disclosure, the head-mounted display 2550 may or may not include some of the various aforementioned components. Embodiments of the head-mounted display 2550 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 26:
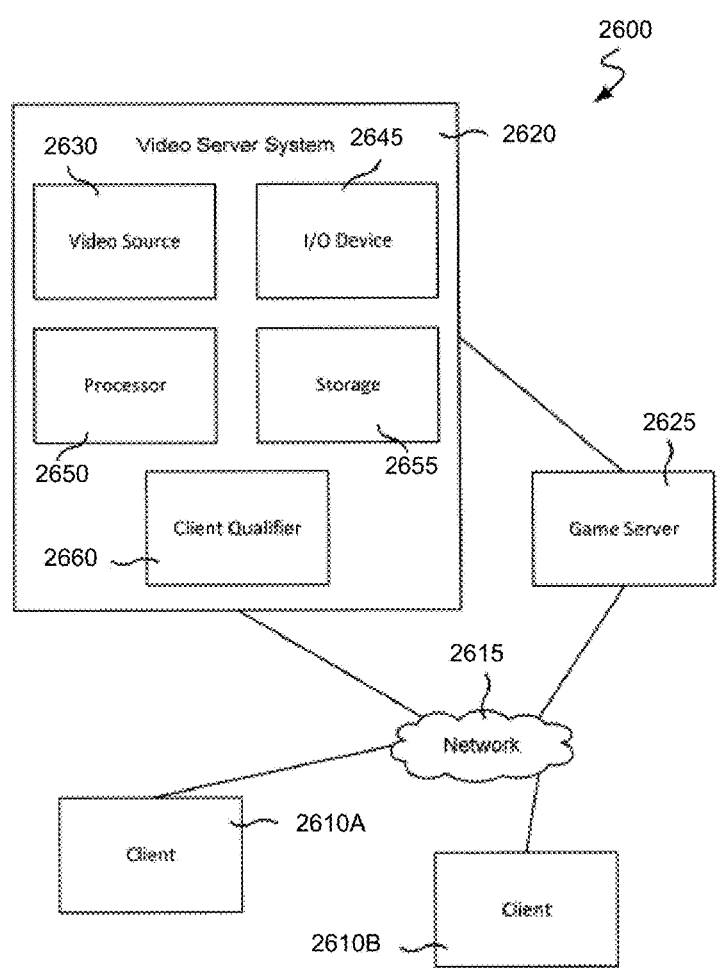
FIG. 26 is a block diagram of a Game System, according to various embodiments of the disclosure. Game System is configured to provide a video stream to one or more Clients via a Network.

FIG. 26 is a block diagram of a Game System 2600, according to various embodiments of the disclosure. Game System 2600 is configured to provide a video stream to one or more Clients 2610 via a Network 2615. Game System 2600 typically includes a Video Server System 2620 and an optional game server 2625. Video Server System 2620 is configured to provide the video stream to the one or more Clients 2610 with a minimal quality of service. For example, Video Server System 2620 may receive a game command that changes the state of or a point of view within a video game, and provide Clients 2610 with an updated video stream reflecting this change in state with minimal lag time. The Video Server System 2620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 2620 frames per second. Although higher or lower frame rates are included in alternative embodiments of the disclosure.

Clients 2610, referred to herein individually as 2610A, 2610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 2610 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 2610 or on a separate device such as a monitor or television. Clients 2610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 2610 are optionally geographically dispersed. The number of clients included in Game System 2600 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 2620 to deliver a game viewed through the HMD. In one embodiment, the game console receives the video stream from the video server system 2620, and the game console forwards the video stream, or updates to the video stream, to the HMD for rendering.

Clients 2610 are configured to receive video streams via Network 2615. Network 2615 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 2610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 2610 may, but are not required to, further include systems configured for modifying received video. For example, a client may be configured to perform further rendering, to overlay one video image on another video image, to crop a video image, and/or the like. For example, Clients 2610 may be configured to receive various types of video frames, such as I-frames, P-frames and B-frames, and to process these frames into images for display to a user. In some embodiments, a member of Clients 2610 is configured to perform further rendering, shading, conversion to 3-D, or like operations on the video stream. A member of Clients 2610 is optionally configured to receive more than one audio or video stream. Input devices of Clients 2610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 2610 is generated and provided by Video Server System 2620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 2610 are typically configured to receive inputs from a user. These inputs may include game commands configured to change the state of the video game or otherwise affect gameplay. The game commands can be received using input devices and/or may be automatically generated by computing instructions executing on Clients 2610. The received game commands are communicated from Clients 2610 via Network 2615 to Video Server System 2620 and/or Game Server 2625. For example, in some embodiments, the game commands are communicated to Game Server 2625 via Video Server System 2620. In some embodiments, separate copies of the game commands are communicated from Clients 2610 to Game Server 2625 and Video Server System 2620. The communication of game commands is optionally dependent on the identity of the command Game commands are optionally communicated from Client 2610A through a different route or communication channel that that used to provide audio or video streams to Client 2610A.

Game Server 2625 is optionally operated by a different entity than Video Server System 2620. For example, Game Server 2625 may be operated by the publisher of a multiplayer game. In this example, Video Server System 2620 is optionally viewed as a client by Game Server 2625 and optionally configured to appear from the point of view of Game Server 2625 to be a prior art client executing a prior art game engine. Communication between Video Server System 2620 and Game Server 2625 optionally occurs via Network 2615. As such, Game Server 2625 can be a prior art multiplayer game server that sends game state information to multiple clients, one of which is game server system 2620. Video Server System 2620 may be configured to communicate with multiple instances of Game Server 2625 at the same time. For example, Video Server System 2620 can be configured to provide a plurality of different video games to different users. Each of these different video games may be supported by a different Game Server 2625 and/or published by different entities. In some embodiments, several geographically distributed instances of Video Server System 2620 are configured to provide game video to a plurality of different users. Each of these instances of Video Server System 2620 may be in communication with the same instance of Game Server 2625. Communication between Video Server System 2620 and one or more Game Server 2625 optionally occurs via a dedicated communication channel. For example, Video Server System 2620 may be connected to Game Server 2625 via a high bandwidth channel that is dedicated to communication between these two systems.

Video Server System 2620 comprises at least a Video Source 2630, an I/O Device 2645, a Processor 2650, and non-transitory Storage 2655. Video Server System 2620 may include one computing device or be distributed among a plurality of computing devices. These computing devices are optionally connected via a communications system such as a local area network.

Video Source 2630 is configured to provide a video stream, e.g., streaming video or a series of video frames that form a moving picture. In some embodiments, Video Source 2630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 2625. Game Server 2625 may maintain a copy of the state of the game based on game commands received from multiple players using geographically disperse clients. In these cases, the game state is provided by Game Server 2625 to Video Source 2630, wherein a copy of the game state is stored and rendering is performed. Game Server 2625 may receive game commands directly from Clients 2610 via Network 2615, and/or may receive game commands via Video Server System 2620.

Video Source 2630 typically includes rendering logic, e.g., hardware, firmware, and/or software stored on a computer readable medium such as Storage 2655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 2610. For example, the raw video may be encoded according to an Adobe Flash® standard, .wav, H.264, H.263, On2, VP6, VC-1, WMA, Huffyuv, Lagarith, MPG-x, Xvid, FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 2630 includes a video recording device such as a camera. This camera may be used to generate delayed or live video that can be included in the video stream of a computer game. The resulting video stream optionally includes both rendered images and images recorded using a still or video camera. Video Source 2630 may also include storage devices configured to store previously recorded video to be included in a video stream. Video Source 2630 may also include motion or positioning sensing devices configured to detect motion or position of an object, e.g., person, and logic configured to determine a game state or produce video-based on the detected motion and/or position.

Video Source 2630 is optionally configured to provide overlays configured to be placed on other video. For example, these overlays may include a command interface, log in instructions, messages to a game player, images of other game players, video feeds of other game players (e.g., webcam video). In embodiments of Client 2610A including a touch screen interface or a gaze detection interface, the overlay may include a virtual keyboard, joystick, touch pad, and/or the like. In one example of an overlay a player's voice is overlaid on an audio stream. Video Source 2630 optionally further includes one or more audio sources.

In embodiments wherein Video Server System 2620 is configured to maintain the game state based on input from more than one player, each player may have a different point of view comprising a position and direction of view. Video Source 2630 is optionally configured to provide a separate video stream for each player based on their point of view. Further, Video Source 2630 may be configured to provide a different frame size, frame data size, and/or encoding to each of Client 2610. Video Source 2630 is optionally configured to provide 3-D video.

I/O Device 2645 is configured for Video Server System 2620 to send and/or receive information such as video, commands, requests for information, a game state, gaze information, device motion, device location, user motion, client identities, player identities, game commands, security information, audio, and/or the like. I/O Device 2645 typically includes communication hardware such as a network card or modem. I/O Device 2645 is configured to communicate with Game Server 2625, Network 2615, and/or Clients 2610.

Processor 2650 is configured to execute logic, e.g. software, included within the various components of Video Server System 2620 discussed herein. For example, Processor 2650 may be programmed with software instructions in order to perform the functions of Video Source 2630, Game Server 2625, and/or a Client Qualifier 2660. Video Server System 2620 optionally includes more than one instance of Processor 2650. Processor 2650 may also be programmed with software instructions in order to execute commands received by Video Server System 2620, or to coordinate the operation of the various elements of Game System 2600 discussed herein. Processor 2650 may include one or more hardware device. Processor 2650 is an electronic processor.

Storage 2655 includes non-transitory analog and/or digital storage devices. For example, Storage 2655 may include an analog storage device configured to store video frames. Storage 2655 may include a computer readable digital storage, e.g. a hard drive, an optical drive, or solid state storage. Storage 2615 is configured (e.g. by way of an appropriate data structure or file system) to store video frames, artificial frames, a video stream including both video frames and artificial frames, audio frame, an audio stream, and/or the like. Storage 2655 is optionally distributed among a plurality of devices. In some embodiments, Storage 2655 is configured to store the software components of Video Source 2630 discussed elsewhere herein. These components may be stored in a format ready to be provisioned when needed.

Video Server System 2620 optionally further comprises Client Qualifier 2660. Client Qualifier 2660 is configured for remotely determining the capabilities of a client, such as Clients 2610A or 2610B. These capabilities can include both the capabilities of Client 2610A itself as well as the capabilities of one or more communication channels between Client 2610A and Video Server System 2620. For example, Client Qualifier 2660 may be configured to test a communication channel through Network 2615.

Client Qualifier 2660 can determine (e.g., discover) the capabilities of Client 2610A manually or automatically. Manual determination includes communicating with a user of Client 2610A and asking the user to provide capabilities. For example, in some embodiments, Client Qualifier 2660 is configured to display images, text, and/or the like within a browser of Client 2610A. In one embodiment, Client 2610A is an HMD that includes a browser. In another embodiment, client 2610A is a game console having a browser, which may be displayed on the HMD. The displayed objects request that the user enter information such as operating system, processor, video decoder type, type of network connection, display resolution, etc. of Client 2610A. The information entered by the user is communicated back to Client Qualifier 2660.

Automatic determination may occur, for example, by execution of an agent on Client 2610A and/or by sending test video to Client 2610A. The agent may comprise computing instructions, such as java script, embedded in a web page or installed as an add-on. The agent is optionally provided by Client Qualifier 2660. In various embodiments, the agent can find out processing power of Client 2610A, decoding and display capabilities of Client 2610A, lag time reliability and bandwidth of communication channels between Client 2610A and Video Server System 2620, a display type of Client 2610A, firewalls present on Client 2610A, hardware of Client 2610A, software executing on Client 2610A, registry entries within Client 2610A, and/or the like.

Client Qualifier 2660 includes hardware, firmware, and/or software stored on a computer readable medium. Client Qualifier 2660 is optionally disposed on a computing device separate from one or more other elements of Video Server System 2620. For example, in some embodiments, Client Qualifier 2660 is configured to determine the characteristics of communication channels between Clients 2610 and more than one instance of Video Server System 2620. In these embodiments the information discovered by Client Qualifier can be used to determine which instance of Video Server System 2620 is best suited for delivery of streaming video to one of Clients 2610.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for gaming, comprising:
   executing at a server a first instance of a gaming application in single-player mode and in isolation from first other instances of said gaming application, said first instance associated with a first game play of a first user;
   executing at said server a second instance of said gaming application in single-player mode and in isolation from second other instances of said gaming application, said second instance associated with a second game play of a second user, wherein execution of said first instance and execution of said second instance occur simultaneously;
   collecting at said server information related to said first game play of said first user and said second game play of said second user;
   establishing a first communication channel over a network between said server and a first computing device associated with said first user configured for controlling said first instance of said gaming application;
   establishing a second communication channel over said network between said server and a second computing device associated with said first user;
   generating an interface including said information related to said first game play of said first user and said second game play of said second user, wherein said gaming application is a single-player game, wherein said information includes relative locations of characters of said first user and said second user in a gaming environment of said gaming application, each of said first and second users simultaneously playing said gaming application in single-player mode, wherein said first and second game plays are played in isolation such that said first instance and said second instance execute independently from each other;
   filtering said information based on a persona selected by said first user, wherein said persona defines how much and what type of information is desired by said first user; and
   delivering said interface and said information that is filtered over said second communication channel from said server to said second computing device for display concurrent with said first game play of said first user.

2. The method of claim 1, further comprising:
   accessing a first user profile of said first user;
   determining a plurality of friends of said first user based on said first user profile, wherein each of said plurality of friends is playing said gaming application, wherein a first friend comprises said second user; and
   including first information related to a plurality of game plays of said plurality of friends in said interface.

3. The method of claim 2, wherein said generating an interface includes:
   generating a radar mapping for said information that is filtered showing a first character of said first user within said gaming environment of said gaming application;
   locating said first character at a center of said radar mapping;
   placing a plurality of objects of interest at a plurality of locations on said radar mapping, wherein locations of said first character and said plurality of objects of interest in said gaming environment create a plurality of directional relationships.

4. The method of claim 3, further comprising;
generating a directional object representing said first character;
placing said directional object in said center of said radar mapping; and
orienting said directional object to show a direction of a point of view of said first character in said gaming environment.

5. The method of claim 3, further comprising:
superimposing an outline of a world in said gaming environment over said radar mapping.

6. The method of claim 1, further comprising:
inserting an arrow into a current scene generated for said first game play for display at said first computing device, wherein said arrow points in a direction of a first object selectable via said interface, wherein the first object is remote from a location of a viewpoint of the current scene.

7. The method of claim 6, further comprising:
receiving a command instruction from a third computing device of said second user over a third communication channel, wherein said command instruction orients said arrow within said current scene.

8. The method of claim 1, wherein said generating said interface includes:
providing streaming video of said second user for said information that is filtered.

9. A method for providing gaming information, comprising:
executing at a server a first instance of a gaming application in association with a first game play of a first user, wherein said first instance is executed in single-player mode and in isolation from first other instances of said gaming application;
executing at said server a second instance of said gaming application in association with a second game play of a second user, wherein said second instance is executed in said single-player mode and in isolation from second other instances of said gaming application, wherein execution of said first instance and said second instance occur simultaneously;
collecting at said server information related to said first game play of said first user and said second game play of said second user;
determining at said server that said first user and said second user have a friend relationship and that both are simultaneously playing said gaming application based on user profiles of said first user and said second user;
establishing a first communication channel over a network between said server and a first computing device associated with said first user configured for controlling said first instance of said gaming application;
establishing a second communication channel over said network between said server and a second computing device associated with said first user;
generating an interface including said information related to said first game play of said first user and said second game play of said second user, wherein said gaming application is a single-player game, wherein said information related to said first game play of said first user and said second game play of said second user includes relative locations of characters of said first user and said second user in a gaming environment of said gaming application, each of said first and second users simultaneously playing said gaming application in said single-player mode, wherein said first and second game plays are played in isolation such that said first instance and said second instance execute independently from each other;
delivering said interface and said information related to said first game play of said first user and said second game play of said second user over said second communication channel from said server to said second computing device for display;
providing over said network communication between said interface associated with said first user and a user interface on a fourth computing device associated with said second user to facilitate communication between said first user and said second user in response to said friend relationship that is determined, said interface and said user interface each providing said information related to said first game play of said first user and said second game play of said second user,
wherein a third computing device of said second user is configured for controlling said second game play of said second user.

10. The method of claim 9, wherein said determining that said first user and said second user have said friend relationship includes:
informing a first user profile of said first user that said first user is currently playing said gaming application;
informing a second user profile of said second user that said second user is currently playing said gaming application;
accessing said second user profile.

11. The method of claim 9, wherein said generating an interface includes:
generating a radar mapping for said information related to said first game play of said first user and said second game play of said second user that is filtered showing a first character of said first user within said gaming environment of said gaming application;
locating said first character at a center of said radar mapping;
placing a plurality of objects of interest at a plurality of locations on said radar mapping that show a plurality of directional relationships between locations of said first character and said plurality of objects of interest in said gaming environment.

12. A game cloud system for gaming, comprising:
a game server configured to manage a plurality of virtual gaming engines configured to execute a plurality of instances of a video game in association with a plurality of users playing said video game;
a snapshot datastore for storing a plurality of snapshots;
a user datastore for storing user profile information;
a first virtual gaming engine configured for executing a first instance of said video game in single-player mode and in isolation from first other instances of said video game, said first instance associated with a first game play of a first user;
a second virtual gaming engine configured for executing a second instance of said video game in said single-player mode and in isolation from second other instances of said video game, said second instance associated with a second game play of a second user, wherein execution of said first instance and said second instance occur simultaneously;
a companion application generator configured to:
access information related to said first game play of said first user and said second game play of said second user;

determine that said first user and said second user have a friend relationship and that both of said first user and said second user are playing said video game based on user profiles of first user and said second user;

establish a first communication channel over a network between said game server and a first computing device associated with said first user configured for controlling said first instance of said video game;

establish a second communication channel over said network between said game server and a second computing device associated with said first user;

generate an interface including said information related to said first game play of said first user and said second game play of said second user, wherein said video game is a single-player game, wherein said information includes relative locations of characters of said first user and said second user in a gaming environment of said video game, each of said first and second users simultaneously playing said video game in said single-player mode, wherein said first and second game plays are played in isolation such that said first instance and said second instance execute independently from each other;

deliver said interface and said information over said second communication channel from said game server to said second computing device for display;

provide over said network communication between said interface associated with said first user and a user interface on a fourth computing device associated with said second user in response to said friend relationship that is determined to facilitate communication between said first user and said second user, said interface and said user interface each providing said information related to said first game play of said first user and said second game play of said second user, wherein a third computing device of said second user is configured for controlling said second game play of said second user.

13. The system of claim 12, wherein said companion application generator is further configured to:

generate a radar mapping for said information that is filtered showing orientation of a first character of said first user within said environment of said video game;

locate said first character at a center of said radar mapping; and place a plurality of objects of interest at a plurality of locations on said radar mapping that show a plurality of directional relationships between locations of said first character and said plurality of objects of interest in said gaming environment.

* * * * *